(12) United States Patent
Imamoto et al.

(10) Patent No.: US 11,532,848 B2
(45) Date of Patent: *Dec. 20, 2022

(54) EXTERIOR MATERIAL FOR ELECTRICITY STORAGE DEVICE

(71) Applicant: TOPPAN PRINTING CO., LTD., Tokyo (JP)

(72) Inventors: Junya Imamoto, Tokyo (JP); Yu Ogihara, Tokyo (JP); Masayoshi Suzuta, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 284 days.

This patent is subject to a terminal disclaimer.

(21) Appl. No.: 16/617,419

(22) PCT Filed: May 18, 2018

(86) PCT No.: PCT/JP2018/019380
§ 371 (c)(1),
(2) Date: Nov. 26, 2019

(87) PCT Pub. No.: WO2018/216634
PCT Pub. Date: Nov. 29, 2018

(65) Prior Publication Data
US 2020/0091473 A1    Mar. 19, 2020

(30) Foreign Application Priority Data

May 26, 2017 (JP) .............................. JP2017-104971
Nov. 22, 2017 (JP) .............................. JP2017-224803

(51) Int. Cl.
*H01M 50/119* (2021.01)
*H01M 50/183* (2021.01)
(Continued)

(52) U.S. Cl.
CPC .......... *H01M 50/183* (2021.01); *H01G 11/80* (2013.01); *H01M 50/571* (2021.01)

(58) Field of Classification Search
CPC ..... H01G 11/78; H01G 11/80; H01M 50/119; H01M 50/121; H01M 50/129;
(Continued)

(56) References Cited

FOREIGN PATENT DOCUMENTS

| EP | 3467895 A1 | 4/2019 |
|---|---|---|
| EP | 3582281 A1 | 12/2019 |

(Continued)

OTHER PUBLICATIONS

Machine Translation JP2013157286A (Year: 2013).*
(Continued)

*Primary Examiner* — Victoria H Lynch

(57) ABSTRACT

A packaging material for a power storage device, comprising at least: a substrate layer; a metallic foil layer with an anti-corrosion treatment layer being disposed on one face or both faces thereof; and a sealant layer in this order, wherein the sealant layer includes a polypropylene-based resin (A) and 1 to 40% by mass of incompatible component (B), and maximum seal strength $S_M$ in an adhered portion resulting from adhesion by heat-sealing the packaging material is 35 N/15 mm or more, and in addition, the packaging material for a power storage device satisfies the following requirements (1) or (2): (1) a ratio $S_S/S_M$ of seal strength $S_S$ to maximum seal strength $S_M$ in a stable range is 0.3 or more; (2) a ratio $S_A/S_M$ of average seal strength $S_A$ to maximum seal strength $S_M$ is 0.3 or more.

7 Claims, 12 Drawing Sheets

(51) Int. Cl.
*H01G 11/80* (2013.01)
*H01M 50/571* (2021.01)

(58) Field of Classification Search
CPC ............. H01M 50/131; H01M 50/183; H01M 50/571; Y02E 60/10
See application file for complete search history.

(56) References Cited

FOREIGN PATENT DOCUMENTS

| | | | | |
|---|---|---|---|---|
| EP | 3582282 | A1 | 12/2019 | |
| JP | 2002-245983 | | 8/2002 | |
| JP | 2006-008742 | A | 1/2006 | |
| JP | 2013157286 | A * | 8/2013 | ............. H01M 2/02 |
| JP | 2015-232945 | A | 12/2015 | |
| JP | 2016-143615 | A | 8/2016 | |
| JP | 2016-207564 | A | 12/2016 | |
| JP | 2017-201580 | A | 11/2017 | |
| WO | WO 2016/125684 | A1 | 8/2016 | |
| WO | 2017/047717 | A1 | 3/2017 | |

OTHER PUBLICATIONS

Office Action dated Jun. 29, 2021 in corresponding Japanese Patent Application No. 2017-104971 (6 pages).
International Search Report dated Aug. 21, 2018 in corresponding International Patent Application No. PCT/JP2018/019380.
English Translation by WIPO of the International Preliminary Report on Patentability dated Nov. 26, 2019 in corresponding International Patent Application No. PCT/JP2018/019380.
Extended European Search Report dated Feb. 1, 2021 in related European Patent Application No. 18805573.5 (10 pages).
Office Action dated Nov. 30, 2021 in corresponding Japanese Patent Application No. 2017-224803 (3 pages).
Office Action dated Feb. 8, 2022 in a corresponding Japanese Patent Application No. 2017-104971 (2 pages).

* cited by examiner

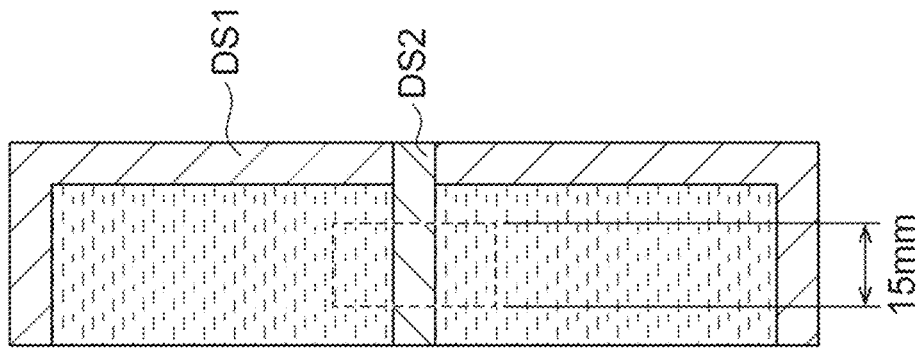
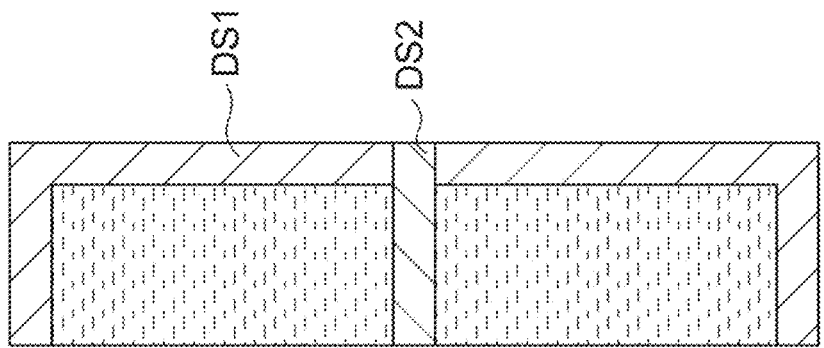
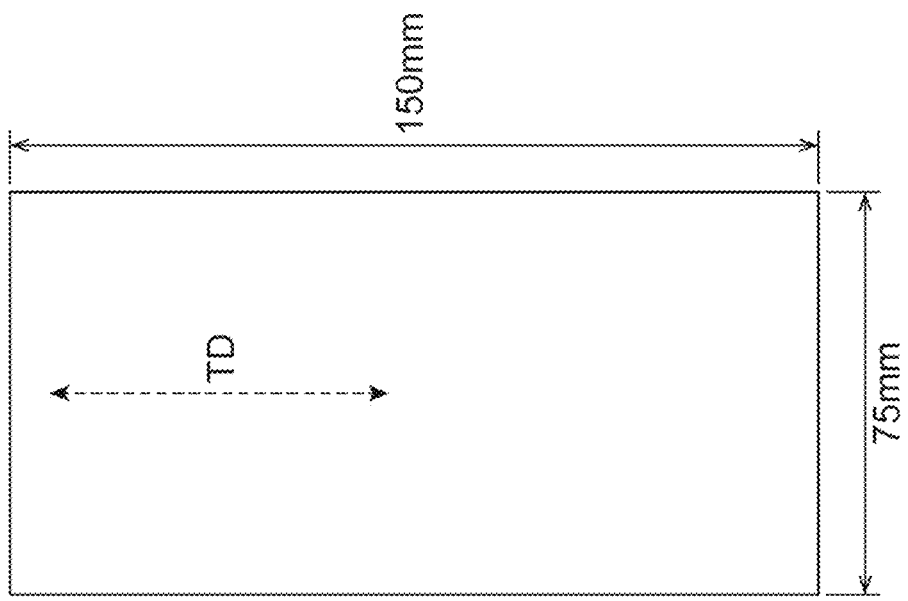

INJECTION

25 V APPLIED

EXTERIOR MATERIAL FOR ELECTRICITY STORAGE DEVICE

CROSS-REFERENCE TO RELATED APPLICATIONS

This application is a U.S. National Stage Application which claims the benefit under 35 U.S.C. § 371 of International Patent Application No. PCT/JP2018/019380 filed on May 18, 2018, which claims foreign priority benefit under 35 U.S.C. § 119 of Japanese Patent Application No. 2017-104971 filed on May 26, 2017 and Japanese Patent Application No. 2017-224803 filed on Nov. 22, 2017 in the Japanese Intellectual Property Office, the contents of both of which are incorporated herein by reference.

TECHNICAL FIELD

The present invention relates to a packaging material for a power storage device.

BACKGROUND ART

As power storage devices, secondary batteries such as lithium ion batteries, nickel-hydrogen batteries and lead storage batteries, as well as electrochemical capacitors such as electric double layer capacitors are known, for example. In view of downsizing of mobile devices, limitation in space for installation, or the like, further downsizing of power storage devices has been required, and lithium ion batteries with high energy density have been watched with interest. As packaging materials for use in lithium ion batteries, metallic cans had conventionally been used; however, multi-layered films with light weight, high heat releasing ability, and being able to be produced with a low cost (for example, films having a configuration like substrate layer/metallic foil layer/sealant layer) have started to be used.

In a lithium ion battery using the above multi-layered film as a packaging material, a configuration for covering the battery contents with a packaging material including an aluminum foil layer as a metallic foil layer has been employed in order to prevent infiltration of moisture into the interior of the lithium ion battery. Lithium ion batteries in which such a configuration is employed are referred to as lithium ion batteries of an aluminum laminated type. In battery contents within lithium ion batteries, a positive electrode, a negative electrode and a separator, as well as an electrolytic solution in which a lithium salt as an electrolyte has been dissolved into an aprotic solvent having osmotic force, such as propylene carbonate, ethylene carbonate, dimethyl carbonate, diethyl carbonate, ethyl methyl carbonate or the like, or an electrolyte layer consisting of a polymeric gel impregnated with the electrolytic solution are included.

As a lithium ion battery of an aluminum laminated type, an lithium ion battery of an embossed type in which a depressed part is formed on a portion of a packaging material by cold molding, and battery contents are held in the depressed part, and the remaining portion of the packaging material is folded back to seal the edge of the packaging material by heat seal is known, for example. Packaging materials constituting such a lithium ion battery have been required to exhibit steady sealability resulting from heat seal, and also required to tend not to occur decrease in laminating strength between an aluminum foil layer and a sealant layer due to an electrolytic solution of the battery contents.

Also, in view of thickness reducing of smartphones, tablet PCs, and the like, also with regard to power storage devices to be installed in these, thin devices are required. Thinning of a substrate layer, a metallic foil layer and a sealant layer in a packaging material for a power storage device is advancing with thickness reducing of power storage devices, and as a result of this, decrease in the insulation properties or laminating strength due to the sealant layer being thinned is problematic.

Therefore, for example, in Patent Literature 1, a packaging material is proposed, the packaging material comprising a heat seal layer (sealant layer) including an adhesive polymethyl pentene layer, and as a result of this, the packaging material being able to be steadily sealed by heat and pressure in heat seal without short circuit between a barrier layer and tabs of the packaging body.

CITATION LIST

Patent Literature

Patent Literature 1: Japanese Unexamined Patent Application Publication No. 2002-245983

SUMMARY OF INVENTION

Technical Problem

In a conventional packaging material as described in the above Patent Literature 1, a solution to decrease in insulation properties due to contact between tab leads and a metallic foil layer has been accomplished. However, it is considered that another factor regarding decrease in insulating properties is present. In order to allow a lithium ion battery to store energy, it is necessary to perform charge and discharge of the lithium ion battery under predetermined conditions of an electrical current value, a voltage value, an ambient temperature and the like to occur chemical change (chemical conversion). This chemical conversion step is performed with the lithium ion battery being a temporal battery to which an electrolytic solution is injected. Then, once the battery is opened for removal of a gas generated by chemical conversion or for reloading of the electrolytic solution, final seal is subsequently performed to manufacture a battery. This final seal seals a portion of the battery that have been dipped into the electrolytic solution once, this final seal is therefore a degassing seal (degassing heat seal) in which heat seal is performed while sandwiching the electrolytic solution between portions to be heat-sealed.

According to investigations by the present inventors up to now, it has been found that decrease in insulation properties are often caused by destruction of a sealant layer due to degassing heat sealing, and solution to this decrease in insulation properties is of highly importance. In Patent Literature 1, studies with regard to the destruction of a sealant layer due to degassing heat sealing have not been accomplished.

A degassing heat seal heat-seals portions while sandwiching the electrolytic solution between the portions to be heat-sealed when a packaging material accommodating battery contents is sealed by heat seal, and therefore, in some cases, the electrolytic solution bubbles and the sealant layer is destructed. Then, it is considered that the electrolytic solution enters from a portion of the sealant layer being destructed, and contacts a metallic layer, and as a result of this, insulation properties decrease.

In addition, the decrease in insulation properties resulting from the destruction of the sealant layer due to the degassing heat seal tends to be influenced by thinning of the sealant layer, and therefore, among improvements in insulation properties, a solution to this decrease in insulation properties is particularly demanded toward the future.

The present invention has been accomplished in view of the problems that the above conventional technology has, and it is an object of the present invention to provide a packaging material for a power storage device, the packaging material being able to maintain insulating properties after degassing heat sealing in a sufficient manner.

Solution to Problem

The present invention provides a packaging material for a power storage device, comprising at least:
a substrate layer;
a metallic foil layer with an anti-corrosion treatment layer being disposed on one face or both faces thereof; and
a sealant layer
in this order.

In a packaging material for a power storage device according to one aspect of the present invention, the above sealant layer includes a polypropylene-based resin (A) and an incompatible component (B) incompatible with the above polypropylene-based resin, and the content of the above incompatible component (B) is 1 to 40% by mass based on the total amount of the above sealant layer. In addition, with regard to an adhered portion resulting from adhesion by heat-sealing the above packaging materials stacked so that the above sealant layers are opposed to each other under conditions of a temperature of 190° C. and a pressure of 0.5 MPa for 3 seconds, in a graph showing a relationship between a displacement starting at one end and seal strength obtained when the seal strength is continuously measured from the one end to the other end of the adhered portion, a maximum seal strength $S_M$ is 35 N/15 mm or more, and in addition, the above packaging material for a power storage device satisfies the following requirements (1) or (2).

(1) A stable range of the seal strength is present subsequently to a displacement resulting in the above maximum seal strength $S_M$, and a ratio $S_S/S_M$ of seal strength $S_S$ in the stable range to the above maximum seal strength $S_M$ is 0.3 or more.

(2) The above stable range is not present, and a ratio $S_A/S_M$ of average seal strength $S_A$ from the displacement resulting in the above maximum seal strength $S_M$ to a displacement ending at the above other end with respect to the above maximum seal strength $S_M$ is 0.3 or more.

With a packaging material for a power storage device having the above configuration, even when the sealant layer is thinned, it is possible to maintain insulating properties after degassing heat sealing in a sufficient manner. The present inventors presume that the reason why the above packaging material for a power storage device achieves such an effect is as follows. The sealant layer of a packaging material for a power storage device tends to generate defects in steps for producing a power storage device such as heat seal, degassing heat sealing and molding. In particular, as a result of thinning of the sealant layer, in degassing heat sealing in which heat seal is performed while sandwiching the electrolytic solution, deformation of the sealant layer considered to be due to volatilization (bubbling) of the electrolytic solution becomes large, and insulating properties tend to decrease. The reason why the insulating properties decreases due to the deformation is considered to be, for example, the fact that as a result of bubbling, the vicinity of the metallic foil layer tends to be exposed, and the electrolytic solution come into contact with the exposed portion. In the present invention, maximum seal strength $S_M$ is 35 N/15 mm or more, and in addition, packaging material satisfies the above requirements (1) or (2). As a result of this, it is considered that strong aggregation force of the sealant resin is achieved, and voids tend not to form even when the electrolytic solution bubbles. As a result, decrease in insulating properties tends not to occur.

In the above graph, it is preferable that maximum seal strength $S_M$ be 40 N/15 mm or more, and the above ratio $S_S/S_M$ or the above ratio $S_A/S_M$ be 0.6 or more. As a result of this, decrease in insulating properties tends to be further suppressed.

The sealant layer includes a polypropylene-based resin (A) and an incompatible component (B) incompatible with this polypropylene-based resin (A), and therefore, a sea-island structure is formed in the sealant layer by the polypropylene-based resin (A) and the incompatible component (B). As a result of formation of this sea-island structure, it is possible to impart impact resistance to the sealant layer, and it is possible to improve the seal strength.

It is preferable that the above incompatible component (B) contain a compound (B1) having a portion compatible with the above polypropylene-based resin (A). The present inventors have been believed that when bubbling of the electrolytic solution in degassing heat sealing occurs, voids tend to be formed using this sea-island interface as a source. Therefore, in the sealant layer, as a result of the fact that the above incompatible component (B) contains a compound (B1) having a portion compatible with the above polypropylene-based resin (A), it is possible to improve adhesion strength of the above sea-island interface, and formation of voids associated with bubbling of the electrolytic solution is suppressed, and therefore, it is possible to improve the insulating properties further. Also, as a result of improvement in adhesion strength of the sea-island interface due to the above compound (B1), the above seal strength $S_M$, $S_S$ or $S_A$ Can also be improved.

The above sealant layer may consist of a plurality of layers and at least one layer of the plurality of layers is a layer which includes the above polypropylene-based resin (A) and the above incompatible component (B) incompatible with the above polypropylene-based resin, and in addition, the above incompatible component (B) contains the above compound (B1).

The above incompatible component (B) can contain an ethylene-α-olefin copolymer. Also, the above sealant layer can further include a compatible elastomer (C) compatible with the above polypropylene-based resin (A), and the above compatible elastomer (C) can contain a propylene-α-olefin copolymer.

In a packaging material for a power storage device according to another aspect of the present invention, the above sealant layer contains a polypropylene-based resin (A) and an incompatible component (B) incompatible with the above polypropylene-based resin, and has an existing region of the above polypropylene-based resin (A), and a plurality of existing regions of the above incompatible component (B) surrounded by the above polypropylene-based resin (A). In addition, the above sealant layer includes a low shrinkage sealant layer in which a ratio ($LAh^{MD}/LA^{MD}$) of an average length $LAh^{MD}$, toward a MD direction with respect to the sealant layer, of an existing region of the above incompatible component (B) in a cross-section along a through-thickness direction and the above MD direction after heating the above packaging material for a power storage device at 190° C. for 30 seconds to an average length $LA^{MD}$, toward the above MD direction, of an existing region of the above incompatible component (B) in a cross-section along in the above through-thickness direction and the above MD direction with respect to the above sealant layer is 0.20 or more. Hereinafter, this ratio ($LAh^{MD}/LA^{MD}$) can be merely referred to as shrinkage ratio.

On the basis of the above packaging material for a power storage device, even when the sealant layer is thinned, it is possible to maintain insulating properties after degassing heat sealing in a sufficient manner. The present inventors presume that the reason why the above packaging material for a power storage device achieves such an effect is as follows. In degassing heat sealing, the sealant layer is swelled due to electrolytic solution, and heat seal is performed while sandwiching the electrolytic solution, and therefore, deformation of the sealant layer considered to be due to volatilization (bubbling) of the electrolytic solution occurs. Bubbling of the electrolytic solution tends to form voids the interface of sea-island structure formed by the polypropylene-based resin (A) and the incompatible component (B) possessed by the sealant layer, and the like, and it is considered that the metallic foil layer tends to be exposed to voids in the interior of the sealant layer, and the electrolytic solution enters the voids to cause the electrolytic solution to come into contact with the exposed portion of the metallic foil layer, and as a result of this, the insulating properties decreases. In particular, when the sealant layer is thinned, deformation of the sealant layer due to bubbling becomes large based on the thickness, and possibilities of decrease in insulating properties further increase. As a result, in the present invention, the sealant layer includes a low shrinkage sealant layer having a shrinkage ratio at or above a certain level. In the packaging material comprising such a low shrinkage sealant layer, adhesiveness between the polypropylene-based resin (A) and the incompatible component (B) in the interface of the above sea-island structure is high, and even when the electrolytic solution bubbles, voids using the above interface as a source tend not to occur. Therefore, in a packaging material for a power storage device according to the present invention, even when the sealant layer is thinned, the insulating properties after degassing heat sealing can be sufficiently maintained.

In the above packaging material for a power storage device, it is preferable that a ratio ($LAh^{MD}/LAh^{VD}$) of the above average length $LAh^{MD}$, toward the above MD direction to an average length $LAh^{MD}$, toward the above through-thickness direction, of the above existing region of the above incompatible component (B) in the above cross-section along the above through-thickness direction and the above MD direction with respect to the above sealant layer after heating the above packaging material for a power storage device at 190° C. for 30 seconds be 2.50 or more. As a result of the fact that the existing region of the above incompatible component (B) after heating meets the above description, it tends for the insulating properties after degassing heat sealing to be maintained in a better manner.

In the above packaging material for a power storage device, the above sealant layer may consist of a plurality of layers, and at least one layer of the plurality of layers may be the above low shrinkage sealant layer. In this case, it is preferable that a layer of the plurality of sealant layers nearest to the above metallic foil layer be the above low shrinkage sealant layer. As a result of the fact that the sealant layer is adapted for a layer nearest to the metallic foil layer to be a low shrinkage sealant layer, it tends to suppress decrease in insulating properties after degassing heat sealing further. Bubbling of the electrolytic solution in degassing heat sealing tends to generate at a portion near to the metallic foil layer of the sealant layer, and as a result of the fact that the shrinkage ratio in the layer nearest to the metallic foil layer is large (shrinkage of the incompatible component (B) is small), it tends to suppress decrease in insulating properties more efficiently.

In the above packaging material for a power storage device, the above sealant layer can further contain a compatible elastomer (C) compatible with the above polypropylene-based resin (A), and the above compatible elastomer (C) can include a propylene-α-olefin copolymer. As a result of the fact that the sealant layer contains a compatible elastomer (C) compatible with the polypropylene-based resin (A), it is possible to impart flexibility to the sealant layer, and it is possible to impart functions such as suppression of molding whitening and impact resistance to the packaging material, and it is possible to improve functionalities as a packaging material.

Also, the above sealant layer consists of a plurality of layers, and in a layer of the plurality of layers nearest to the above metallic foil layer, the above polypropylene-based resin (A) can include an acid-modified polypropylene, and the above compatible elastomer (C) can include polypropylene with an atactic structure or a propylene-α-olefin copolymer with an atactic structure. On the basis of to such a packaging material for a power storage device, it tends to facilitate to retain adhesiveness between the sealant layer and the metallic foil layer, and to facilitate to prevent the generation of unsatisfactorily adhered portions resulting in a source of bubbling of the electrolytic solution, and further suppress, decrease in insulating properties after degassing heat sealing.

Also in a packaging material for a power storage device according to any aspect of the present invention, the thickness of the above sealant layer can be 10 to 45 μm. Even in the case where the sealant layer is thinner, it is possible to maintain the insulating properties after degassing heat sealing sufficiently.

Also in a packaging material for a power storage device according to any aspect of the present invention, can further comprises an adhesive layer between the above metallic foil layer and the above sealant layer, and the above adhesive layer can contain an acid-modified polyolefin, and at least one curing agent selected from the group consisting of a multifunctional isocyanate compound, a glycidyl compound, a compound having a carboxy group, a compound having an oxazoline group and a carbodiimide compound.

Advantageous Effects of Invention

According to the present invention, it is possible to provide a packaging material for a power storage device that can sufficiently maintain insulating properties after degassing heat sealing.

BRIEF DESCRIPTION OF DRAWINGS

FIGS. 10(a)-10(c) are schematic views illustrating a method for producing a sample to be evaluated in Examples.

DESCRIPTION OF EMBODIMENTS

Figure 1:
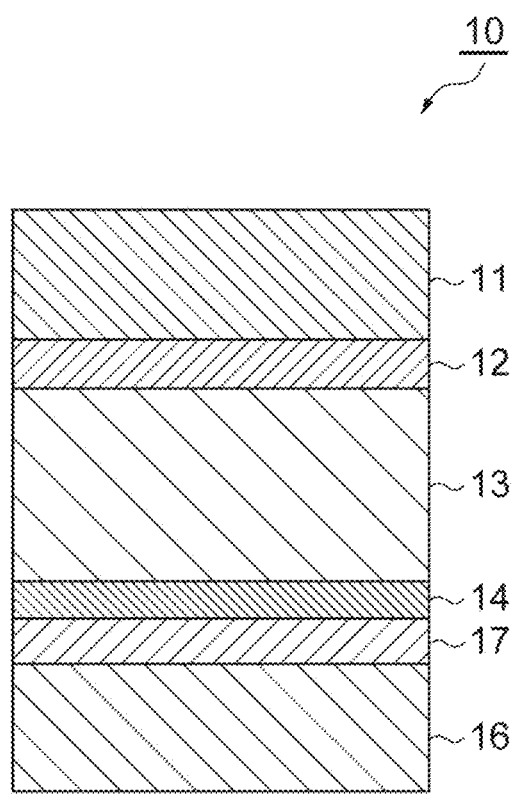
FIG. 1 is a schematic cross-sectional view of a packaging material for a power storage device according to one embodiment of the present invention.

Suitable embodiments of the present invention will be illustrated in detail below with reference to the drawings. Note that, in the drawings, the same or the corresponding parts are provided with the same reference signs, and the overlapping descriptions are omitted. Also, the dimensional ratios in the drawings are not limited to the ratios shown in the drawings.

[Packaging Material for Power Storage Device]

FIG. 1 is a cross-sectional view schematically illustrating one embodiment of a packaging material for a power storage device of the present invention. As shown in FIG. 1, a packaging material 10 (packaging material for a power storage device) of the present embodiment is a laminate in which a substrate layer 11, an adhesive layer 12 (sometimes referred to as first adhesive layer 12) formed on one face of the substrate layer 11, a metallic foil layer 13 formed on a face of the first adhesive layer 12 opposite to the substrate layer 11, an anti-corrosion treatment layer 14 formed on a face of the metallic foil layer 13 opposite to the first adhesive layer 12, an adhesive layer 17 (sometimes referred to as second adhesive layer 17) formed on a face opposite of the anti-corrosion treatment layer 14 to the metallic foil layer 13, and a sealant layer 16 formed on a face of the second adhesive layer 17 opposite to the anti-corrosion treatment layer 14 are successively laminated. In the packaging material 10, the substrate layer 11 is the outermost layer, and the sealant layer 16 is the innermost layer. In other words, the packaging material 10 is used such that the substrate layer 11 is directed toward the side of the exterior of the power storage device, and the sealant layer 16 is directed toward on the side of the interior of the power storage device.

The sealant layer 16 is a layer that is able to impart sealability by heat seal to the packaging material 10. The sealant layer 16 contains a polypropylene-based resin (A) and an incompatible component (B) incompatible with the above polypropylene-based resin. Hereinafter, optionally, the above polypropylene-based resin (A) is referred to as "(A) component", and the incompatible component (B) incompatible with the above (A) component is sometimes referred to as "(B) component" and the like. Here, in the present specification, "not having compatibility with the (A) component" and "incompatible with the (A) component" (incompatible) shall mean to provide dispersion in the polypropylene-based resin constituting the (A) component with a disperse phase size of 200 nm or more and less than 50 μm. Also, "compatible with a (A) component" and "having compatibility with the (A) component" (compatible) shall mean to provide dispersion in the polypropylene-based resin constituting the (A) component with a disperse phase size of 1 nm or more and less than 200 nm.

(I) First Aspect

Figure 2:
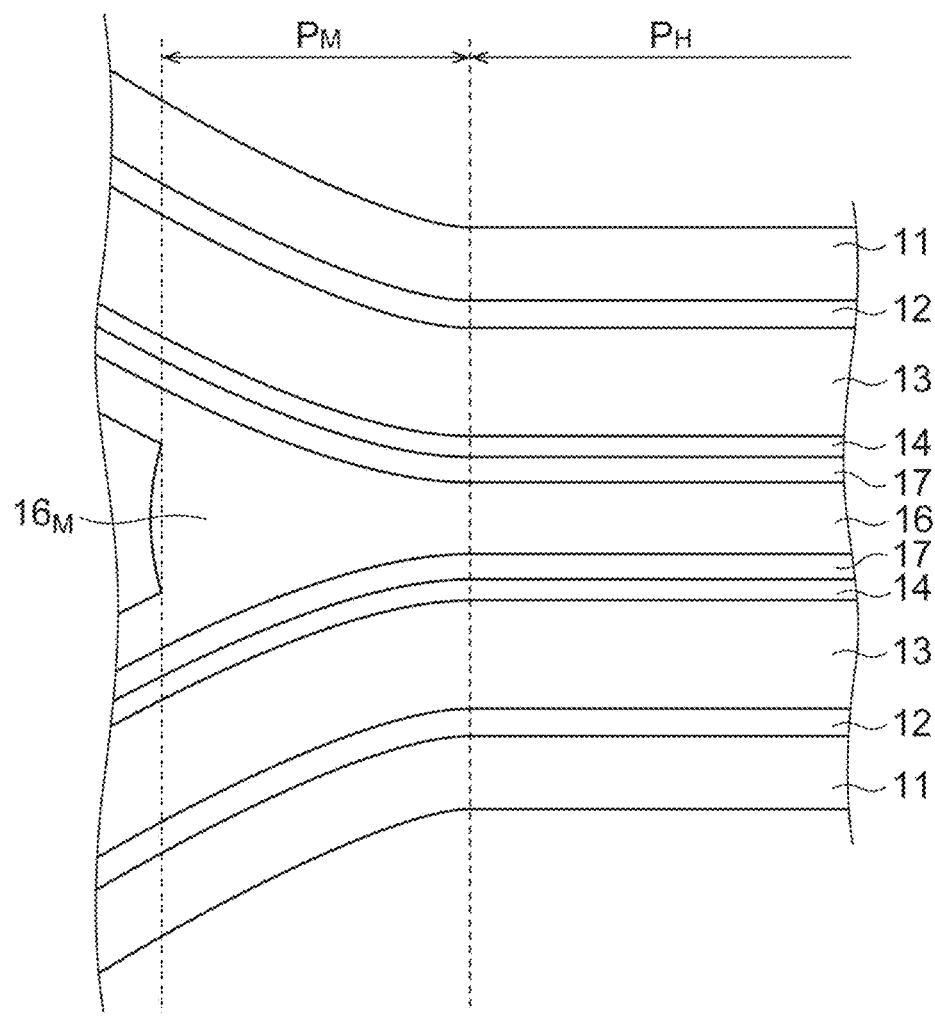
FIG. 2 is a schematic cross-sectional view of the packaging material after the packaging materials are stacked so that the sealant layers are opposed to each other, followed by heat seal.
Figure 3:
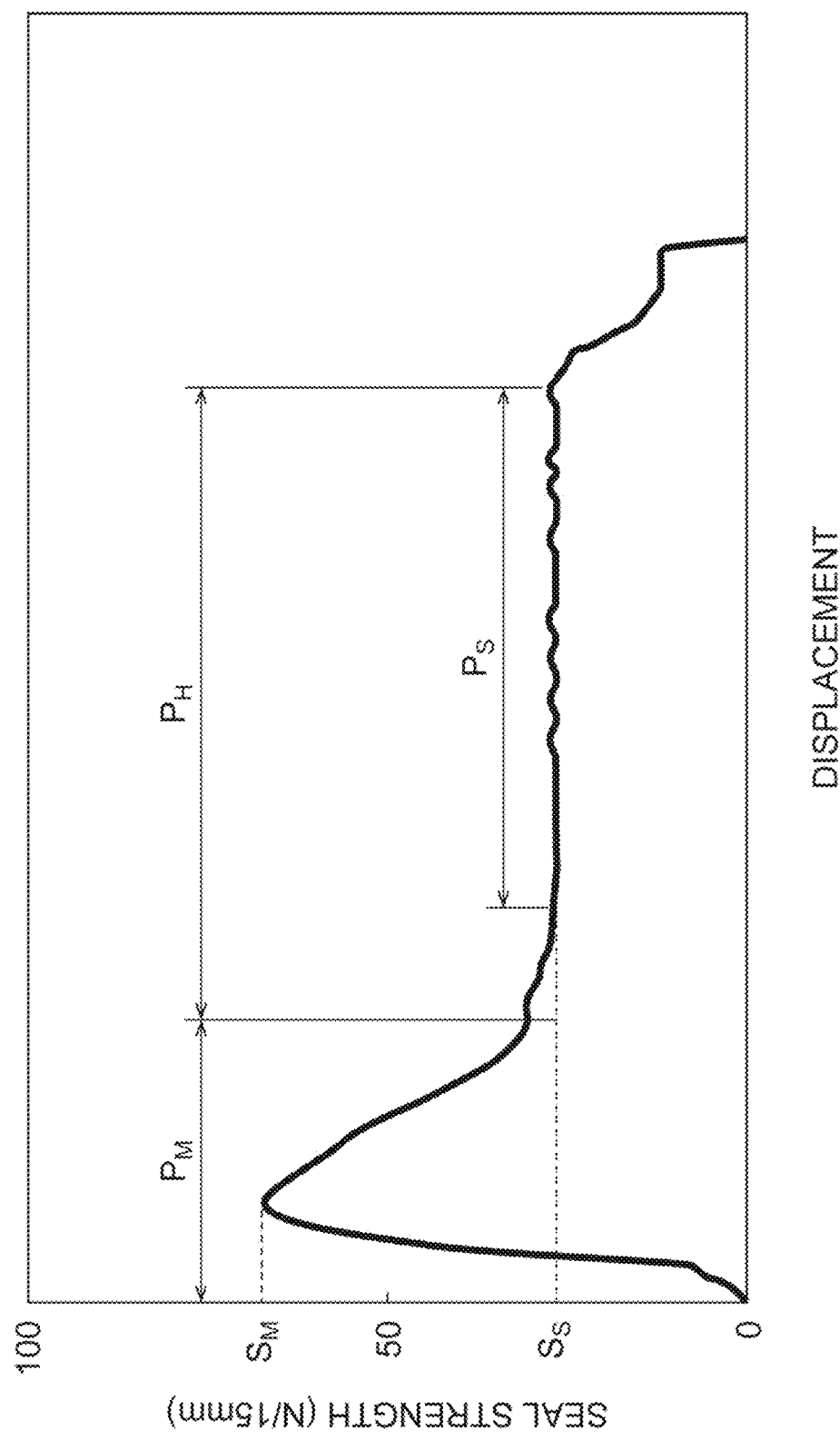
FIG. 3 is a graph showing one example of the measurement results obtained by continuously measuring seal strength of an adhered portion in the packaging material from one end to the other end of the adhered portion and showing a relationship between a displacement starting at the one end of the adhered portion and the seal strength.

The packaging materials 10 are stacked so that the sealant layers 16 are opposed to each other, and by heat-sealing these sealant layers 16 using a sealing bar, the sealant layers 16 are adhered to each other by thermal fusion. FIG. 2 is a cross-sectional view of the packaging material after heat seal, and a heat-sealed portion $P_H$ illustrates a portion directly heat-sealed by the sealing bar. Also, FIG. 2 illustrates a situation in which a portion of the sealant layer 16 melted by heating moves from a heat-sealed portion $P_H$ to form a sealant-fused portion $16_M$. As a result of the formation of the sealant-fused portion $16_M$, also in a fused part $P_M$ that is not heat-sealed, the packaging materials 10 are adhered to each other. In other words, the packaging materials 10 are adhered to each other at the heat-sealed portion $P_H$ and the fused part $P_M$ (in combination, also referred to as an adhered portion). The heat seal strength of packaging material 10 adhered in this way is measured as a load per unit width required for peeling away, from one packaging material 10 after being adhered, the other packaging material 10. As a sample for measuring heat seal strength, the packaging material 10 after being adhered is cut into the shape of elongated paper strip including, with considering the direction of the width in heat seal as a longitudinal direction, a fused part $P_M$ at the side for the injection of the electrolytic solution, and a heat-sealed portion $P_H$. FIG. 3 is a graph showing one example of the measurement results obtained by continuously measuring seal strength of an adhered portion in the packaging material from one end to the other end of the adhered portion and showing a relationship between a displacement resulting from peeling away from a fused part $P_M$, which is one end of the an adhered portion, and the seal strength. In the graph of FIG. 3, the left periphery illustrates one end of the direction of the width of the adhered portion, and the point at which the seal strength has decreased illustrates the other end. In the graph of FIG. 3, a curve rises from one end of the adhered portion, and seal strength shows the maximal value. It is considered that peeling of the packaging material 10 involves, first of all, destruction of the sealant-fused portion $16_M$ located at one end of this adhered portion, and a large force is required for destruction of the sealant-fused portion $16_M$, and as a result of this, the above maximal value in the graph is obtained. The above maximal value in the graph is considered to be resulting from destruction of the sealant-fused portion $16_M$, and therefore, may be referred to as burst strength, and the like. Usually, maximal value of this seal strength is maximum seal strength $S_M$. With regard to the present embodiment, in one aspect (first aspect) of the present embodiment, when heat seal is performed under conditions of a temperature of 190° C. and a pressure of 0.5 MPa for 3 seconds, maximum seal strength $S_M$ is 35 N/15 mm or more, preferably 40 N/15 mm or more, and more preferably 50 N/15 mm or more.

In the graph of FIG. 3, over the displacement resulting in the above maximal value, the seal strength gradually stabilizes. In the present specification, the region in which seal strength in the above graph has stabilized is referred to as stable range. The stable range is defined as a range in which variation of seal strength in the measurement is ±3 N/15 mm or less, and that has a length of 5 mm or more. In the first aspect of the present embodiment, when the stable range is present in the above graph, the packaging material 10 satisfies the following requirement (1).

(1) When heat seal is performed under conditions of a temperature of 190° C. and a pressure of 0.5 MPa for 3 seconds, a ratio $S_S/S_M$ of seal strength $S_S$ in the above stable range to maximum seal strength $S_M$ is 0.3 or more.

The above ratio $S_S/S_M$ is preferably 0.5 or more, and more preferably 0.6 or more. As a result of the fact that the maximum seal strength $S_M$ is 35 N/15 mm or more, and in addition, the ratio $S_S/S_M$ is 0.3 or more, it is possible to maintain the insulating properties after degassing heat sealing sufficiently. Note that seal strength $S_S$ is an average value of seal strength in the above stable range.

Figure 4:
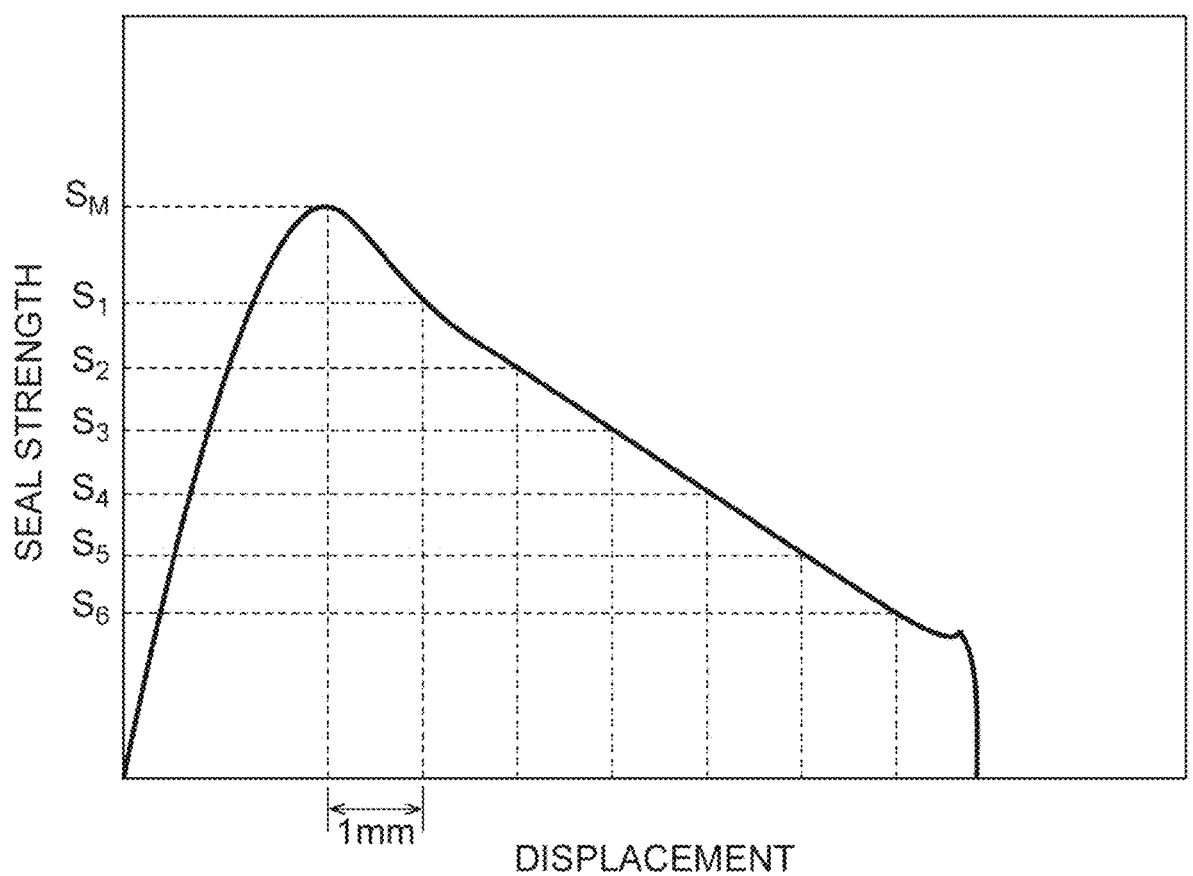
FIG. 4 is a graph showing another example of measurement results obtained by continuously measuring seal strength of an adhered portion in the packaging material from one end the adhered portion to the other end and showing the relationship between a displacement starting at the one end of the adhered portion and the seal strength.

On the other hand, in the graph of FIG. 3, the measurement results in the case where the stable range is present are mentioned as examples; however, there may be a case where the stable range is not present. FIG. 4 is a graph showing another example of measurement results obtained by continuously measuring seal strength of an adhered portion in the packaging material from one end the adhered portion to the other end, in which the graph shows the relationship between a displacement resulting from peeling away from an end of the adhered portion and the seal strength. In the graph of FIG. 4, a stable range is not present after a displacement resulting in the maximal value of seal strength. In the first aspect of the present embodiment, when a stable range is not present in the graph showing the measurement results of seal strength, packaging material 10 satisfies the following requirement (2).

(2) When heat seal is performed under conditions of a temperature of 190° C. and a pressure of 0.5 MPa for 3 seconds, a ratio $S_A/S_M$ of average seal strength $S_A$ from the displacement resulting in the above maximal value to displacement ending at the above other end to maximum seal strength $S_M$ is 0.3 or more.

The above ratio $S_A/S_M$ is preferably 0.5 or more, and more preferably 0.6 or more. As a result of the fact that the maximum seal strength $S_M$ is 35 N/15 mm or more, and in addition, the ratio $S_A/S_M$ is 0.3 or more, it is possible to maintain the insulating properties after degassing heat sealing in a sufficient manner. The average seal strength $S_A$ is determined by measuring seal strengths per mm in displacements after the displacement resulting in the above maximal value (for example, seal strengths $S_1$, $S_2$, $S_3$, $S_4$, $S_5$ and $S_6$ in the graph of FIG. 4), and calculating the average value of these seal strengths.

In the first aspect of the present embodiment, a stable range may be present in the above graph as in FIG. 3, and may not present as in FIG. 4. It is preferable that a stable range is present in the above graph. When the above stable range is present in the graph, the packaging material 10 satisfies the above requirement (1), and when the above stable range is not present in the graph, the packaging material 10 satisfies the above requirement (2).

Usually, improvement in seal strength due to heat sealing of the packaging material 10 means improvements both in seal strength $S_M$ and in seal strength $S_S$ or seal strength $S_A$. In this regard, in particular, the value of the maximum seal strength $S_M$ also changes depending on the size and the strength of the sealant-fused portion $16_M$ formed on an end of the adhered portion. Therefore, the value of maximum seal strength $S_M$ also changes depending on, for example, melt flow rate (MFR), degree of crystallinity, thickness, and the like of the sealant layer 16, and also changes depending on the conditions of heat seal (temperature, pressure, hour). By controlling maximum seal strength $S_M$ with respect to seal strengths $S_S$ and $S_A$, it is also possible to control the above ratio $S_S/S_M$ and the above ratio $S_A/S_M$.

(II) Second Aspect

Figure 5A:
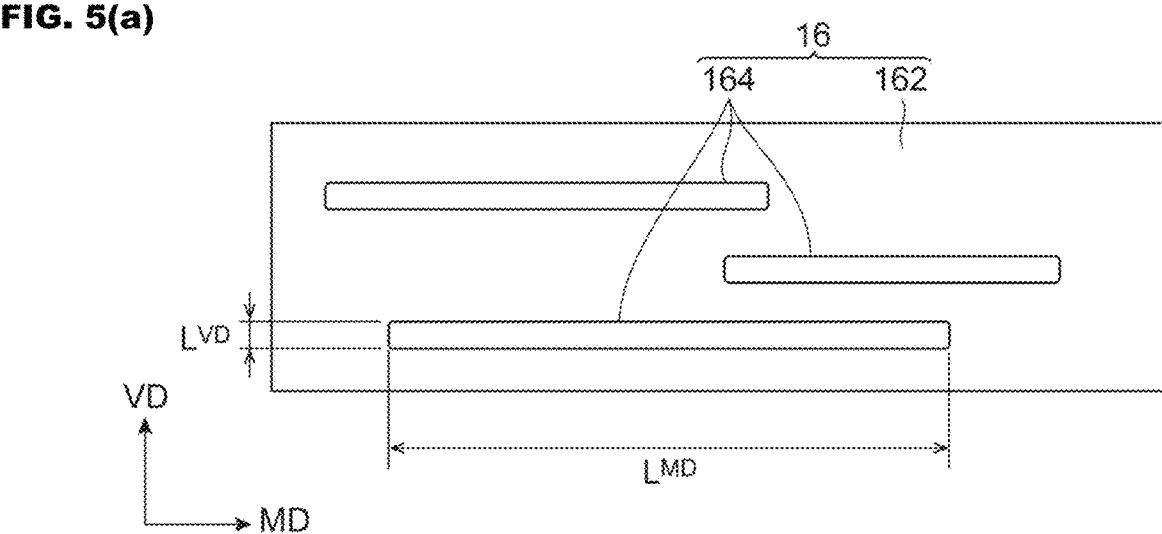
FIGS. 5(a)-5(b) are enlarged cross-sectional views schematically showing the cross-sectional structure of a face along a through-thickness direction and a MD direction with respect to the sealant layer in a packaging material for a power storage device according to one embodiment of the present invention, in which (a) is the figure before heating at 190° C. for 30 seconds, and (b) is the figure after heating at 190° C. for 30 seconds heating.
Figure 5B:
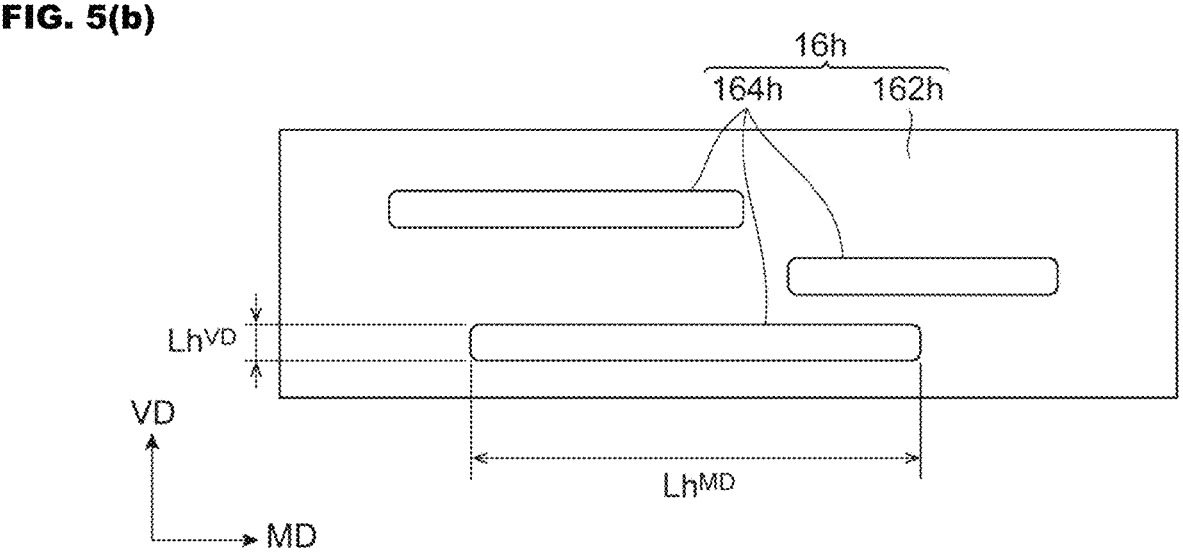

FIGS. 5(a)-5(b) are enlarged cross-sectional views schematically showing the cross-sectional structure of a face along a VD direction and MD direction with respect to the sealant layer in a packaging material for a power storage device according to another aspect (second aspect) of the present embodiment, in which FIG. 5(a) is the figure before heating at 190° C. for 30 seconds, and FIG. 5(b) is the figure after heating at 190° C. for 30 seconds. The MD direction is a direction of flow in the formation of the sealant layer, and corresponds to a so-called Machine direction. Also, the VD direction illustrates a through-thickness direction with respect to the sealant layer 16 (or a direction of stacking the packaging material 10), and is vertical to a surface of the sealant layer including the MD direction. Note that a direction vertical to the MD direction and the VD direction is sometimes referred to as TD direction, and this TD direction corresponds to a so-called Transverse direction. The face along the MD direction and the TD direction is parallel to a face of the sealant layer, and is vertical to a face along the VD direction and the MD direction.

In FIG. 5 (a), the sealant layer 16 has an existing region 162 of polypropylene-based resin (A), and a plurality of existing regions 164 of incompatible component (B) surrounded by the above polypropylene-based resin (A). The existing region 164 of the (B) component has a needle-like shape longer in the MD direction and shorter in the VD direction of the sealant layer 16. In FIG. 5 (a), the length $L^{MD}$ toward the MD direction with respect to the existing region 164 of the (B) component is significantly greater than the length $L^{VD}$ toward the VD direction. The above shape of the existing region 164 of the (B) component is resulted from the method used for forming the sealant layer 16. The sealant layer 16 is formed, for example, by continuously feeding a dry-blended and melted resin composition for the formation of the sealant layer, and transferring or laminating this resin composition, or the like. When a thin layer such as the sealant layer is formed, each of the materials in the resin composition constitutes a sealant layer in a state thinly stretched toward the MD direction. The formation speed (processing speed) of the sealant layer 16 can be, in view of productivity, for example, 80 μm/min or more. When the formation speed of the sealant layer 16 is at or above a certain level in this way, the state of each of the materials being stretched toward MD direction is more remarkable. When the (B) component dispersed in the (A) component is thinly stretched toward a MD direction in the formation of the sealant layer 16, in a cross-section along the MD direction and TD direction, the (B) component is, for example, in the form of a plurality ellipses, and these ellipses is present so that these ellipses overlie one another in the VD direction. Then, in a cross-section along the VD direction and the MD direction with respect to sealant layer 16, the (B) component appears in the form of a region 164, as shown in FIG. 5 (a), with the needle-like shape as described above.

The average length $LA^{MD}$ toward the MD direction with respect to the existing region 164 of the (B) component can be, for example, 2.0 to 20.0 μm, and may be 3.0 to 15.0 μm. Also, the average length $LA^{VD}$ toward the VD direction with respect to the existing region 164 of the (B) component can be, for example, 0.1 to 1.0 μm. Note that the average lengths $LA^{MD}$ and $LA^{VD}$ of the existing region 164 of the (B) component is an average value obtained by observing a cross-section along the VD direction and the MD direction with respect to sealant layer 16 using a scanning electron microscope (SEM) and the like with a magnification factor of approximately 3000×, and measuring lengths $L^{MD}$ and $L^{VD}$ of 10 or more of the arbitrarily selected existing regions 164.

The ratio ($LA^{MD}/LA^{VD}$) of an average length $LA^{MD}$, toward the MD direction, of the existing region 164 of the (B) component to an average length $LA^{VD}$ toward VD direction can be 10.0 or more, and may be 20.0 or more. The fact that the average length of the existing region 164 of the (B) component satisfies the above ratio means that sufficient productivity is ensured in the formation of the sealant layer 16.

The shape of the (B) component stretched as described above tends to deform to approximate a spherical shape by heating. In other words, when heated, the existing region of the (B) component having the needle-like shape in a cross-section along the VD direction and the MD direction tends to deform to be shorter in the MD direction, and to deform to be longer in the VD direction. In other words, the existing region of the (B) component can be said to be shrank in the MD direction. In FIG. 5 (b), the sealant layer 16h illustrates the sealant layer after heating at 190° C. for 30 seconds. The sealant layer 16h after heating has an existing region 162h of polypropylene-based resin (A) after heating, and a plurality of existing regions 164h of the incompatible component (B) after heating surrounded by the above polypropylene-based resin (A). The existing region 164h of the (B) component is smaller in the MD direction than the existing region 164 before heating, and larger in the VD direction.

In a packaging material for a power storage device 10 according to the second aspect of the present embodiment, the sealant layer 16 includes a low shrinkage sealant layer with a small degree of the above deformation and shrinkage. In the low shrinkage sealant layer, as shown in FIG. 5 (b), length $Lh^{MD}$, toward the MD direction, of an existing region 164h of the (B) component after heating is smaller than length $L^{MD}$ before heating, but the degree of shrinkage is small. Specifically, in the above low shrinkage sealant layer, a ratio ($LAh^{MD}/LA^{MD}$) of the average length $LAh^{MD}$, toward the MD direction, of the existing region of the (B) component after heating in a cross-section along the VD direction and the MD direction to the average length $LAh^{MD}$, toward the MD direction, of the existing region of the (B) component before heating in a cross-section along the VD direction and the MD direction is 0.20 or more, preferably 0.30 or more, and more preferably 0.35 or more. This ratio ($LAh^{MD}/LA^{MD}$) is sometimes merely referred to as shrinkage ratio. When the shrinkage ratio is 0.20 or more, the adhesion strength of the interface of sea-island structure configured by the (A) component and the (B) component is high, and even when the electrolytic solution bubbles, voids tend not to occur in the above interface, and it is possible to suppress decrease in insulating properties after degassing heat sealing.

The average length $LAh^{MD}$ toward the MD direction with respect to an existing region 164h of (B) component after heating in the above low shrinkage sealant layer can be, for example, 1.0 to 20.0 μm, and may be 2.0 to 15.0 μm. Also, the average length $LAh^{VD}$ toward the VD direction with respect to an existing region 164h of (B) component after heating can be, for example, 0.1 to 2.0 μm. Note that the average lengths of the existing region 164h of (B) component after heating, $LAh^{MD}$ and $LAh^{VD}$, are average values obtained by observing a cross-section along the VD direction and the MD direction of the sealant layer 16h after heating using a scanning electron microscope (SEM) and the like with a magnification factor of approximately 3000×, and measuring lengths $Lh^{MD}$ and $Lh^{VD}$ of 10 or more of the arbitrarily selected existing regions 164h.

It is preferable that the ratio ($LAh^{MD}/LAh^{VD}$) of the average length $LAh^{MD}$ toward the MD direction to the average length $LAh^{VD}$ toward VD direction with respect to the existing region 164h of (B) component after heating in the above low shrinkage sealant layer be 2.50 or more, it is more preferable that this ratio ($LAh^{MD}/LAh^{VD}$) be 3.00 or more, and it is further preferable that this ratio ($LAh^{MD}/LAh^{MD)}$ be 5.00 or more. This ratio ($LAh^{MD}/LAh^{VD}$) is sometimes merely referred to as width-to-height ratio or aspect ratio. The fact that the average length of the existing region 164 of the (B) component after heating satisfies the above ratio means that the shape of the (B) component stretched in the formation of the sealant layer is maintained after heating, and adhesion strength of the interface of sea-island structure is high, and as a result of this, even when the electrolytic solution bubbles, voids tend not to occur in the above interface, and it tends to enable suppressing decrease in insulating properties after degassing heat sealing further.

Each of the layers constituting the packaging material 10 will be specifically illustrated below.

<Substrate Layer 11>

The substrate layer 11 is provided for the purpose of imparting heat resistance in a sealing step in the production of a power storage device, and achieving the solution to pinholes that can be occurred during the processing or the distribution, and it is preferable to use a resin layer having insulation properties. As such a resin layer, for example, it is possible to use a stretched or unstretched film such as a polyester film, a polyamide film, a polypropylene film, as a single layer, or as a multi-layered film in which two or more thereof are laminated. It is also possible to use a co-extruded multilayered stretched film prepared by the coextrusion of a polyethylene terephthalate film (PET) and a nylon film (Ny) by using an adhesive resin followed by subjecting to stretching treatment.

The substrate layer 11 may be disposed by directly applying the substrate layer 11 on a metallic foil layer 13 described below. In this case, a first adhesive layer 12 described below is not required. As a method for forming the substrate layer by application, it is possible to employ a method for conducting the application of a coating solution of a resin such as an urethane resin, an acrylic resin and a polyester resin, and conducting the curing by ultraviolet irradiation, heating at elevated temperatures, aging (curing) treatment and the like. The application method is not limited in particular, and it is possible to employ a variety of processes such as gravure coating, reverse coating, roll coating and bar coating.

It is preferable that the thickness of the substrate layer 11 be 3 to 40 μm, and it is more preferable that this thickness be 5 to 25 μm. As a result of the fact that the thickness of the substrate layer 11 is 3 μm or more, it tends to enable improvement in pinhole resistance and insulation properties of the packaging material for a power storage device 10.

<First Adhesive Layer 12>

The first adhesive layer 12 is a layer for adhering the substrate layer 11 to the metallic foil layer 13. Specific examples of materials constituting the first adhesive layer 12 include polyurethane resins prepared by reacting a base material such as polyester polyol, polyether polyol, acrylic polyol and carbonate polyol with a bifunctional or higher isocyanate compound.

Depending on functions and performance required for the packaging material, a variety of the polyols described above can be used alone, or used as a combination of two or more thereof.

Also, depending on performance required for the adhesive, it is also possible to formulate a variety of other additives and stabilizers into the above-described polyurethane resin.

Although the thickness of the first adhesive layer 12 is not limited in particular, it is preferable that the thickness of the first adhesive layer 12 be, for example, 1 to 10 μm, and it is more preferable that this thickness be 3 to 7 μm in view of achieving desired adhesive strength, conformability, processability and the like.

<Metallic Foil Layer 13>

The metallic foil layer 13 has steam barrier properties that prevent infiltration of moisture into the interior of the power storage device. Also, the metallic foil layer 13 has ductility for conducting deep drawing molding. As the metallic foil layer 13, it is possible to use a variety of metallic foils such as aluminum, stainless steel and copper, and in view of mass (specific gravity), moisture proofing, processability and cost, an aluminum foil is preferable.

As the aluminum foil, in view of the impartment of ductility in desired molding, it is possible to preferably use, in particular, a soft aluminum foil subjected to annealing treatment; however, for the purpose of the impartment of further pinhole resistance, and ductility in molding, it is more preferable to use an aluminum foil including iron. It is preferable that the content of iron in the aluminum foil be 0.1 to 9.0% by mass per 100% by mass of the aluminum foil, and it is more preferable that this content be 0.5 to 2.0% by mass. As a result of the fact that the content of iron is 0.1% by mass or more, it is possible to obtain a packaging material 10 having better pinhole resistance and ductility. As a result of the fact that the content of iron is 9.0% by mass or less, it is possible to obtain a packaging material 10 having better flexibility.

Although the thickness of the metallic foil layer 13 is not limited in particular, it is preferable that the thickness of the metallic foil layer 13 be 9 to 200 μm in view of barrier properties, pinhole resistance and processability, and it is more preferable that this thickness be 15 to 100 μm.

When an aluminum foil is used as the metallic foil layer 13, as an aluminum foil, it is possible to use an untreated aluminum foil; however, it is preferable to use an aluminum foil subjected to degreasing treatment in view of the impartment of electrolytic solution resistance.

Note that, when the aluminum foil is subjected to the degreasing treatment, the degreasing treatment may be conducted on only one face of the aluminum foil, or both faces of the aluminum foil.

<Anti-Corrosion Treatment Layer 14>

The anti-corrosion treatment layer 14 is a layer that is disposed in order to prevent the corrosion of the metallic foil layer 13 by hydrofluoric acid generated from the reaction of the electrolytic solution or electrolytic solution with moisture. The anti-corrosion treatment layer 14 is formed, for example, by degreasing treatment, hydrothermal metamorphism treatment, positive electrode oxidizing treatment, chemical conversion treatment, or combination thereof.

Examples of the degreasing treatment include acid degreasing or alkali degreasing. Examples of the acid degreasing include methods in which an inorganic acid such as sulphuric acid, nitric acid, hydrochloric acid and hydrofluoric acid alone, or a solution of mixture thereof are used. Also, by using, as acid degreasing, an acid degreasing agent prepared by dissolving a fluorine-containing compound such as ammonium monosodium bifluoride with the above inorganic acid, and particularly in the case where an aluminum foil is used as the metallic foil layer 13, not only degreasing effect from aluminum is obtained, but also a fluoride of aluminum in the passivated form can be formed, and therefore, this is effective in view of hydrofluoric acid resistance. Examples of the alkali degreasing include methods using sodium hydroxide and the like.

Examples of the hydrothermal metamorphism treatment include boehmite treatment in which an aluminum foil is subjected to immersion treatment in boiled water with addition of triethanolamine.

Examples of the positive electrode oxidizing treatment include alumite treatment.

Examples of the chemical conversion treatment include chemical conversion treatment of a dipping type and chemical conversion treatment of an application type. Examples of the chemical conversion treatment of the dipping type include chromate treatment, zirconium treatment, titanium treatment, vanadium treatment, molybdenum treatment, calcium phosphate treatment, strontium hydroxide treatment, cerium treatment, ruthenium treatment, or a variety of chemical conversion treatment consisting of mixed phase thereof. On the other hand, examples of the chemical conversion treatment of the application type include a method for applying a coating agent having anti-corrosion performance on the metallic foil layer 13.

Among the anti-corrosion treatment, in the case where at least a portion of the anti-corrosion treatment layer is formed by any of the hydrothermal metamorphism treatment, the positive electrode oxidizing treatment, the chemical conversion treatment, it is preferable to conduct the above-described degreasing treatment in advance. Note that when a metallic foil that has been subjected to the degreasing treatment such as a metallic foil underwent the annealing step is used as the metallic foil layer 13, there is no need to conduct the degreasing treatment again in the formation of the anti-corrosion treatment layer 14.

The coating agent for use in the chemical conversion treatment of the application type preferably contains trivalent chrome. Also, at least one polymer selected from the group consisting of a cationic polymer and an anionic polymer that are described below may be included in the coating agent.

Also, among the above treatment, particularly with regard to the hydrothermal metamorphism treatment and the positive electrode oxidizing treatment, a surface of an aluminum foil is dissolved with a treating agent to form an aluminum compound (boehmite, alumite) excellent in corrosion resistance. As a result of this, a co-continuous structure from the metallic foil layer 13 using the aluminum foil up to the anti-corrosion treatment layer 14 forms, and therefore, the above treatment is encompassed in the definition of the chemical conversion treatment. On the other hand, it is also possible to form the anti-corrosion treatment layer 14 only by a simple coating approach that is not encompassed in the definition of the chemical conversion treatment as described below. Examples of this method include a method in which a sol of a rare earth element oxide such as cerium oxide with an average particle size of 100 nm or less is used as a material having anti-corrosion effect (inhibitor effect) due to aluminum, and being suitable with regard to an environmental aspect. By means of this method, it is possible to impart the anti-corrosion effect to a metallic foil such as an aluminum foil, even by a typical coating.

Examples of the above sol of the rare earth element oxide include sols obtained by using a variety of solvents such as water-based solvents, alcohol-based solvents, hydrocarbon-based solvents, ketone-based solvents, ester-based solvents and ether-based solvents. Among these, a water-based sol is preferable.

In the above sol of the rare earth element oxide, usually in order to stabilize the dispersion of the sol, inorganic acids such as nitric acid, hydrochloric acid and phosphoric acid, or salts thereof, and organic acids such as acetic acid, malic acid, ascorbic acid and lactic acid are used as dispersion stabilizing agents. Among these dispersion stabilizing agents, in particular, phosphoric acid is expected to, in the packaging material 10, (1) provide the stabilization of sol dispersion, (2) improve the adhesiveness to the metallic foil layer 13 by means of aluminum chelating ability of phosphoric acid, (3) impart the electrolytic solution resistance by trapping aluminum ions eluted under the influence of hydrofluoric acid (formation of passivated form), (4) improve the aggregation force of anti-corrosion treatment layer 14 (oxide layer) due to the fact that it tends to occur dehydration condensation of phosphoric acid at low temperatures, and the like.

Examples of the above phosphoric acid or a salt thereof include orthophosphoric acid, pyrophosphoric acid, metaphosphoric acid, or alkali metal salts and ammonium salts thereof. Among these, in order to express functions in the packaging material 10, condensed phosphoric acids such as trimetaphosphoric acid, tetrametaphosphoric acid, hexametaphosphoric acid and ultrametaphosphoric acid, or alkali metal salts and ammonium salts thereof are preferable. Also, in view of dry film formability (drying ability, heat quantity) when the anti-corrosion treatment layer 14 consisting of the rare earth element oxide is formed by a variety of coating processes using the above sol of the rare earth element oxide, sodium salts are more preferable due to the dehydration condensation ability of sodium salts at low temperatures. As phosphates, water soluble salts are preferable.

It is preferable that the mixing ratio of phosphoric acid (or a salt thereof) to the rare earth element oxide be 1 to 100 parts by mass per 100 parts by mass of the rare earth element oxide. When the above mixing ratio is 1 part by mass or more per 100 parts by mass of the rare earth element oxide, the sol of the rare earth element oxide become more stable, and the function of the packaging material 10 become better. It is more preferable that the above mixing ratio be 5 parts by mass or more per 100 parts by mass of the rare earth element oxide. Also, when the above mixing ratio is 100 parts by mass or less per 100 parts by mass of the rare earth element oxide, the function of the sol of the rare earth element oxide enhances, and the sol of the rare earth element oxide has good performance with regard to prevention of corrosion of the electrolytic solution. It is more preferable that the above mixing ratio be 50 parts by mass or less per 100 parts by mass of the rare earth element oxide, and it is further preferable that the above mixing ratio be 20 parts by mass or less.

The anti-corrosion treatment layer 14 formed by the above sol of the rare earth element oxide is an aggregate of inorganic particles, and therefore, even after undergoing a dry curing step, the aggregation force of this layer itself may be small. Therefore, it is preferable that the anti-corrosion treatment layer 14 in this case have been set to form a composite with the following anionic polymer or cationic polymer in order to supplement the aggregation force.

Examples of the anionic polymer include polymers having a carboxy group, such as poly(meth)acrylic acid (or a salt thereof), or a copolymer obtained by copolymerization of poly(meth)acrylic acids as a main component. Examples of the copolymerized components in this copolymer include alkyl (meth)acrylate-based monomer (as the alkyl group, methyl group, ethyl group, n-propyl group, i-propyl group, n-butyl group, i-butyl group, t-butyl group, 2-ethylhexyl group, cyclohexyl group, and the like); amide group-containing monomers such as (meth)acrylamide, N-alkyl (meth) acrylamide, N,N-dialkyl (meth)acrylamide (as the alkyl group, methyl group, ethyl group, n-propyl group, i-propyl group, n-butyl group, i-butyl group, t-butyl group, 2-ethylhexyl group, cyclohexyl group and the like), N-alkoxy (meth)acrylamide, N,N-dialkoxy(meth)acrylamide (as the alkoxy group, methoxy group, ethoxy group, butoxy group, isobutoxy group, and the like), N-methylol (meth)acrylamide, and N-phenyl(meth)acrylamide; hydroxy group-containing monomers such as 2-hydroxyethyl(meth)acrylate and 2-hydroxypropyl(meth)acrylate; glycidyl group-containing monomers such as glycidyl(meth)acrylate and allyl glycidylether; silane-containing monomers such as (meth) acryloxypropyltrimethoxysilane, (meth)acryloxypropyltriethoxysilane; and isocyanate group-containing monomers such as (meth)acryloxypropylisocyanate.

These anionic polymers play a role in improving the stability of the anti-corrosion treatment layer 14 (oxide layer) obtained by using the sol of the rare earth element oxide. This role is accomplished by the effect of protecting a hard but brittle oxide layer with an acrylic-based resin component, and the effect of trapping (cation trapping) an ion contaminant (in particular, a sodium ion) derived from a phosphate included in the sol of the rare earth element oxide. In short, when alkali metal ions and alkali earth metal ions such as sodium ions in particular are included in the anti-corrosion treatment layer 14 obtained by using the sol of the rare earth element oxide, the anti-corrosion treatment layer 14 tends to degrade with a site including these ions as an origin of the degradation. As a result of this, the resistance of the anti-corrosion treatment layer 14 enhances by immobilizing sodium ions and the like included in the sol of the rare earth element oxide due to the anionic polymer.

The anti-corrosion treatment layer 14 in which the anionic polymer and the sol of the rare earth element oxide are combined has anti-corrosion performance equivalent to that of an anti-corrosion treatment layer 14 formed by subjecting an aluminum foil to chromate treatment. It is preferable that the anionic polymer have a structure in which polyanionic polymers, which are essentially water-soluble, are crosslinked. Examples of the crosslinking agent for forming this structure include compounds having an isocyanate group, a glycidyl group, a carboxy group, and an oxazoline group.

Examples of the compound having an isocyanate include diisocyanates such as tolylenediisocyanate, xylylene diisocyanate or hydrogenation products thereof, hexamethylenediisocyanate, 4,4' diphenylmethanediisocyanate or hydrogenation products thereof, and isophoronediisocyanate; or polyisocyanates such as adducts prepared by reacting these isocyanates with polyhydric alcohols such as trimethylolpropane, biurets obtained by reacting these isocyanates with water, or trimeric isocyanurates; or blocked polyisocyanates prepared by blocking these polyisocyanates with alcohols, lactams, oximes and the like.

Examples of the compound having a glycidyl group include epoxy compounds obtained by reacting glycols such as ethylene glycol, diethylene glycol, triethylene glycol, polyethylene glycol, propylene glycol, dipropylene glycol, tripropylene glycol, polypropylene glycol, 1,4-butanediol, 1,6-hexanediol and neopentylglycol with epichlorohydrin; epoxy compounds obtained by reacting polyhydric alcohols such as glycerin, polyglycerin, trimethylolpropane, pentaerythritol and sorbitol with epichlorohydrin; and epoxy compounds obtained by reacting dicarboxylic acids such as phthalic acid, terephthalic acid, oxalic acid and adipic acid with epichlorohydrin.

Examples of the compound having a carboxy group include a variety of aliphatic or aromatic dicarboxylic acids. Also, it is possible to use poly(meth)acrylic acids and alkali (earth) metal salts of poly(meth)acrylic acids.

Examples of the compound having an oxazoline group include low molecular compounds having two or more oxazoline units, or when using polymerizable monomers such as isopropenyl oxazoline, compounds copolymerized with acrylic-based monomers such as (meth)acrylic acid, alkyl (meth)acrylate esters and hydroxyalkyl (meth)acrylate.

Also, it is possible to react an anionic polymer and a silane coupling agent, more specifically, selectively react a carboxy group of the anionic polymer and a functional group of the silane coupling agent to achieve a crosslinking point as a siloxane bond. In this case, it is possible to use γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane, γ-isocyanatopropyltriethoxysilane, and the like. Among these, in view of reactivity with an anionic polymer or a copolymer thereof in particular, epoxy silane, aminosilane and isocyanate silane are preferable.

It is preferable that the ratio of these crosslinking agents to the anionic polymer be 1 to 50 parts by mass per 100 parts by mass of the anionic polymer, and it is more preferable that this ratio be 10 to 20 parts by mass. When this ratio of the crosslinking agent is 1 part by mass or more per 100 parts by mass of the anionic polymer, the crosslinked structure tends to be formed satisfactorily. When the ratio of the crosslinking agent is 50 parts by mass or less per 100 parts by mass of the anionic polymer, pot life of the coating solution increases.

The process for crosslinking the anionic polymers is not limited to the above crosslinking agent, and may be a process for forming crosslinking of ions by using titanium or a zirconium compound.

Examples of the cationic polymer include polymers having an amine, and examples of the polymers having an amine include polyethyleneimine, ionic macromolecular complex consisting of polyethyleneimine and polymers having a carboxylic acid, primary amine grafted acrylic resins obtained by grafting a primary amine onto an acrylic main backbone, polyallylamine, or derivatives thereof, and cationic polymers such as aminophenol. Examples of the polyallylamine include homopolymers or copolymers of allylamines, allylamine amidosulfates, diallylamines, and dimethylallylamines. These amines can be free amines, or can be those stabilized by acetic acid or hydrochloric acid. Also, as the copolymerized components, it is possible to use maleic acid, sulfur dioxide, and the like. In addition, it is possible to use amines imparted with heat crosslinking ability by subjecting primary amine to partial methoxylation, and it is also possible to use aminophenol. In particular, allylamine or derivatives thereof is preferable.

It is preferable to use the cationic polymer in combination with a crosslinking agent having a functional group reactive with amine/imine such as a carboxy group and a glycidyl group. As the crosslinking agent used in combination with the cationic polymer, it is possible to use polymers having a carboxylic acid that forms ionic macromolecular complex with polyethyleneimine, and examples of these polymers include polycarboxylic acids (salts) such as polyacrylic acids or ionic salts thereof, or copolymers prepared by introducing comonomers in these polycarboxylic acids (salts), and polysaccharides having a carboxy group such as carboxymethyl cellulose or ionic salts thereof.

In the present embodiment, the cationic polymer is described as one constituent constituting the anti-corrosion treatment layer 14. The reason is that, as a result of diligent studies that have been made by means of various compounds in order to impart electrolytic solution resistance and hydrofluoric acid resistance required for a packaging material for a power storage device, it has been found that the cationic polymer itself is a compound that can impart electrolytic solution resistance and hydrofluoric acid resistance. The factor contributing to this is speculated to be the fact that damage of the aluminum foil is suppressed by trapping fluorine ions with cationic groups (anion trap).

The cationic polymer is more preferable material in view of improvement in adhesiveness. Also, the cationic polymer is water soluble in a manner analogous to the above anionic polymer, and it is therefore more preferable to form a crosslinked structure in the cationic polymer to impart water resistance to the cationic polymer. As a crosslinking agent for forming a crosslinked structure in the cationic polymer, it is possible to use the crosslinking agents illustrated in the section with regard to the anionic polymer. When the sol of the rare earth element oxide is used as the anti-corrosion treatment layer 14, the cationic polymer can be used as a protective layer of the anti-corrosion treatment layer 14, instead of using the above anionic polymer.

The anti-corrosion treatment layer resulting from the chemical conversion treatment represented by the chromate treatment is obtained by, in order to form an inclined structure in relation to the aluminum foil, treating an aluminum foil with a chemical conversion treating agent to which phosphoric acid, hydrofluoric acid, hydrochloric acid, nitric acid, sulphuric acid or salts thereof is mixed in particular, followed by reacting the aluminum foil with chromium-based or non-chromium-based compound to form a chemical conversion-treated layer on the aluminum foil. However, the above chemical conversion treatment uses acids as chemical conversion treating agents, and as a result of this, involves degradation of working conditions or corrosion in the coating device. On the other hand, in contrast to chemical conversion treatment represented by the chromate treatment, the above-described anti-corrosion treatment layer 14 of a coating type is not required to form an inclined structure in relation to the metallic foil layer 13 using the aluminum foil. Therefore, the nature of the coating agent is not limited with regard to acidic properties, alkaline properties, neutral properties and the like, and it is possible to accomplish good working conditions. In addition, due to the fact that alternative solution to the chromate treatment using a chromium compound is demanded in view of environmental sanitation, the anti-corrosion treatment layer 14 of the coating type is preferable.

In view of the content of the above description, combination examples of the above-described anti-corrosion treatment of the coating type include (1) the sol of the rare earth element oxide alone, (2) the anionic polymer alone, (3) the cationic polymer alone, (4) the sol of the rare earth element oxide+the anionic polymer (the formation of a composite by laminating), (5) the sol of the rare earth element oxide+the cationic polymer (the formation of a composite by laminating), (6) (the sol of the rare earth element oxide+the anionic polymer: the formation of a composite by laminating)/the cationic polymer (multilayering), (7) (the sol of the rare earth element oxide+the cationic polymer: the formation of a composite by laminating)/the anionic polymer (multilayering). Among these, (1) and (4) to (7) are preferable, (4) to (7) are particularly preferable. In this regard, the present embodiment is not limited to the above combinations. For example, as examples of the selection of anti-corrosion treatment, the cationic polymer is a very preferable material in view of the fact that the cationic polymer has good adhesiveness to a modified polyolefin resin illustrated in the description of the second adhesive layer or the sealant layer described below, and therefore, in a case where the second adhesive layer or sealant layer is configured with the modified polyolefin resin, it is possible to accomplish a design such that the cationic polymer is disposed on a face in contact with the second adhesive layer or the sealant layer (for example, a configuration such as configurations (5) and (6)).

Also, the anti-corrosion treatment layer 14 is not limited to the above-described layers. For example, in a manner analogous to as in chromate of an application type of known technology, it is possible to form the anti-corrosion treatment layer 14 by using a treating agent prepared by mixing phosphoric acid and a chromium compound into a resin binder (such as aminophenol). By means of this treating agent, it is possible to provide a layer with both anti-corrosion function and adhesiveness. Also, although stability of the coating solution has to be taken into consideration, by means of a coating agent in which a sol of a rare earth element oxide and an polycationic polymer or polyanionic polymer have been set to be a one-component in advance, it is possible to provide a layer with both the anti-corrosion function and the adhesiveness.

In either a multilayered structure or a single-layered structure, it is preferable that the mass of the anti-corrosion treatment layer 14 per unit area be 0.005 to 0.200 g/m$^2$, and it is more preferable that this mass be 0.010 to 0.100 g/m$^2$. When the above-described mass per unit area is 0.005 g/m$^2$ or more, it is easy to impart the anti-corrosion function to the metallic foil layer 13. Also, even when the above-described mass per unit area is greater than 0.200 g/m$^2$, the anti-corrosion function does not vary to a significant extent. On the other hand, in a case where the sol of the rare earth element oxide is used, curing by heat in drying is insufficient when the coating is thick, and decrease in aggregation force may occur. Note that the thickness of the anti-corrosion treatment layer 14 can be calculated from the specific gravity thereof.

In view of facilitating the adhesiveness between the sealant layer and the metallic foil layer to be retained, preventing the generation of a source of bubbling of the electrolytic solution, and further suppressing the decrease in insulating properties after degassing heat sealing, the anti-corrosion treatment layer 14 can be, for example, such that it includes cerium oxide, 1 to 100 parts by mass of phosphoric acid or a phosphate per 100 parts by mass of the cerium oxide, and a cationic polymer, can be such that it is formed by subjecting the metallic foil layer 13 to the chemical conversion treatment, or can be such that it is formed by subjecting the metallic foil layer 13 to the chemical conversion treatment, and includes a cationic polymer.

<Second Adhesive Layer 17>

The second adhesive layer 17 is a layer adhering the metallic foil layer 13 on which the anti-corrosion treatment layer 14 is formed, to the sealant layer 16. It is possible to use typical adhesive for adhering the metallic foil layer to the sealant layer in the second adhesive layer 17.

When the anti-corrosion treatment layer 14 has a layer including at least one polymer selected from the group consisting of the cationic polymers and the anionic polymers described above, it is preferable that the second adhesive layer 17 be a layer including a compound having reactivity with the above polymers included in the anti-corrosion treatment layer 14 (hereinafter, also referred to as "reactive compound").

For example, when the anti-corrosion treatment layer 14 includes a cationic polymer, the second adhesive layer 17 includes a compound having reactivity with the cationic polymer. When the anti-corrosion treatment layer 14 includes an anionic polymer, the second adhesive layer 17 includes a compound having reactivity with the anionic polymer. Also, when the anti-corrosion treatment layer 14 includes a cationic polymer and an anionic polymer, the second adhesive layer 17 includes a compound having reactivity with the cationic polymer, and a compound having reactivity with the anionic polymer. Here, the second adhesive layer 17 does not necessarily have to include the above two compounds, and may include a compound having reactivity with both the cationic polymer and the anionic polymer. Here, "having reactivity" means to form a covalent bond with a cationic polymer or an anionic polymer. Also, the second adhesive layer 17 can further include an acid-modified polyolefin resin.

Examples of the compound having reactivity with a cationic polymer include at least one compound selected from the group consisting of a multifunctional isocyanate compound, a glycidyl compound, a compound having a carboxy group and a compound having an oxazoline group.

Examples of the multifunctional isocyanate compound, the glycidyl compound, the compound having a carboxy group and the compound having an oxazoline group include the multifunctional isocyanate compound, the glycidyl compound, the compound having a carboxy group and the compound having an oxazoline group illustrated above as a crosslinking agent for imparting a crosslinked structure to a cationic polymer. Among these, the multifunctional isocyanate compound is preferable due to the fact that the multifunctional isocyanate compound has high reactivity with the cationic polymer, and can easily form a crosslinked structure.

Examples of the compound having reactivity with an anionic polymer include at least one compound selected from the group consisting of the glycidyl compound and the compound having an oxazoline group. Examples of the glycidyl compound and the compound having an oxazoline group include the glycidyl compound and the compound having an oxazoline group illustrated above as a crosslinking agent for providing a cationic polymer with a crosslinked structure. Among these, the glycidyl compound is preferable due to the fact that glycidyl compound has high reactivity with the anionic polymers.

When the second adhesive layer 17 includes an acid-modified polyolefin resin, it is preferable that the reactive compound also have reactivity with an acidic group in the acid-modified polyolefin resin (in other words, forms a covalent bond with the acidic group). As a result of this, the adhesiveness to the anti-corrosion treatment layer 14 further increases. In addition, the acid-modified polyolefin resin is set to have a crosslinked structure, and the solvent resistance of the packaging material 10 further enhances.

It is preferable that the content of the reactive compound be from the same equivalents to ten times equivalents with respect to the acidic group in the acid-modified polyolefin resin. At equivalents or higher, the reactive compound satisfactorily reacts with the acidic group in the acid-modified polyolefin resin. On the other hand, when greater than the ten times equivalents, the crosslinking reaction with the acid-modified polyolefin resin fully reaches to saturation, and therefore, unreacted materials are present, and decrease in various kinds of performance is concerned. Therefore, bay way of example, it is preferable that the content of the reactive compound be 5 to 20 parts by mass (the ratio by solids content) per 100 parts by mass of the acid-modified polyolefin resin.

The acid-modified polyolefin resin is prepared by introducing an acidic group to a polyolefin resin. Examples of the acidic group include a carboxy group, a sulfonic acid group, and an acid anhydride group, and a maleic acid anhydride group and a (meth)acrylic acid group are particularly preferable. As the acid-modified polyolefin resin, for example, it is possible to use those analogous to that described below as a modified polyolefin resin (a) for use in the first sealant layer 16a.

It is also possible to formulate a variety of additives such as flame retardants, slip agents, anti-blocking agents, anti-oxidants, light stabilizers and tackifiers into the second adhesive layer 17.

In view of suppressing the decrease in laminating strength in the case of involvement of the electrolytic solution, and in view of further suppressing the decrease in insulation properties, the second adhesive layer 17 can include, for example, the acid-modified polyolefin, and at least one curing agent selected from the group consisting of the multifunctional isocyanate compound, the glycidyl compound, the compound having a carboxy group, the compound having an oxazoline group and a carbodiimide compound. Note that examples of the carbodiimide compound include N,N'-di-o-toluyl carbodiimide, N,N'-diphenyl carbodiimide, N,N'-di-2,6-dimethylphenyl carbodiimide, N,N'-bis(2,6-diisopropylphenyl)carbodiimide, N,N'-dioctyldecyl carbodiimide, N-triyl-N'-cyclohexyl carbodiimide, N,N'-di-2,2-di-t-butylphenyl carbodiimide, N-triyl-N'-phenyl carbodiimide, N,N'-di-p-nitrophenyl carbodiimide, N,N'-di-p-aminophenyl carbodiimide, N,N'-di-p-hydroxyphenyl carbodiimide, N,N'-di-cyclohexyl carbodiimide, and N,N'-di-p-toluyl carbodiimide.

Also, as the adhesive forming the second adhesive layer 17, it is also possible to use, for example, a polyurethane-based adhesive prepared by formulating a polyester polyol consisting of a hydrogenated dimeric fatty acid and a diol, and a polyisocyanate.

In view of achieving a desired adhesive strength, processability and the like, it is preferable for the thickness of the second adhesive layer 17 to be, but not limited in particular, 1 to 10 μm, and it is more preferable for the thickness of the second adhesive layer 17 to be 3 to 7 μm.

<Sealant Layer 16>

The sealant layer 16 is a layer imparting sealability resulting from heat seal to the packaging material 10.

(I) First Aspect

The sealant layer 16 of the packaging material in a first aspect of the present embodiment is configured so that the maximum seal strength $S_M$ is 35 N/15 mm or more, and in addition, the ratio $S_S/S_M$ or the ratio $S_A/S_M$ is 0.3 or more, in the graph of FIG. 3 or FIG. 4. Examples with regard to constructing the sealant layer 16 of the packaging material according to the first aspect of the present embodiment will be illustrated below.

The sealant layer 16 includes a polypropylene-based resin (A) and an incompatible component (B) incompatible with the above polypropylene-based resin. The above sealant layer 16 may further include a compatible elastomer (C) compatible with the polypropylene-based resin (A). Hereinafter, optionally, the above polypropylene-based resin (A) may be referred to as "(A) component", the incompatible component (B) incompatible with the above (A) component may be referred to as "(B) component", and the compatible elastomer (C) compatible with the above (A) component may be referred to as "compatible elastomer (C)" or "(C) component", and the like. Here, "not having compatibility with the (A) component", and "incompatible with the (A) component" (incompatible) means to provide dispersion in the polypropylene-based resin constituting the (A) component with a disperse phase size of 200 nm or more and less than 50 μm. Also, "compatible with the (A) component", and "having compatibility with the (A) component" (compatible) means to provide dispersion in the polypropylene-based resin constituting the (A) component with a disperse phase size of 1 nm or more and less than 200 nm.

In the sealant layer 16, it is preferable that the incompatible component (B) contain a compound (B1) having a portion compatible with the polypropylene-based resin (A). Hereinafter, optionally, a compound (B1) having a portion compatible with the above (A) component may be referred to as "compound (B1)" or "(B1) component", and the like. The incompatible component (B) may consist only of the compound (B1).

Due to the fact that sealant layer 16 includes the above (A) component and the above (B) component, a sea-island structure is formed in the sealant layer 16, and it is possible to improve the seal strength after heat seal. Due to the fact that the sealant layer 16 further includes the above (C) component, it is possible to impart flexibility to the sealant layer 16 further. Due to the fact that the sealant layer 16 has flexibility, it is possible to impart functions such as suppression of molding whitening, and it is possible to provide a packaging material having further improved functionalities.

Examples of the sealant layer 16 will be illustrated below.

(Polypropylene-Based Resin (A))

The polypropylene-based resin (A) is a resin obtained from polymerized monomers including propylene. Examples of the polypropylene-based resin (A) include homopolypropylene and random polypropylene. In view of the fundamental performance of the packaging material such as heat seal strength, it is preferable that the polypropylene-based resin (A) be random polypropylene, and it is more preferable that the polypropylene-based resin (A) be a propylene-ethylene random copolymer. The propylene-ethylene random copolymer has excellent heat sealability at low temperatures, and can improve the sealing properties in the case of involvement of the electrolytic solution.

In the propylene-ethylene random copolymer, it is preferable that the content of ethylene be 0.1 to 10% by mass, it is more preferable that the content of ethylene be 1 to 7% by mass, and it is further preferable that the content of ethylene be 2 to 5% by mass. When the content of ethylene is 0.1% by mass or more, the effect of reducing the melting point by copolymerization of ethylene is satisfactorily achieved to enable further improvement in sealing properties in the case of involvement of the electrolytic solution, and in addition, to obtain the impact resistance, and it tends to enable improvement in sealing strength and molding whitening resistance. When the content of ethylene is 10% by mass or less, it tends to enable excessive decrease in melting point to be suppressed, and to enable the generation of too high maximum seal strength $S_M$ to be suppressed (in other words, the ratio $S_S/S_M$ can be higher). Note that the content of ethylene can be calculated from the mixing ratio of the monomers in polymerization.

It is preferable that the melting point of the propylene-ethylene random copolymer be 120 to 145° C., and it is more preferable that the melting point of the propylene-ethylene random copolymer be 125 to 140° C. When this melting point is 120° C. or more, it tends to enable the generation of too high maximum seal strength $S_M$ to be suppressed (in other words, the ratio $S_S/S_M$ can be higher). When the melting point is 145° C. or less, it tends to enable further improvement in sealing properties in the case of involvement of the electrolytic solution.

The propylene-ethylene random copolymer may be acid-modified, and for example, can be an acid-modified propylene-ethylene random copolymer obtained by graft modification with maleic anhydride. By using the acid-modified propylene-ethylene random copolymer, it is possible to retain the adhesiveness to tab leads without a tab sealant.

With regard to the propylene-ethylene random copolymer, it is possible to use one alone, or to use a combination of two or more thereof.

In the sealant layer 16, the content of the (A) component may be 50 to 99% by mass based on the total amount of solids content of the sealant layer 16, may be 50 to 95% by mass, and may be 50 to 85% by mass. As a result of the fact that the content of the (A) component is 50% by mass or more, it is possible to improve the sealing properties by an effect of using the (A) component by nature. Also, it is possible to prevent excessive presence of the (B) component by setting the content of the (A) component to be 50% by mass or more, and therefore, it is possible to suppress the decrease in the heat resistance and the aggregation force of sealant layer 16. On the other hand, due to the fact that inclusion of 1% by mass or more of the (B) component can be achieved by setting the content of the (A) component to be 99% by mass or less, it is possible to improve the seal strength and the insulating properties due to the (B) component.

(Incompatible Component (B))

Examples of the incompatible component (B) include graft copolymers, block copolymers, and random copolymers. These copolymers have a portion incompatible with the (A) component in at least a portion thereof.

It is preferable that the incompatible component (B) contain a compound (B1) having a portion compatible with the polypropylene-based resin (A). In other words, it is preferable that the compound (B) have a portion compatible with the polypropylene-based resin (A), and a portion incompatible with the polypropylene-based resin (A). Due to the fact that the incompatible component (B) contains the compound (B1), it is possible to improve the adhesion strength with regard to the above sea-island interface of the sea-island structure formed by the (A) component and (B) component, the formation of voids associated with bubbling of the electrolytic solution is suppressed, and as a result of this, it is possible to enable further improvement in the insulating properties. Also, as a result of the improvement in the adhesion strength of the sea-island interface resulting from the compound (B1), the above seal strength $S_M$, $S_S$ or $S_A$ can also be improved. Such a compound (B1) can be obtained, for example, in the case where the incompatible component (B) is a graft copolymer or a block copolymer. Examples of the graft copolymer suitable for the compound (B1) include a graft copolymer consisting of a main chain of polyolefin and a side chain of polystyrene, and a graft copolymer consisting of a main chain of polyolefin and a side chain of styrene-acrylonitrile copolymer. As the above graft copolymer, for example, "MODIPER" manufactured by NOF Corporation, and the like are suitable.

Examples of the block copolymer suitable for the compound (B1) include a block copolymer having a block configured by styrene units and a block configured by ethylene-butylene units; a block copolymer having a block configured by styrene units, a block configured by ethylene-butylene units and a block configured by crystalline olefin units; a block copolymer having a block configured by crystalline ethylene units and a block configured by ethylene-butylene units; a block copolymer having a block configured by ethylene and a block configured by ethylene-octene-1; and a block copolymer having a block configured by propylene units and a block configured by ethylene units. For example, the block configured by propylene units is a portion compatible with the above (A) component, and the block configured by ethylene units is a portion incompatible with the above (A) component. As the above block copolymer, for example, "DYNARON" manufactured by JSR, "INTUNE" and "INFUSE" manufactured by DOW, and the like are suitable.

The incompatible component (B) may contain an incompatible elastomer. Examples of the incompatible elastomer include a polyolefin-based elastomers containing α-olefin as comonomers. In particular, by using ethylene-α-olefin copolymers, it tends to enable the impartment of functionalities to the sealant layer 16 without reducing the electrolytic solution laminating strength, or a variety of seal strengths in the case of involvement of the electrolytic solution. As the ethylene-α-olefin copolymer, it is possible to use a compound obtained by copolymerizing at least one α-olefin selected from the group consisting of 1-butene, 1-pentene, 1-hexene, 1-octene and 4-methyl-1-pentene to ethylene, and it is preferably to use an ethylene-butene-1 random copolymer obtained by copolymerizing 1-butene to ethylene. As the ethylene-α-olefin copolymer, "TAFMER" manufactured by Mitsui Chemicals Inc., "EXCELLEN" manufactured by Sumitomo Chemical Company, Limited, and the like are suitable.

By providing a dispersion obtained by dispersing the incompatible component (B) in the polypropylene-based resin (A), and as a result of the use of the dispersion, the sealant layer 16 may contain a polypropylene-based resin (A), and incompatible component (B). Examples of such a dispersion include a dispersion obtained by microdispersing an elastomer in a polypropylene-based resin. As a result of the fact that the sealant layer 16 includes a dispersion obtained by dispersing the incompatible component (B) in the polypropylene-based resin (A) in advance, it tends to enable further improvement in the insulating properties and the seal strength. It is preferable that the incompatible component (B) in the above dispersion contain a graft copolymer or a block copolymer. As a result of the fact that the incompatible component (B) in the dispersion contains a graft copolymer or a block copolymer, it tends to enable further improvement in the adhesiveness of the sea-island interface.

Examples of a dispersion obtained by dispersing the incompatible component (B) in the polypropylene-based resin (A), in which the incompatible component (B) contains a graft copolymer include a dynamically crosslinked (using peroxide) PP-based elastomer (TPV). The dynamically crosslinked PP-based elastomer (TPV) is a dispersion obtained by microdispersing the crosslinked elastomer in polypropylene, in which the crosslinked elastomer is subjected to grafting, and the grafted portion constitutes the interface with polypropylene. In the dynamically crosslinked PP-based elastomer (TPV), polypropylene corresponds to the (A) component, and the grafted elastomer corresponds to the compound (B1). Also, examples of the dispersion obtained by dispersing the incompatible component (B) in the polypropylene-based resin (A) include block polypropylene. Block polypropylene is configured by homopolypropylene, and an ethylene-based elastomer component incompatible with this homopolypropylene. In block polypropylene, homopolypropylene corresponds to the (A) component, and the ethylene-based elastomer component corresponds to the (B) component. In addition, examples of the dispersion obtained by microdispersing an elastomer in a polypropylene-based resin include reactor type TPO. In the reactor type TPO, the polypropylene-based resin corresponds to the (A) component, the elastomer corresponds to the (B) component. As reactor type TPO, for example, "ZELAS" manufactured by Mitsubishi Chemical Corporation, "Catalloy" manufactured by Montell, "WELNEX" manufactured by Japan Polypropylene Corporation and "PRIME TPO" manufactured by Prime Polymer Co., Ltd., and the like are suitable.

As the incompatible component (B), the olefin-based and the styrene-based materials are described above; however, in view of the electrolytic solution resistance, it is preferable that the incompatible component (B) be an olefin-based material.

(Compatible Elastomer (C))

Examples of the compatible elastomer (C) include propylene-α-olefin copolymers. By using the propylene-α-olefin copolymer, it is possible to impart functionalities to the sealant layer 16 without reducing the electrolytic solution laminating strength, or a variety of seal strengths in the case of involvement of the electrolytic solution. As the propylene-α-olefin copolymer, it is possible to use a polymer obtained by copolymerizing α-olefin selected from 1-butene, 1-pentene, 1-hexene, 1-octene and 4-methyl-1-pentene to propylene, and it is preferably possible to use a propylene-butene-1 random copolymer obtained by copolymerizing 1-butene to propylene.

It is preferable that the melting point of the polyolefin-based elastomer be 150° C. or less; however, in view of improving the ratio $S_S/S_M$, suppressing molding whitening, and improving the sealing properties in the case of involvement of the electrolytic solution, it is preferable that the melting point of the polyolefin-based elastomer be 60 to 120° C., and it is more preferable that the melting point of the polyolefin-based elastomer be 65 to 90° C. As a result of the fact that this melting point is 150° C. or less, it is possible to improve the sealing properties in the case of involvement of the electrolytic solution, in particular, the degassing heat sealing strength. Also, when this melting point is 60° C. or more, it is advantageous in view of improving the ratio $S_S/S_M$.

With regard to the polyolefin-based elastomer, it is possible to use one alone, or to use a combination of two or more thereof.

In the sealant layer 16, the content of the (B) component is 1 to 40% by mass based on the total amount of solids content of the sealant layer 16, and it is preferable that the content of the (B) component be 5 to 25% by mass. As a result of the fact that the content of the (B) component is 1% by mass or more, it is possible to impart impact resistance to the sealant layer 16, and it is possible to improve the seal strength and the insulating properties. On the other hand, by setting the content of the (B) component to be 40% by mass or less, it is possible to improve the aggregation force of the entirety of the sealant layer 16, and it is possible to improve the seal strength and the insulating properties. Note that, for the sake of convenience, the dispersion obtained by microdispersing an elastomer in a polypropylene-based resin is described as an incompatible component (B); however, in the above dispersion, the elastomer portion is classified as the (B) component, and the polypropylene-based resin is classified as the above (A) component.

When the sealant layer 16 includes the (C) component, the content of the (C) component in the sealant layer 16 is 5 to 30% by mass based on the total amount of solids content of the sealant layer 16, and it is preferable that this content be 10 to 25% by mass. As a result of the fact that the content of the (C) component is 5% by mass or more, the flexibility of the sealant layer 16 tends to be achieved, and it is possible to impart functions such as suppression of molding whitening, and it is possible to provide a packaging material having further improved functionalities. On the other hand, by setting the content of the (C) component to be 30% by mass or less, it is possible to improve the aggregation force of the entirety of the sealant layer 16, and it is possible to improve the seal strength and the insulating properties.

Also, it is preferable that the ratio of the content of the compatible elastomer (C) to the content of the incompatible component (B) ($M_C/M_B$) be 0.2 to 3.0 based on the mass ratio, and it is more preferable that this ratio be 0.3 to 2.0. As a result of the fact that the ratio of these contents ($M_C/M_B$) is in the above range, it is possible to improve the maximum seal strength $S_M$, and the seal strengths $S_S$, $S_A$ in a balanced manner.

When the incompatible component (B) contains the compound (B1), it is preferable that the content of the compound (B1) in the sealant layer 16 be 1 to 40% by mass based on the total amount of the sealant layer, and it is more preferable that this content be 2 to 25% by mass. As a result of the fact that the content of the (B) component is 1% by mass or more, the adhesion strength of the sea-island interface tends to enhance, and an effect of improving the seal strength and the insulating properties tend to be achieved. On the other hand, by setting the content of the compound (B1) to be 40% by mass or less, it tends to suppress the aggregation force of the entirety of the sealant layer 16 as well as the seal strength and the decrease in insulating properties.

(Components to be Added)

The sealant layer 16 can further include other components other than the (A) to (C) component described above. As other components other than the (A) to (C) components, it is possible to add, for example, other resins such as LDPE (low density polyethylene) in order to improve take-up easiness and processability. It is preferable that the content of the other resin components to be added be 10 parts by mass or less when the total mass of the sealant layer 16 is regarded as 100 parts by mass. Also, examples of components other than resins include slip agents, anti-blocking agents, antioxidants, light stabilizers, and flame retardants. It is preferable that the content of the other component other than resins be 5 parts by mass or less when the total mass of the sealant layer 16 is regarded as 100 parts by mass.

In the sealant layer 16, it is possible to identify the presence of α-olefin by attribution using FT-IR (Fourier transform infrared spectrophotometer). Also, it is possible to identify the content of α-olefin by producing a calibration curve with regard to transmittance or absorbance in characteristic absorption bands of the (A) to (C) components by using a sealant layer 16 in which a known amount of elastomers including a known amount of α-olefin are mixed. In addition, it is possible to identify the content of α-olefin in each of the incompatible component (B) and the compatible elastomer (C) by conducting imaging also in characteristic absorption band of FT-IR, and conducting the mapping of absorption band resulting from butene-1 by using microscopic FT-IR (transmission method). Note that in addition to FT-IR, it is possible to identify the presence and the content of butene-1 by measuring the sealant layer 16 by NMR.

The thickness of the sealant layer 16 is, for example, 5 to 100 μm. Due to a demand for downsizing power storage devices, the thickness of the sealant layer 16 may be 10 to 80 μm, may be 10 to 60 μm, may be 10 to 45 μm, and may be 30 μm or less. Even in such a thin film configuration, the packaging material for a power storage device of the present embodiment can suppress decrease in insulating properties after heat seal, molding and degassing heat sealing.

Although preferable embodiments of the packaging material for a power storage device according to the first aspect of the present embodiment have been described above in detail, the present invention is not limited to such certain embodiments, and a variety of variations and modifications can be made within the scope of the present invention defined in the claims.

For example, FIG. 1 shows the case where the anti-corrosion treatment layer 14 is formed on a face on the side of a second adhesive layer 17 of a metallic foil layer 13; however, the anti-corrosion treatment layer 14 may be formed on a face on the side of a first adhesive layer 12 of a metallic foil layer 13, or may be formed on both faces of the metallic foil layer 13. In a case where the anti-corrosion treatment layer 14 is formed on both faces of the metallic foil layer 13, a configuration for the anti-corrosion treatment layer 14 to be formed on the side of the first adhesive layer 12 of the metallic foil layer 13, and a configuration for the anti-corrosion treatment layer 14 to be formed on the side of the second adhesive layer 17 of the metallic foil layer 13 may be the same as or different than each other.

Figure 6:
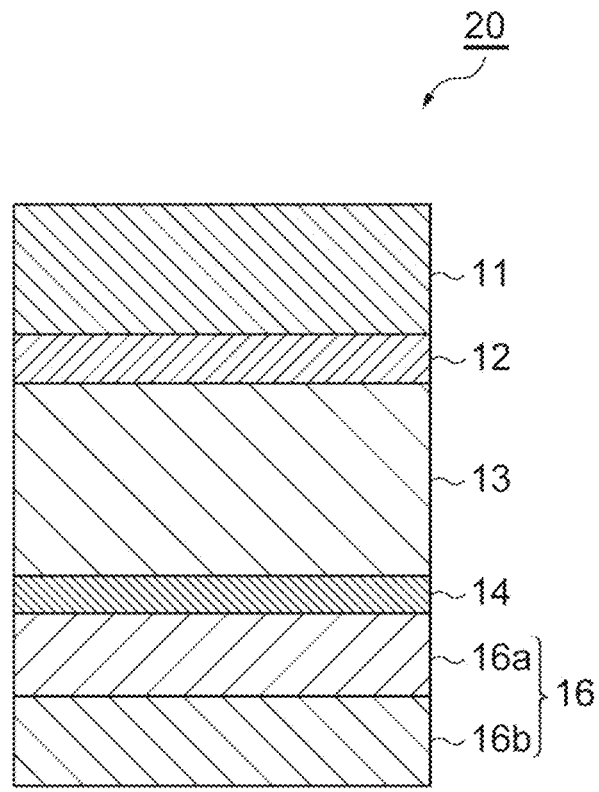
FIG. 6 is a schematic cross-sectional view of a packaging material for a power storage device according to one embodiment of the present invention.
Figure 7:
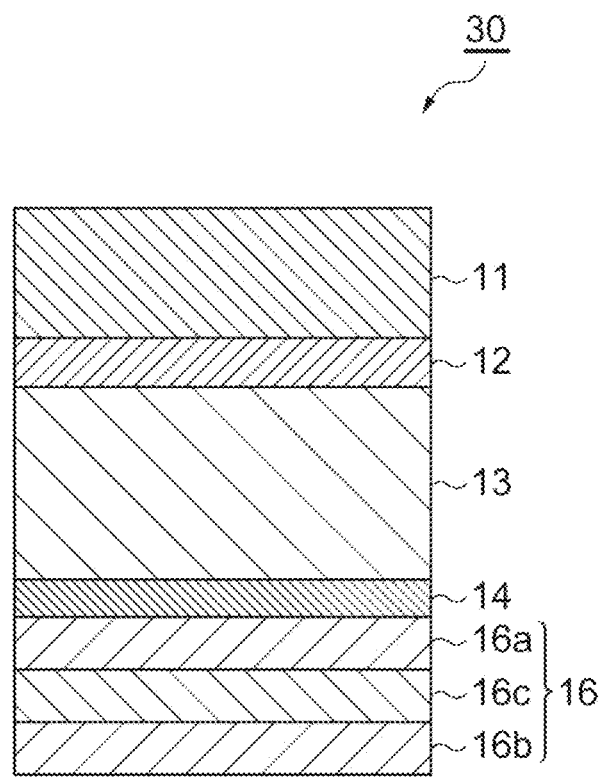
FIG. 7 is a schematic cross-sectional view of a packaging material for a power storage device according to one embodiment of the present invention.

Although FIG. 1 shows a case where the metallic foil layer 13 and the sealant layer 16 are laminated by use of the second adhesive layer 17, as in the packaging material for a power storage device 20 shown in FIG. 6 and the packaging material for a power storage device 30 shown in FIG. 7, the sealant layer 16 may be directly formed on the metallic foil layer 13 without the interposition of the second adhesive layer 17. On the other hand, the packaging material for a power storage device 20 shown in FIG. 6 and the packaging material for a power storage device 30 shown in FIG. 7 may comprise the second adhesive layer 17 between the metallic foil layer 13 and the sealant layer 16.

FIG. 1 shows a case where sealant layer 16 is formed by a single layer; however, the sealant layer 16 may be formed by two or more of multiple layers, as in a packaging material for a power storage device 20 shown in FIG. 6, and a packaging material for a power storage device 30 shown in FIG. 7. The configuration of each layer of the multiple layers forming the sealant layer 16 may be the same as or different than each other. Note that when the sealant layer 16 is multilayered, it is convenient that at least one layer in the multilayered sealant layer 16 be a layer including the polypropylene-based resin (A) and the incompatible component (B) incompatible with the polypropylene-based resin, and in addition, the incompatible component (B) containing a compound (B1).

In a packaging material for a power storage device 20 shown in FIG. 6, the sealant layer 16 is configured by a first sealant layer 16a and a second sealant layer 16b. Here, the first sealant layer 16a is the outermost layer of the sealant layer, and the second sealant layer 16b is the innermost layer of the sealant layer. It is convenient that at least one layer selected from the group consisting of the first sealant layer 16a and the second sealant layer 16b be a layer including the polypropylene-based resin (A) and the incompatible component (B) incompatible with the polypropylene-based resin, and in addition, the incompatible component (B) containing a compound (B1).

It is possible to form the second sealant layer 16b (the innermost layer), for example, by using constituents analogous to those in the sealant layer 16 in the packaging material 10 described above. In the second sealant layer 16b, when the incompatible component (B) contains the compound (B1), the decrease in insulating properties tends to be suppressed.

Also, in the second sealant layer 16b, the incompatible component (B) may not contain the compound (B1).

The thickness of the second sealant layer 16b may be, for example, 5 to 100 μm, and in view of thinning, may be 10 to 60 μm, may be 10 to 40 μm, may be 10 to 30 μm, and may be 20 μm or less.

The first sealant layer 16a (the outermost layer, metal-foil side layer) may be formed by using constituents analogous to those in, for example, the second sealant layer 16b; however, in the first sealant layer 16a, for example, instead of constituents analogous to those in the second sealant layer 16b, it is preferable to use an adhesive constituent including, where appropriate, an additive component in view of treatment with aluminum and the adhesiveness. By using the above adhesive constituent as the first sealant layer 16a, it is possible to form a sealant layer on the metallic foil layer without the interposition of an adhesive layer. In the case where, in a manner analogous to as in the second sealant layer 16b, the first sealant layer 16a includes a component corresponding to the above (A) component and (B) component, and the first sealant layer 16a forms a sea-island structure, and in addition, in the first sealant layer 16a, the incompatible component (B) contains the compound (B1), it is possible to improve the adhesiveness of the sea-island interface, and in addition, it tends to facilitate the adhesiveness between the sealant layer and the metallic foil layer to be retained, to prevent the generation of voids associated with bubbling of the electrolytic solution, and to facilitate the decrease in insulating properties after degassing heat sealing to be further suppressed.

The adhesive constituent in the first sealant layer 16a is not limited in particular; however, it is preferable that the adhesive constituent in the first sealant layer 16a contain the modified polypropylene-based resin (i) component as the (A) component, and the macro-phase separated thermoplastic elastomer (ii) component as the (B) component. Also, it is preferable that the additive component include polypropylene with an atactic structure, or propylene-α-olefin copolymer with an atactic structure (iii). Each of these components will be described below.

(Modified Polypropylene-Based Resin (i))

It is preferable that the modified polypropylene-based resin (i) be a resin in which an unsaturated carboxylic acid derivative component derived from any of an unsaturated carboxylic acid, an acid anhydride of an unsaturated carboxylic acid, and an ester of an unsaturated carboxylic acid is graft-modified to a polypropylene-based resin.

Examples of the polypropylene-based resin include homopolypropylene and random polypropylene.

Examples of a compound for use in graft modification of these polypropylene-based resins include an unsaturated carboxylic acid derivative component derived from any of an unsaturated carboxylic acid, an acid anhydride of an unsaturated carboxylic acid, and an ester of an unsaturated carboxylic acid.

Specific examples of the unsaturated carboxylic acid include acrylic acid, methacrylic acid, maleic acid, fumaric acid, itaconic acid, citraconic acid, tetrahydrophthalic acid, and bicyclo[2,2,1]hept-2-en-5,6-dicarboxylic acid.

Examples of the acid anhydride of the unsaturated carboxylic acid include acid anhydride of an unsaturated carboxylic acid such as maleic anhydride, itaconic anhydride, citraconic anhydride, tetrahydrophthalic anhydride, and bicyclo[2,2,1]hept-2-en-5,6-dicarboxylic anhydride.

Examples of the ester of the unsaturated carboxylic acid include esters of an unsaturated carboxylic acid such as methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalate anhydride, and dimethyl bicyclo[2,2,1]hept-2-en-5,6-dicarboxylate.

The modified polypropylene-based resin (i) can be produced by graft polymerization (graft modification) of 0.2 to 100 parts by mass of the unsaturated carboxylic acid derivative component described above per 100 parts by mass of the polypropylene-based resin as a base component under the presence of a radical initiator. It is preferable that the reaction temperature of the graft modification be 50 to 250° C., and it is more preferable that it be 60 to 200° C. Also, the reaction time is appropriately set depending on the production method, and for example, in a case of melt graft polymerization by a twin-screw extruder, it is preferable that the reaction time be within the residence time in the extruder, and specifically 2 to 30 minutes, and it is more preferable that the reaction time be 5 to 10 minutes. Note that the graft modification can be conducted under conditions of either normal pressure or with pressurization.

Examples of the radical initiator for use in the graft modification include organic peroxide such as alkyl peroxide, aryl peroxide, acyl peroxide, ketone peroxide, peroxyketal, peroxycarbonate, peroxyester, and hydroperoxide.

It is possible to appropriately select and use the organic peroxide depending on conditions with regard to the reaction temperature and the reaction time described above. For example, in a case of melt graft polymerization with a twin-screw extruder, alkyl peroxide, peroxyketal, and peroxyester are preferable, and specifically, di-t-butyl peroxide, 2,5-dimethyl-2,5-di-t-butylperoxy-hexin-3, dicumyl peroxide and the like are preferable.

As the modified polypropylene-based resin (i), it is preferable that the polypropylene-based resin be modified with maleic anhydride, and for example, "ADMER" manufactured by Mitsui Chemicals Inc., and "MODIC" manufactured by Mitsubishi Chemical Corporation and the like are suitable. Such a modified polyolefin resin (i) has good reactivity with polymers having a variety of metals and a variety of functional groups, and it is therefore possible to impart the adhesiveness to the first sealant layer 16a using this reactivity, and to improve the electrolytic solution resistance.

(Macro-Phase Separated Thermoplastic Elastomer (ii))

The macro-phase separated thermoplastic elastomer (ii) forms a macro-phase separated structure in which the disperse phase size is in a range of greater than 200 nm and less than or equal to 50 μm in relation to the modified polypropylene-based resin (i).

Due to the fact that the first sealant layer 16a contains the macro-phase separated thermoplastic elastomer (ii), it is possible to release residual stress generated when laminating the modified polypropylene-based resin (i) that can be a main component constituting the first sealant layer 16a and the like, and it is possible to impart the viscoelastic adhesiveness to the first sealant layer 16a. As a result of this, the adhesiveness of the first sealant layer 16a further enhances to obtain a packaging material 20 having better electrolytic solution resistance. Due to the fact that the first sealant layer 16a contains the macro-phase separated thermoplastic elastomer (ii), it is possible to impart the impact resistance to the sealant layer 16, and it is possible to improve the seal strength and the insulating properties.

The macro-phase separated thermoplastic elastomer (ii) is present in the form of a sea-island structure in the modified polypropylene-based resin (i); however, when the disperse phase size is 200 nm or less, it is difficult to impart the improvement in viscoelastic adhesiveness. On the other hand, when the disperse phase size is greater than 50 μm, since the modified polypropylene-based resin (i) and the macro-phase separated thermoplastic elastomer (ii) are essentially incompatible with each other, the laminating suitability (processability) significantly decreases, and in addition, the physical strength of the first sealant layer 16a tends to decrease. In view of the above-mentioned facts, it is preferable that the disperse phase size be 500 nm to 10 μm.

Examples of such a macro-phase separated thermoplastic elastomer (ii) include a polyethylene-based thermoplastic elastomer in which ethylene is copolymerized with an α-olefin selected from 1-butene, 1-pentene, 1-hexene, 1-octene and 4-methyl-1-pentene.

Also, as the macro-phase separated thermoplastic elastomer (ii), it is possible to use commercially available products, and for example, "TAFMER" manufactured by Mitsui Chemicals Inc., "ZELAS" manufactured by Mitsubishi Chemical Corporation, "Catalloy" manufactured by Montell and the like are suitable.

In the first sealant layer 16a, it is preferable for the content of the macro-phase separated thermoplastic elastomer (ii) to the modified polypropylene-based resin (i) to be 1 to 40 parts by mass per 100 parts by mass of the modified polypropylene-based resin (i), and it is more preferable for this content to be 5 to 30 parts by mass. Here, when the content of the macro-phase separated thermoplastic elastomer (ii) is less than 1 part by mass, the adhesiveness of the first sealant layer is not expected to enhance. On the other hand, when the content of the macro-phase separated thermoplastic elastomer (ii) is greater than 40 parts by mass, the modified polypropylene-based resin (i) and the macro-phase separated thermoplastic elastomer (ii) have low compatibility with each other by nature, and therefore, the processability tends to decrease significantly. Also, the macro-phase separated thermoplastic elastomer (ii) is not a resin exhibiting adhesiveness, and therefore, the adhesiveness of the first sealant layer 16a to other layers such as the second sealant layer 16b and the anti-corrosion treatment layer 14 tends to decrease.

(Polypropylene with Atactic Structure or Propylene-α-Olefin Copolymer with Atactic Structure (iii))

It is preferable that the first sealant layer 16a include polypropylene with an atactic structure or a propylene-α-olefin copolymer with an atactic structure (hereinafter, merely referred to as "(iii) component") as an additive component. Here, (iii) component is a fully amorphous resin component. Due to the fact that the first sealant layer 16a includes the (iii) component, it is possible to impart flexibility to the sealant layer 16. Due to the fact that the sealant layer 16 has flexibility, it is possible to impart functions such as suppression of molding whitening to the packaging material 10, and it is possible to provide a packaging material having further improved functionalities.

Note that the first sealant layer 16a may further include a propylene-α-olefin copolymer with an isotactic structure corresponding to the (C) component as an additive component for the impartment of flexibility, in addition to the above-described (iii) component.

In the first sealant layer 16a, the total mass of the (i) component and the (ii) component may be, for example, 60% by mass or more and 95% by mass or less based on the total mass of the first sealant layer 16a, and may be 70% by mass or more and 90% by mass or less.

In the first sealant layer 16a, it is preferable that the mass of the (iii) component be, for example, 5% by mass or more and 40% by mass or less based on the total mass of the (i) component, the (ii) component and the (iii) component. When the mass of the (iii) component is 5% by mass or more based on the total mass of the (i) component, the (ii) component and the (iii) component, it tends to facilitate for an effect resulting from the addition of as an additive described above to be achieved. On the other hand, when the mass of the (iii) component is 40% by mass or less based on the total mass of the (i) component, the (ii) component and the (iii) component, the adhesiveness of the first sealant layer 16a to other layers such as the second sealant layer 16b and the anti-corrosion treatment layer 14 tends to decrease. From these standpoints, in the first sealant layer 16a, it is preferable that the total mass of the (i) component and the (ii) component be, for example, 60 to 95% by mass based on the total mass of the (i) component, the (ii) component and the (iii) component.

Note that, as a method for analyzing the (iii) component as an additive component in the first sealant layer 16a, for example, it is possible to conduct quantification by evaluation of tacticity by nuclear magnetic resonance spectroscopy (NMR).

In addition to the adhesive constituents (in other words, the modified polypropylene-based resin (i), and the macro-phase separated thermoplastic elastomer (ii)) and an additive component (in other words, (iii) component), the first sealant layer 16a can contain a variety of additives such as flame retardants, slip agents, anti-blocking agents, antioxidants, light stabilizers and tackifiers, where appropriate.

The thickness of the first sealant layer 16a is not limited in particular; however, in view of relaxation of stress and in view of permeation of moisture and electrolytic solution, it is preferable that the thickness of the first sealant layer 16a be equal to or less than that of the second sealant layer 16b.

In addition, also in a packaging material for a power storage device 20, the thickness of the sealant layer 16 (the total thickness of the first sealant layer 16a and the second sealant layer 16b) may be 10 to 80 am, may be 10 to 60 μm, may be 10 to 45 μm, and may be 30 μm or less in view of thinning. Even in such a thin film configuration, the packaging material for a power storage device of the present embodiment can suppress decrease in insulating properties after heat seal, molding and degassing heat sealing.

FIG. 6 shows a case where the sealant layer 16 is formed by two layers; however, sealant layer 16 may be formed by three layers, as in a packaging material for a power storage device 30 shown in FIG. 7. In a packaging material for a power storage device 30 shown in FIG. 7, the sealant layer 16 is configured by a first sealant layer 16a, a second sealant layer 16b, and a third sealant layer 16c. Here, the first sealant layer 16a is the outermost layer (metal-foil side layer) in the sealant layer, and the third sealant layer 16c is an intermediate layer in the sealant layer, and the second sealant layer 16b is the innermost layer in the sealant layer. It is convenient that at least one layer selected from the group consisting of these three layers be a layer including the polypropylene-based resin (A) and the incompatible component (B) incompatible with the polypropylene-based resin, and in addition, the incompatible component (B) containing a compound (B1).

Examples and preferable embodiments regarding the materials constituting the first sealant layer 16a of the packaging material for a power storage device 30 are analogous to those in the first sealant layer 16a of the packaging material for a power storage device 20.

Examples and preferable embodiments regarding the materials constituting the second sealant layer 16b and the third sealant layer 16c of the packaging material for a power storage device 30 are analogous to those in the second sealant layer 16b of the packaging material for a power storage device 20.

In the packaging material for a power storage device 30, the thickness of the first sealant layer 16a may be, for example, 2 to 30 μm, may be 5 to 20 μm, and may be 8 to 10 μm, and the thickness of the second sealant layer 16b may be, for example, 5 to 80 μm, may be 13 to 40 μm, and may be 15 to 20 μm, and the thickness of the third sealant layer 16c may be, for example, 2 to 30 μm, may be 5 to 20 μm, and may be 8 to 10 μm.

Also in the packaging material for a power storage device 30, the thickness of the sealant layer 16 (the total thickness of the first sealant layer 16a, the second sealant layer 16b, and the third sealant layer 16c) may be 30 μm or less in view of thinning. Even in such a thin film configuration, the packaging material for a power storage device of the present embodiment can suppress decrease in insulating properties after heat seal, molding and degassing heat sealing.

As in the packaging materials for a power storage device 20 and 30, also with regard to the case where the sealant layer consists a plurality of layers, the content of the incompatible component (B) is 1 to 40% by mass in the sealant layer 16 based on the total amount of the sealant layer 16, and it is preferable that this content be 1 to 35% by mass, and it is more preferable that this content be 2 to 25% by mass. The contents of the components in each layer are adjusted so that the content of the (B) component in the entirety of the sealant layer 16 is within the above range.

As in the packaging materials for a power storage device 20 and 30, when the sealant layer consists a plurality of layers, it is preferable that, in the first sealant layer 16a nearest to the metallic foil layer 13, the incompatible component (B) contain the compound (B1). In the first sealant layer 16a, due to the fact that the incompatible component (B) contains the compound (B1), it is possible to improve the adhesion strength of the sea-island interface, and the formation of voids associated with bubbling of the electrolytic solution is suppressed, and therefore, it tends to enable further improvement in the insulating properties after degassing heat sealing. Bubbling of the electrolytic solution in degassing heat sealing often occurs at a portion near to the metallic foil layer 13 of the sealant layer 16, and due to the fact that the incompatible component (B) contains the compound (B1) in a layer nearest to the metallic foil layer 13, decrease in insulating properties tends to be suppressed more efficiently. In the first sealant layer 16a, when the incompatible component (B) contains the compound (B1), it is preferable that the content of the compound (B1) be 1 to 40 parts by mass based on the total amount of the first sealant layer 16a, and it is more preferable that the content of the compound (B1) be 2 to 25 parts by mass.

When the content of the compound (B1) in the first sealant layer 16a is 1 part by mass or more, the seal strength and the insulating properties tend to be achieved. Also, when the content of the compound (B1) is 40 parts by mass or less, it tends to suppress the aggregation force as the entirety of the sealant layer as well as the seal strength and the decrease in insulating properties.

Also, in the second sealant layer 16b or the third sealant layer 16c, the incompatible component (B) may contain the compound (B1). Due to the fact that the second sealant layer 16b or the third sealant layer 16c contains the compound (B1), it is possible to improve the adhesion strength of the sea-island interface formed by the (A) and (B) components, and the formation of voids associated with bubbling of the electrolytic solution is suppressed, and it is therefore possible to improve the insulating properties further. In the second sealant layer 16b, when the incompatible component (B) contains the compound (B1), it is preferable that the content of the compound (B1) in the second sealant layer 16b be 1 to 40 parts by mass based on the total amount of the second sealant layer 16b, it is more preferable that this content be 2 to 20 parts by mass, and it is further preferable that this content be 2 to 15 parts by mass.

It is preferable that the content of the compound (B1) in the third sealant layer 16c be 1 to 40 parts by mass based on the total amount of the third sealant layer 16c, it is more preferable that this content be 2 to 20 parts by mass, and it is further preferable that this content be 2 to 15 parts by mass.

Also, even in both of the case where the sealant layer consists of a single layer, and the case where the sealant layer consists a plurality of layers, it is preferable that the content of the compound (B1) in the sealant layer be 1 to 40 parts by mass based on the total amount of the sealant layer, it is more preferable that this content be 2 to 20 parts by mass, and it is further preferable that that this content be 2 to 15 parts by mass, in view of suppressing decrease in insulating properties after degassing heat sealing while retaining other properties.

(II) Second Aspect

The sealant layer 16 of the packaging material in a second aspect of the present embodiment includes a low shrinkage sealant layer, and the low shrinkage sealant layer is configured to have the ratio ($LAh^{MD}/LA^{MD}$) of 0.20 or more. Examples with regard to constructing the sealant layer 16 of the packaging material according to the second aspect of the present embodiment will be illustrated below.

The sealant layer 16 is a layer imparting sealability resulting from heat seal to the packaging material 10. The sealant layer 16 contains a polypropylene-based resin (A) and an incompatible component (B) incompatible with the above polypropylene-based resin. The sealant layer 16 may further include a compatible elastomer (C) compatible with the polypropylene-based resin (A). Hereinafter, optionally, the above polypropylene-based resin (A) may be referred to as "(A) component", the incompatible component (B) incompatible with the above (A) component may be referred to as "(B) component", and the compatible elastomer (C) compatible with the above (A) component may be referred to as "(C) component", and the like.

In the sealant layer 16, it is preferable that the incompatible component (B) contain a compound (B1) having a portion compatible with the polypropylene-based resin (A). Hereinafter, optionally, a compound (B1) having a portion compatible with the above (A) component may be referred to as "compound (B1)" or "(B1) component", and the like. The incompatible component (B) may consist only of the compound (B1).

Due to the fact that sealant layer 16 includes the above (A) component and the above (B) component, a sea-island structure is formed in the sealant layer 16. In other words, sealant layer 16 has an existing region of polypropylene-based resin (A), and a plurality of existing regions of the incompatible component (B) surrounded by the above polypropylene-based resin (A). As a result of this, it is possible to improve the seal strength after heat seal. Due to the fact that the sealant layer 16 further includes the above (C) component, it is possible to impart flexibility to the sealant layer 16 further. Due to the fact that the sealant layer 16 has flexibility, it is possible to impart functions such as suppression of molding whitening, and it is possible to provide a packaging material having further improved functionalities.

Examples of the sealant layer 16 will be illustrated below.

(Polypropylene-Based Resin (A))

The polypropylene-based resin (A) is a resin obtained from polymerized monomers including propylene. Examples of the polypropylene-based resin (A) include homopolypropylene and random polypropylene. In view of the fundamental performance of the packaging material such as heat seal strength, it is preferable that the polypropylene-based resin (A) be random polypropylene, and it is more preferable that the polypropylene-based resin (A) be propylene-ethylene random copolymer. The propylene-ethylene random copolymer has excellent heat sealability at low temperatures, and can improve the sealing properties in the case of involvement of the electrolytic solution.

In the propylene-ethylene random copolymer, it is preferable that the content of ethylene be 0.1 to 10% by mass, it is more preferable that the content of ethylene be 1 to 7% by mass, and it is further preferable that the content of ethylene be 2 to 5% by mass. When the content of ethylene is 0.1% by mass or more, the effect of reducing the melting point by copolymerization of ethylene is satisfactorily achieved to enable further improvement in sealing properties in the case of involvement of the electrolytic solution, and in addition, to obtain the impact resistance, and it tends to enable improvement in sealing strength and molding whitening resistance. When the content of ethylene is 10% by mass or less, it tends to enable excessive decrease in melting point to be suppressed, and to enable generation of excessively sealed portions to be suppressed more satisfactorily. Note that the content of ethylene can be calculated from the mixing ratio of the monomers in polymerization.

It is preferable that the melting point of the propylene-ethylene random copolymer be 120 to 145° C., and it is more preferable that the melting point of the random polypropylene be 125 to 140° C. When this melting point is 120° C. or more, it tends to enable generation of excessively sealed portions to be suppressed more satisfactorily. When the melting point is 145° C. or less, it tends to enable further improvement in sealing properties in the case of involvement of the electrolytic solution.

The propylene-ethylene random copolymer may be acid-modified, and for example, can be an acid-modified propylene-ethylene random copolymer obtained by graft modification with maleic anhydride. By using the acid-modified propylene-ethylene random copolymer, it is possible to retain the adhesiveness to tab leads without a tab sealant.

With regard to the propylene-ethylene random copolymer, it is possible to use one alone, or to use a combination of two or more thereof.

In the sealant layer 16, the content of the (A) component may be 50 to 99% by mass based on the total amount of solids content of the sealant layer 16, may be 50 to 95% by mass, and may be 50 to 85% by mass. As a result of the fact that the content of the (A) component is 50% by mass or more, it is possible to improve the sealing properties by an effect of using the (A) component by nature. Also, it is possible to prevent excessive presence of the (B) component by setting the content of the (A) component to be 50% by mass or more, and therefore, a good sea-island structure tends to be formed, and in addition, it is possible to suppress the decrease in the heat resistance and the aggregation force of sealant layer 16. On the other hand, due to the fact that inclusion of 1% by mass or more of the (B) component can be achieved by setting the content of the (A) component to be 99% by mass or less, it is possible to improve the seal strength and the insulating properties due to the (B) component.

(Incompatible Component (B))

Examples of the incompatible component (B) include graft copolymers, block copolymers, and random copolymers. These copolymers have a portion incompatible with the (A) component in at least a portion thereof.

It is preferable that the incompatible component (B) contain a compound (B1) having a portion compatible with the polypropylene-based resin (A). In other words, it is preferable that the compound (B) have a portion compatible with the polypropylene-based resin (A), and a portion incompatible with the polypropylene-based resin (A). Due to the fact that the incompatible component (B) contains the compound (B1), it is possible to improve the shrinkage ratio of the sealant layer 16, and to improve adhesion strength with regard to the interface of sea-island structure, and the formation of voids associated with bubbling of the electrolytic solution is suppressed, and as a result of this, it is possible to enable further improvement in the insulating properties. Also, as a result of the improvement in the adhesion strength of the sea-island interface resulting from the compound (B1), the seal strength can also be improved. Such a compound (B1) can be obtained, for example, in the case where the incompatible component (B) is a graft copolymer or a block copolymer. Examples of the graft copolymer suitable for the compound (B1) include a graft copolymer consisting of a main chain of polyolefin and a side chain of polystyrene, and a graft copolymer consisting of a main chain of polyolefin and a side chain of styrene-acrylonitrile copolymer. As the above graft copolymer, for example, "MODIPER" manufactured by NOF Corporation, and the like are suitable.

Examples of the block copolymer suitable for the compound (B1) include a block copolymer having a block configured by styrene units and a block configured by ethylene-butylene units; a block copolymer having a block configured by styrene units, a block configured by ethylene-butylene units and a block configured by crystalline olefin units; a block copolymer having a block configured by crystalline ethylene units and a block configured by ethylene-butylene units; a block copolymer having a block configured by ethylene and a block configured by ethylene-octene-1; and a block copolymer having a block configured by propylene units and a block configured by ethylene units. For example, the block configured by propylene units is a portion compatible with the above (A) component, and the block configured by ethylene units is a portion incompatible with the above (A) component. As the above block copolymer, for example, "DYNARON" manufactured by JSR, "INTUNE" and "INFUSE" manufactured by DOW, and the like are suitable.

The incompatible component (B) may contain an incompatible elastomer. Examples of the incompatible elastomer include polyolefin-based elastomers containing α-olefin as comonomers. In particular, by using ethylene-α-olefin copolymers, it tends to enable the impartment of functionalities to the sealant layer 16 without reducing the electrolytic solution laminating strength, or a variety of seal strengths in the case of involvement of the electrolytic solution. As the ethylene-α-olefin copolymer, it is possible to use a compound obtained by copolymerizing at least one α-olefin selected from the group consisting of 1-butene, 1-pentene, 1-hexene, 1-octene and 4-methyl-1-pentene to ethylene, and it is preferably to use an ethylene-butene-1 random copolymer obtained by copolymerizing 1-butene to ethylene. As the ethylene-α-olefin copolymer, "TAFMER" manufactured by Mitsui Chemicals Inc., "EXCELLEN" manufactured by Sumitomo Chemical Company, Limited, and the like are suitable.

By providing a dispersion obtained by dispersing the incompatible component (B) in the polypropylene-based resin (A), and as a result of the use of the dispersion, the sealant layer 16 may contain a polypropylene-based resin (A), and incompatible component (B). Examples of such a dispersion include a dispersion obtained by microdispersing an elastomer in a polypropylene-based resin. As a result of the fact that the sealant layer 16 includes a dispersion obtained by dispersing the incompatible component (B) in the polypropylene-based resin (A) in advance, it tends to enable further improvement in the insulating properties and the seal strength. It is preferable that the incompatible component (B) in the above dispersion contain a graft copolymer or a block copolymer. As a result of the fact that the incompatible component (B) in the dispersion contains a graft copolymer or a block copolymer, it tends to enable further improvement in the adhesiveness of the sea-island interface.

As the incompatible component (B), the olefin-based and the styrene-based materials are described above; however, in view of the electrolytic solution resistance, it is preferable that the incompatible component (B) be an olefin-based material.

(Compatible Elastomer (C))

Examples of the compatible elastomer (C) include propylene-α-olefin copolymers. By using the propylene-α- olefin copolymer, it is possible to impart functionalities to the sealant layer 16 without reducing the electrolytic solution laminating strength, or a variety of seal strengths in the case of involvement of the electrolytic solution. As the propylene-α-olefin copolymer, it is possible to use a polymer obtained by copolymerizing α-olefin selected from 1-butene, 1-pentene, 1-hexene, 1-octene and 4-methyl-1-pentene to propylene, and it is preferably possible to use a propylene-butene-1 random copolymer obtained by copolymerizing 1-butene to propylene.

It is preferable that the melting point of the polyolefin-based elastomer be 150° C. or less; however, in view of suppressing the excessively sealed portion, suppressing molding whitening, and improving the sealing properties in the case of involvement of the electrolytic solution, it is preferable that the melting point of the polyolefin-based elastomer be 60 to 120° C., and it is more preferable that the melting point of the polyolefin-based elastomer be 65 to 90° C. As a result of the fact that this melting point is 150° C. or less, it is possible to improve the sealing properties in the case of involvement of the electrolytic solution, in particular, the degassing heat sealing strength. Also, when this melting point is 60° C. or more, it is advantageous in view of suppressing the generation of the excessively sealed portions.

With regard to the polyolefin-based elastomer, it is possible to use one alone, or to use a combination of two or more thereof.

In the sealant layer 16, it is preferable that the content of the (B) component be 1 to 40% by mass based on the total amount of solids content of the sealant layer 16, and it is more preferable that the content of the (B) component be 5 to 25% by mass. As a result of the fact that the content of the (B) component is 1% by mass or more, it is possible to impart impact resistance to the sealant layer 16, and it is possible to improve the seal strength and the insulating properties. On the other hand, by setting the content of the (B) component to be 40% by mass or less, and a good sea-island structure tends to be formed, and in addition, it is possible to improve the aggregation force of the entirety of the sealant layer 16, and it is possible to improve the seal strength and the insulating properties. Note that, for the sake of convenience, the dispersion obtained by microdispersing an elastomer in a polypropylene-based resin is described as an incompatible component (B); however, in the above dispersion, the elastomer portion is classified as the (B) component, and the polypropylene-based resin is classified as the above (A) component.

When the sealant layer 16 includes the (C) component, it is preferable that the content of the (C) component in the sealant layer 16 be 5 to 30% by mass based on the total amount of solids content of the sealant layer 16, and it is more preferable that this content be 10 to 25% by mass. As a result of the fact that the content of the (C) component is 5% by mass or more, the flexibility of the sealant layer 16 tends to be achieved, and it is possible to impart functions such as suppression of molding whitening, and it is possible to provide a packaging material having further improved functionalities. On the other hand, by setting the content of the (C) component to be 30% by mass or less, it is possible to improve the aggregation force of the entirety of the sealant layer 16, and it is possible to improve the seal strength and the insulating properties.

Also, it is preferable that the ratio of the content of the compatible elastomer (C) to the content of the incompatible component (B) ($M_C/M_B$) be 0.2 to 3.0 based on the mass ratio, and it is more preferable that this ratio be 0.3 to 2.0. As a result of the fact that the ratio of these contents ($M_C/M_B$) is in the above range, the seal strength tends to be improved.

When the incompatible component (B) contains the compound (B1), it is preferable that the content of the compound (B1) in the sealant layer 16 be 1 to 40% by mass based on the total amount of the sealant layer, and it is more preferable that this content be 2 to 25% by mass. As a result of the fact that the content of the (B) component is 1% by mass or more, the adhesion strength of the sea-island interface tends to enhance, and an effect of improving the seal strength and the insulating properties tend to be achieved. On the other hand, by setting the content of the compound (B1) to be 40% by mass or less, it tends to suppress the aggregation force of the entirety of the sealant layer 16 as well as the seal strength and the decrease in insulating properties.

(Components to be Added)

The sealant layer 16 can further include other components other than the (A) to (C) component described above. As other components other than the (A) to (C) components, it is possible to add, for example, other resins such as LDPE (low density polyethylene) in order to improve take-up easiness and processability. It is preferable that the content of the other resin components to be added be 10 parts by mass or less when the total mass of the sealant layer 16 is regarded as 100 parts by mass. Also, examples of components other than resins include slip agents, anti-blocking agents, antioxidants, light stabilizers and flame retardants. It is preferable that the content of the other component other than these resins be 5 parts by mass or less when the total mass of the sealant layer 16 is regarded as 100 parts by mass.

In the sealant layer 16, it is possible to identify the presence of α-olefin by attribution using FT-IR (Fourier transform infrared spectrophotometer). Also, it is possible to identify the content of α-olefin by producing a calibration curve with regard to transmittance or absorbance in characteristic absorption bands of the (A) to (C) components by using a sealant layer 16 in which a known amount of elastomers including a known amount of α-olefin are mixed. In addition, it is possible to identify the content of α-olefin in each of the incompatible component (B) and the compatible elastomer (C) by conducting imaging also in characteristic absorption band of FT-IR, and conducting the mapping of absorption band resulting from butene-1 by using microscopic FT-IR (transmission method). Note that in addition to FT-IR, it is possible to identify the presence and the content of butene-1 by measuring the sealant layer 16 by NMR.

The thickness of the sealant layer 16 is, for example, 5 to 100 µm. Due to a demand for downsizing power storage devices, the thickness of the sealant layer 16 may be 10 to 80 µm, may be 10 to 60 µm, may be 10 to 45 µm, and may be 30 µm or less. Even in such a thin film configuration, the packaging material for a power storage device of the present embodiment can suppress decrease in insulating properties after heat seal, molding and degassing heat sealing.

Although preferable embodiments of the packaging material for a power storage device of the present embodiment have been described above in detail, the present invention is not limited to such certain embodiments, and a variety of variations and modifications can be made within the scope of the present invention defined in the claims.

For example, FIG. 1 shows a case where an anti-corrosion treatment layer 14 is formed on a face on the side of a second adhesive layer 17 of a metallic foil layer 13; however, the anti-corrosion treatment layer 14 may be formed on a face on the side of a first adhesive layer 12 of the metallic foil layer 13, or may be formed on both faces of the metallic foil layer 13. In a case where the anti-corrosion treatment layer 14 is formed on both faces of the metallic foil layer 13, a configuration for the anti-corrosion treatment layer 14 to be formed on the side of the first adhesive layer 12 of the metallic foil layer 13, and a configuration for the anti-corrosion treatment layer 14 to be formed on the side of the second adhesive layer 17 of the metallic foil layer 13 may be the same as or different than each other.

Although FIG. 1 shows a case where the metallic foil layer 13 and the sealant layer 16 are laminated by use of the second adhesive layer 17, as in the packaging material for a power storage device 20 shown in FIG. 6 and the packaging material for a power storage device 30 shown in FIG. 7, the sealant layer 16 may be directly formed on the metallic foil layer 13 without the interposition of the second adhesive layer 17. On the other hand, the packaging material for a power storage device 20 shown in FIG. 6 and the packaging material for a power storage device 30 shown in FIG. 7 may comprise the second adhesive layer 17 between the metallic foil layer 13 and the sealant layer 16.

Although FIG. 1 shows a case where the sealant layer 16 is formed by a single layer; however, the sealant layer 16 may be formed by two or more of multiple layers, as in the packaging material for a power storage device 20 shown in FIG. 6 and the packaging material for a power storage device 30 shown in FIG. 7. The configuration of each layer of the multiple layers forming the sealant layer 16 may be the same as or different than each other. Note that when the sealant layer 16 is multilayered, it is convenient that at least one layer of in the multilayered sealant layer 16 be a low shrinkage sealant layer.

In a packaging material for a power storage device 20 shown in FIG. 6, the sealant layer 16 is configured by a first sealant layer 16a and a second sealant layer 16b. Here, the first sealant layer 16a is the outermost layer of the sealant layer, and the second sealant layer 16b is the innermost layer of the sealant layer. It is convenient that at least one layer selected from the group consisting of the first sealant layer 16a and the second sealant layer 16b be a low shrinkage sealant layer.

It is possible to form the second sealant layer 16b (the innermost layer), for example, by using constituents analogous to those in the sealant layer 16 in the packaging material 10 described above. In the second sealant layer 16b, when the second sealant layer 16b is a low shrinkage sealant layer, the decrease in insulating properties in the case of involvement of the electrolytic solution tends to be suppressed.

The thickness of the second sealant layer 16b may be, for example, 5 to 100 μm, and in view of thinning, may be 10 to 60 μm, may be 10 to 40 μm, may be 10 to 30 μm, and may be 20 μm or less.

The first sealant layer 16a (the outermost layer, metal-foil side layer) may be formed by using constituents analogous to those in, for example, the second sealant layer 16b; however, in the first sealant layer 16a, for example, instead of constituents analogous to those in the second sealant layer 16b, it is preferable to use an adhesive constituent including, where appropriate, an additive component in view of treatment with aluminum and the adhesiveness. By using the above adhesive constituent as the first sealant layer 16a, it is possible to form a sealant layer on the metallic foil layer without the interposition of an adhesive layer. In the case where, in a manner analogous to as in the second sealant layer 16b, the first sealant layer 16a includes a component corresponding to the above (A) component and (B) component, and the first sealant layer 16a forms a sea-island structure, and in addition, the first sealant layer 16a is a low shrinkage sealant layer, it is possible to improve the adhesiveness of the sea-island interface, and in addition, it tends to facilitate the adhesiveness between the sealant layer and the metallic foil layer to be retained, to prevent the generation of voids associated with bubbling of the electrolytic solution, and to facilitate the decrease in insulating properties after degassing heat sealing to be further suppressed.

The adhesive constituent in the first sealant layer 16a is not limited in particular; however, it is preferable that the adhesive constituent in the first sealant layer 16a contain the modified polypropylene-based resin (i) component as the (A) component, and the macro-phase separated thermoplastic elastomer (ii) component as the (B) component. Also, it is preferable that the additive component include polypropylene with an atactic structure, or propylene-α-olefin copolymer with an atactic structure (iii). Each of these components will be described below.

(Modified Polypropylene-Based Resin (i))

It is preferable that the modified polypropylene-based resin (i) be a resin in which an unsaturated carboxylic acid derivative component derived from any of an unsaturated carboxylic acid, an acid anhydride of an unsaturated carboxylic acid, and an ester of an unsaturated carboxylic acid is graft-modified to a polypropylene-based resin.

Examples of the polypropylene-based resin include homopolypropylene and random polypropylene.

Examples of a compound for use in graft modification of these polypropylene-based resins include an unsaturated carboxylic acid derivative component derived from any of an unsaturated carboxylic acid, an acid anhydride of an unsaturated carboxylic acid, and an ester of an unsaturated carboxylic acid.

Specific examples of the unsaturated carboxylic acid include acrylic acid, methacrylic acid, maleic acid, fumaric acid, itaconic acid, citraconic acid, tetrahydrophthalic acid, and bicyclo[2,2,1]hept-2-en-5,6-dicarboxylic acid.

Examples of the acid anhydride of the unsaturated carboxylic acid include acid anhydride of an unsaturated carboxylic acid such as maleic anhydride, itaconic anhydride, citraconic anhydride, tetrahydrophthalic anhydride, and bicyclo[2,2,1]hept-2-en-5,6-dicarboxylic anhydride.

Examples of the ester of the unsaturated carboxylic acid include ester of an unsaturated carboxylic acid such as methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalate anhydride, and dimethyl bicyclo[2,2,1]hept-2-en-5,6-dicarboxylate.

The modified polypropylene-based resin (i) can be produced by graft polymerization (graft modification) 0.2 to 100 parts by mass of the unsaturated carboxylic acid derivative component described above per 100 parts by mass of the polypropylene-based resin as a base component under the presence of a radical initiator. It is preferable that the reaction temperature of the graft modification be 50 to 250° C., and it is more preferable that it be 60 to 200° C. Also, the reaction time is appropriately set depending on the production method, and for example, in a case of melt graft polymerization by a twin-screw extruder, it is preferable that the reaction time be within the residence time in the extruder, and specifically 2 to 30 minutes, and it is more preferable that the reaction time be 5 to 10 minutes. Note that the graft modification can be conducted under conditions of either normal pressure or with pressurization.

Examples of the radical initiator for use in the graft modification include organic peroxide such as alkyl peroxide, aryl peroxide, acyl peroxide, ketone peroxide, peroxyketal, peroxycarbonate, peroxyester, and hydroperoxide.

It is possible to appropriately select and use the organic peroxide depending on conditions with regard to the reaction temperature and the reaction time described above. For example, in a case of melt graft polymerization with a twin-screw extruder, alkyl peroxide, peroxyketal, and peroxyester are preferable, and specifically, di-t-butyl peroxide, 2,5-dimethyl-2,5-di-t-butylperoxy-hexin-3, dicumyl peroxide and the like are preferable.

As the modified polypropylene-based resin (i), it is preferable that the polypropylene-based resin be modified with maleic anhydride, and for example, "ADMER" manufactured by Mitsui Chemicals Inc., and "MODIC" manufactured by Mitsubishi Chemical Corporation and the like are suitable. Such a modified polyolefin resin (i) has good reactivity with polymers having a variety of metals and a variety of functional groups, and it is therefore possible to impart the adhesiveness to the first sealant layer 16a using this reactivity, and to improve the electrolytic solution resistance.

(Macro-Phase Separated Thermoplastic Elastomer (ii))

The macro-phase separated thermoplastic elastomer (ii) forms a macro-phase separated structure in which the disperse phase size is in a range of greater than 200 nm and less than or equal to 50 µm in relation to the modified polypropylene-based resin (i).

Due to the fact that the first sealant layer 16a contains the macro-phase separated thermoplastic elastomer (ii), it is possible to release residual stress generated when laminating the modified polypropylene-based resin (i) that can be a main component constituting the first sealant layer 16a and the like, and it is possible to impart the viscoelastic adhesiveness to the first sealant layer 16a. As a result of this, the adhesiveness of the first sealant layer 16a further enhances to obtain a packaging material 20 having better electrolytic solution resistance. Due to the fact that the first sealant layer 16a contains the macro-phase separated thermoplastic elastomer (ii), it is possible to impart the impact resistance to the sealant layer 16, and it is possible to improve the seal strength and the insulating properties.

The macro-phase separated thermoplastic elastomer (ii) is present in the form of a sea-island structure in the modified polypropylene-based resin (i); however, when the disperse phase size is 200 nm or less, it is difficult to impart the improvement in viscoelastic adhesiveness. On the other hand, when the disperse phase size is greater than 50 µm, since the modified polypropylene-based resin (i) and the macro-phase separated thermoplastic elastomer (ii) are essentially incompatible with each other, the laminating suitability (processability) significantly decreases, and in addition, the physical strength of the first sealant layer 16a tends to decrease. In view of the above-mentioned facts, it is preferable that the disperse phase size be 500 nm to 10 µm.

Examples of such a macro-phase separated thermoplastic elastomer (ii) include a polyethylene-based thermoplastic elastomer in which ethylene is copolymerized with an α-olefin selected from 1-butene, 1-pentene, 1-hexene, 1-octene and 4-methyl-1-pentene.

Also, as the macro-phase separated thermoplastic elastomer (ii), it is possible to use commercially available products, and for example, "TAFMER" manufactured by Mitsui Chemicals Inc., "ZELAS" manufactured by Mitsubishi Chemical Corporation, "Catalloy" manufactured by Montell and the like are suitable.

In the first sealant layer 16a, it is preferable for the content of the macro-phase separated thermoplastic elastomer (ii) to the modified polypropylene-based resin (i) to be 1 to 40 parts by mass per 100 parts by mass of the modified polypropylene-based resin (i), and it is more preferable for this content to be 5 to 30 parts by mass. Here, when the content of the macro-phase separated thermoplastic elastomer (ii) is less than 1 part by mass, the adhesiveness of the first sealant layer is not expected to enhance. On the other hand, when the content of the macro-phase separated thermoplastic elastomer (ii) is greater than 40 parts by mass, the modified polypropylene-based resin (i) and the macro-phase separated thermoplastic elastomer (ii) have low compatibility with each other by nature, and therefore, the processability tends to decrease significantly. Also, the macro-phase separated thermoplastic elastomer (ii) is not a resin exhibiting adhesiveness, and therefore, the adhesiveness of the first sealant layer 16a to other layers such as the second sealant layer 16b and the anti-corrosion treatment layer 14 tends to decrease.

(Polypropylene with Atactic Structure or Propylene-α-Olefin Copolymer with Atactic Structure (iii))

It is preferable that the first sealant layer 16a include polypropylene with an atactic structure or a propylene-α-olefin copolymer with an atactic structure (hereinafter, merely referred to as "(iii) component") as an additive component. Here, (iii) component is a fully amorphous resin component. Due to the fact that the first sealant layer 16a includes the (iii) component, it is possible to impart flexibility to the sealant layer 16. Due to the fact that the sealant layer 16 has flexibility, it is possible to impart functions such as suppression of molding whitening to the packaging material 10, and it is possible to provide a packaging material having further improved functionalities.

Note that the first sealant layer 16a may further include a propylene-α-olefin copolymer with an isotactic structure corresponding to the (C) component as an additive component for the impartment of flexibility, in addition to the above-described (iii) component.

In the first sealant layer 16a, the total mass of the (i) component and the (ii) component may be, for example, 60% by mass or more and 95% by mass or less based on the total mass of the first sealant layer 16a, and may be 70% by mass or more and 90% by mass or less.

In the first sealant layer 16a, it is preferable that the mass of the (iii) component be, for example, 5% by mass or more and 40% by mass or less based on the total mass of the (i) component, the (ii) component and the (iii) component. When the mass of the (iii) component is 5% by mass or more based on the total mass of the (i) component, the (ii) component and the (iii) component, it tends to facilitate for an effect resulting from the addition of as an additive described above to be achieved. On the other hand, when the mass of the (iii) component is 40% by mass or less based on the total mass of the (i) component, the (ii) component and the (iii) component, the adhesiveness of the first sealant layer 16a to other layers such as the second sealant layer 16b and the anti-corrosion treatment layer 14 tends to decrease. From these standpoints, in the first sealant layer 16a, it is preferable that the total mass of the (i) component and the (ii) component be, for example, 60 to 95% by mass based on the total mass of the (i) component, the (ii) component and the (iii) component.

Note that, as a method for analyzing the (iii) component as an additive component in the first sealant layer 16a, for example, it is possible to conduct quantification by evaluation of tacticity by nuclear magnetic resonance spectroscopy (NMR).

In addition to the adhesive constituents (in other words, the modified polypropylene-based resin (i), and the macrophase separated thermoplastic elastomer (ii)) and an additive component (in other words, (iii) component), the first sealant layer 16a can contain a variety of additives such as flame retardants, slip agents, anti-blocking agents, antioxidants, light stabilizers and tackifiers, where appropriate.

The thickness of the first sealant layer 16a is not limited in particular; however, in view of relaxation of stress and in view of permeation of moisture and electrolytic solution, it is preferable that the thickness of the first sealant layer 16a be equal to or less than that of the second sealant layer 16b.

In addition, also in a packaging material for a power storage device 20, the thickness of the sealant layer 16 (the total thickness of the first sealant layer 16a and the second sealant layer 16b) may be 10 to 80 µm, may be 10 to 60 µm, may be 10 to 45 µm, and may be 30 µm or less in view of thinning. Even in such a thin film configuration, the packaging material for a power storage device of the present embodiment can suppress decrease in insulating properties after heat seal, molding and degassing heat sealing.

FIG. 6 shows a case where the sealant layer 16 is formed by two layers; however, sealant layer 16 may be formed by three layers, as in a packaging material for a power storage device 30 shown in FIG. 7. In a packaging material for a power storage device 30 shown in FIG. 7, the sealant layer 16 is configured by a first sealant layer 16a, a second sealant layer 16b, and a third sealant layer 16c. Here, the first sealant layer 16a is the outermost layer (metal-foil side layer) in the sealant layer, and the third sealant layer 16c is an intermediate layer in the sealant layer, and the second sealant layer 16b is the innermost layer in the sealant layer. It is convenient that at least one layer selected from the group consisting of these three layers be a low shrinkage sealant layer.

Examples and preferable embodiments regarding the materials constituting the first sealant layer 16a of the packaging material for a power storage device 30 are analogous to those in the first sealant layer 16a of the packaging material for a power storage device 20.

Examples and preferable embodiments regarding the materials constituting the second sealant layer 16b and the third sealant layer 16c of the packaging material for a power storage device 30 are analogous to those in the second sealant layer 16b of the packaging material for a power storage device 20.

In the packaging material for a power storage device 30, the thickness of the first sealant layer 16a may be, for example, 2 to 30 µm, may be 5 to 20 µm, and may be 8 to 10 µm, and the thickness of the second sealant layer 16b may be, for example, 5 to 80 µm, may be 13 to 40 µm, and may be 15 to 20 µm, and the thickness of the third sealant layer 16c may be, for example, 2 to 30 µm, may be 5 to 20 µm, and may be 8 to 10 µm.

Also in the packaging material for a power storage device 30, the thickness of the sealant layer 16 (the total thickness of the first sealant layer 16a, the second sealant layer 16b, and the third sealant layer 16c) may be 30 µm or less in view of thinning. Even in such a thin film configuration, the packaging material for a power storage device of the present embodiment can suppress decrease in insulating properties after heat seal, molding and degassing heat sealing.

As in the packaging materials for a power storage device 20 and 30, when the sealant layer consists a plurality of layers, it is preferable that the first sealant layer 16a nearest to the metallic foil layer 13 be a low shrinkage sealant layer. Due to the fact that the first sealant layer 16a is a low shrinkage sealant layer, it is possible to improve the adhesion strength of the sea-island interface, and the formation of voids associated with bubbling of the electrolytic solution is suppressed, and therefore, it tends to enable further improvement in the insulating properties after degassing heat sealing. Bubbling of the electrolytic solution in degassing heat sealing often occurs at a portion near to the metallic foil layer 13 of the sealant layer 16, and due to the fact that a layer nearest to the metallic foil layer 13 is a low shrinkage sealant layer, decrease in insulating properties tends to be suppressed more efficiently.

Also, the second sealant layer 16b or the third sealant layer 16c may be a low shrinkage sealant layer. Due to the fact that the second sealant layer 16b or the third sealant layer 16c is a low shrinkage sealant layer, it is possible to improve the adhesion strength of the sea-island interface formed by the (A) and (B) components, and the formation of voids associated with bubbling of the electrolytic solution is suppressed, and it is therefore possible to improve the insulating properties further.

[Method for Producing Packaging Material]

Next, one example of a method for producing the packaging material 10 shown in FIG. 1 will be illustrated. Note that the method for producing the packaging material 10 is not limited to the following method.

A method for producing the packaging material 10 of the present embodiment is generally configured by comprising a step of laminating the anti-corrosion treatment layer 14 on the metallic foil layer 13, a step of bonding the substrate layer 11 and the metallic foil layer 13, a step of further laminating the sealant layer 16 with the interposition of a second adhesive layer 17 to produce a laminate, and where appropriate, a step of subjecting the obtained laminate to aging treatment.

(Step of Laminating Anti-Corrosion Treatment Layer 14 on Metallic Foil Layer 13)

The present step is a step of forming the anti-corrosion treatment layer 14 on the metallic foil layer 13. Examples of the method for this step include methods of, subjecting the metallic foil layer 13 to degreasing treatment, hydrothermal metamorphism treatment, positive electrode oxidation treatment or chemical conversion treatment, or methods of applying a coating agent having anti-corrosion performance to the metallic foil layer 13, as described above.

Also, when the anti-corrosion treatment layer 14 is multilayered, for example, it is possible to apply a coating solution (coating agent) constituting an anti-corrosion treatment layer on the side of the lower layer (on the side of the metallic foil layer 13) to the metallic foil layer 13, followed by burning to form a first layer, and subsequently, applying a coating solution (coating agent) constituting an anti-corrosion treatment layer on the side of the upper layer to the first layer, followed by burning to form a second layer.

It is possible to conduct the degreasing treatment by a spraying process or a dipping process, and it is possible to conduct the hydrothermal metamorphism treatment and the positive electrode oxidizing treatment by a dipping process, and it is possible to conduct the chemical conversion treatment, depending on the type of the chemical conversion treatment, by appropriately selecting a dipping process, a spraying process, coating process, or the like.

With regard to the coating process of the coating agent having anti-corrosion performance, it is possible to use a variety of methods such as gravure coating, reverse coating, roll coating, and bar coating.

As described above, a variety of treatment can be conducted on both faces or one face of the metallic foil; however, in the case where the treatment is conducted on one face of the metallic foil, with regard to the face to be treated, it is preferable to conduct the treatment on the side to which the second adhesive layer 17 is to be laminated. Note that, where appropriate, it is also possible to conduct the above treatment on a surface of the substrate layer 11.

Also, it is preferable for each of the amounts of the coating agent for forming the first and second layers to be 0.005 to 0.200 g/m$^2$, and it is more preferable for each of the amounts to be 0.010 to 0.100 g/m$^2$.

Also, when dry curing is needed, depending on the drying conditions with regard to the anti-corrosion treatment layer 14 to be used, it is possible to conduct dry curing with the temperature of the base material in a range of 60 to 300° C.

(Step of Bonding Substrate Layer 11 with Metallic Foil Layer 13)

The present step is a step of bonding the metallic foil layer 13 on which the anti-corrosion treatment layer 14 is disposed, and the substrate layer 11 with the interposition of the first adhesive layer 12. With regard to the bonding method, the metallic foil layer 13 and the substrate layer 11 are bonded by means of the materials constituting the above-described first adhesive layer 12 using approaches such as dry lamination, non-solvent lamination and wet lamination. The first adhesive layer 12 is provided to be in a range of 1 to 10 g/m$^2$, more preferably in a range of 3 to 7 g/m$^2$ on the basis of the amount for dry application.

(Step of Laminating Second adhesive Layer 17 and Sealant Layer 16)

The present step is a step of bonding the sealant layer 16 to the side of the anti-corrosion treatment layer 14 of the metallic foil layer 13 with the interposition of the second adhesive layer 17. Examples of the method for this bonding include a wet process, and dry lamination, and the like.

In the case of the wet process, a solution or dispersion of the adhesive constituting the second adhesive layer 17 is coated on the anti-corrosion treatment layer 14, and the solvent is evaporated at a predetermined temperature (in a case where the adhesive includes an acid-modified polyolefin resin, at a temperature equal to or higher than the melting point of the acid-modified polyolefin resin), and drying and film forming are conducted, or where appropriate, burning treatments is conducted after drying and film forming. Next, the sealant layers 16 are laminated to produce the packaging material 10. Examples of the coating method include a variety of coating methods illustrated above.

The sealant layer 16 can be produced by, for example, a melt extruder. In particular, when the packaging material 10 according to the second aspect of the present embodiment is produced, it is possible in a melt extruder to set the processing speed to be 80 μm/min or more, in view of productivity. The sealant layer 16 obtained under such a condition tend to have a structure in which the (B) component has been stretched toward the MD direction.

(Step of Aging Treatment)

The present step is a step of subjecting the laminate to aging (curing) treatment. By subjecting the laminate to aging treatment, it is possible to promote adhesion between the metallic foil layer 13/ the anti-corrosion treatment layer 14/ the second adhesive layer 17/ the sealant layer 16. The aging treatment can be conducted in a range of room temperature to 100° C. The aging time is, for example, 1 to 10 days. The packaging material 10 (sealant layer 16) in heating at 190° C. for 30 seconds described with illustration in FIG. 5 may be the packaging material 10 that has been subjected to the above aging treatment.

In this way, it is possible to produce the packaging material 10 of the present embodiment as shown in FIG. 1.

Next, one example of a method for producing the packaging material 20 shown in FIG. 6 will be illustrated. Note that a method for producing the packaging material 20 is not limited to the following method.

A method for producing the packaging material 20 of the present embodiment is generally configured by comprising a step of laminating the anti-corrosion treatment layer 14 on the metallic foil layer 13, a step of bonding the substrate layer 11 and the metallic foil layer 13, a step of further laminating the first sealant layer 16a and the second sealant layer 16b to produce a laminate, and where appropriate, a step of subjecting the obtained laminate to heat treatment. Note that it is possible to conduct the steps up to the step of bonding the substrate layer 11 and the metallic foil layer 13, in a manner analogous to as in the method for producing the above-described packaging material 10.

(Step of Laminating First Sealant Layer 16a and Second Sealant Layer 16b)

The present step is a step of forming the first sealant layer 16a and the second sealant layer 16b on the anti-corrosion treatment layer 14 formed by the previous step. Examples of the method for this step include a method for subjecting the first sealant layer 16a together with the second sealant layer 16b to sandwich lamination by use of an extrusion laminating machine. In addition, this laminating can be conducted by a tandem laminating process for extruding the first sealant layer 16a and the second sealant layer 16b, or by a coextrusion process. In the formation of the first sealant layer 16a and the second sealant layer 16b, for example, the components are mixed with each other so as to meet the configuration of the first sealant layer 16a and the second sealant layer 16b described above.

By means of the present step, a laminate in which each of the layers are laminated in order of the substrate layer 11/the first adhesive layer 12/the metallic foil layer 13/the anti-corrosion treatment layer 14/the first sealant layer 16a/the second sealant layer 16b as shown in FIG. 6 is obtained.

Note that the first sealant layer 16a can be obtained by directly laminating materials that have been dry-blended with an extrusion laminating machine so as to achieve the mixing composition of the materials described above, or can be obtained by laminating, with an extrusion laminating machine, the granulated first sealant layer 16a that has been subjected to melt blending with a melt kneading machine such as a single-screw extruder, a twin-screw extruder, and a Brabender mixer in advance.

The second sealant layer 16b can be obtained by directly laminating, as constituents for forming the sealant layer, materials that have been dry-blended with an extrusion laminating machine so as to achieve the mixing composition of the materials described above, or can be obtained by laminating, with an extrusion laminating machine, granulation products that have been subjected to melt blending with a melt kneading machine such as a single-screw extruder, a twin-screw extruder, and a Brabender mixer in advance, according to a tandem laminating process for extruding the first sealant layer 16a and the second sealant layer 16b, or according to a coextrusion process. Also, by using the constituents for forming the sealant layer, it is possible to form a single film of the sealant as a casted film in advance, and it is possible to laminate the single film of the sealant by a method in which this film is subjected to sandwich lamination together with an adhesive resin, or it is possible to laminate the single film of the sealant by a dry lamination process using an adhesive. In particular, when the packaging material 20 according to the second aspect of the present embodiment is produced, the formation speed (processing speed) of the sealant layers 16a, 16b can be, for example, 80 μm/min or more, in view of productivity. The sealant layers 16a, 16b obtained under such a condition tend to have a structure in which the (B) component has been stretched toward the MD direction.

(Step of Heat Treatment)

The present step is a step of subjecting the laminate to heat treatment. By subjecting the laminate to heat treatment, it is possible to improve the adhesion between the metallic foil layer 13/the anti-corrosion treatment layer 14/the first sealant layer 16a/the second sealant layer 16b to impart better electrolytic solution resistance and hydrofluoric acid resistance to the laminate. With regard to the method for heat treatment, it is preferable to conduct the heat treatment at a temperature, at least higher than or equal to the melting points of the first sealant layer 16a. Examples of the heat treatment include, but are not limited to, approaches such as heating by an oven, sandwiching by a heated roll (heat lamination), wrapping around a heated roll. Depending on an approach to conducting heat treatment, temperature conditions, and the like, it is possible to adjust the heat treatment time appropriately, in view of the performance (the adhesion strength (laminating strength) between the metallic foil layer 13/the anti-corrosion treatment layer 14/the first sealant layer 16a/the second sealant layer 16b) and in view of productivity. For example, when heat treatment is conducted by means of an approach to sandwiching by a heated roll or by means of an approach to wrapping around a heated roll, it is possible for the heat treatment time to be 0.5 seconds or more in view of the above performance, and it is possible for the heat treatment time to be 1.0 seconds or less in view of productivity. Also, the packaging material 20 (sealant layer 16) in heating at 190° C. for 30 seconds described with illustration in FIG. 5 may be the packaging material that has been subjected to the above aging treatment or heat treatment.

In this way, it is possible to produce the packaging material 20 of the present embodiment as shown in FIG. 6.

Next, one example of a method for producing the packaging material 30 shown in FIG. 7 will be illustrated. Note that the method for producing the packaging material 30 is not limited to the following method.

A method for producing the packaging material 30 of the present embodiment is generally configured by comprising a step of laminating the anti-corrosion treatment layer 14 on the metallic foil layer 13, a step of bonding the substrate layer 11 and the metallic foil layer 13, a step of further laminating the first sealant layer 16a, the third sealant layer 16c and the second sealant layer 16b to produce a laminate, and where appropriate, a step of subjecting the obtained laminate to heat treatment.

(Step of Laminating First Sealant Layer 16a, Third Sealant Layer 16c, and Second Sealant Layer 16b)

The present step is a step of forming first sealant layer 16a, third sealant layer 16c and second sealant layer 16b on the anti-corrosion treatment layer 14. Examples of the method for this step include a tandem laminating process for extruding the first sealant layer 16a and the third sealant layer 16c and second sealant layer 16b by use of an extrusion laminating machine, and a coextrusion process. In this case, as constituents for forming the sealant layer, materials that have been dry-blended with an extrusion laminating machine can be directly laminated so as to achieve the mixing composition of the materials described above, or granulation products that have been subjected to melt blending with a melt kneading machine such as a single-screw extruder, a twin-screw extruder, and a Brabender mixer in advance can be laminated by a tandem laminating process for extruding the first sealant layer 16a and the third sealant layer 16c and the second sealant layer 16b by use of an extrusion laminating machine, or a coextrusion process.

The third sealant layer 16c and the second sealant layer 16b are formed as films by coextrusion, and these films may be laminated by a method for subjecting these films together with constituents for forming the first sealant layer 16a to sandwich lamination. In particular, when the packaging material 30 according to the second aspect of the present embodiment is produced, the formation speed (processing speed) of the sealant layers 16a, 16b, 16c can be, for example, 80 μm/min or more, in view of productivity. The sealant layers 16a, 16b, 16c obtained under such a condition tend to have a structure in which the (B) component has been stretched toward the MD direction. The method for producing the packaging material 30 of the present embodiment may comprise the step of heat treatment described above with reference to a method for producing the packaging material 20. The approach to conducting heat treatment and the conditions of heat treatment can be analogous to those described above with reference to a method for producing the packaging material 20.

In this way, it is possible to produce the packaging material 30 of the present embodiment as shown in FIG. 7.

Although preferable embodiments of the packaging material for a power storage device according to the present invention have been described above in detail, the present invention is not limited to such certain embodiments, and a variety of variations and modifications can be made within the scope of the present invention defined in the claims. For example, in the case where a packaging material for a power storage device having no first adhesive layer 12 is produced, it is possible to apply or coat a resin material that can form the substrate layer 11 on the metallic foil layer 13 to form a substrate layer 11, as described above. Also, in the second aspect of the above embodiment, any of the existing region of the (B) component is described to shrink slightly in the low shrinkage sealant layer due to heating; however, the low shrinkage sealant layer may be a low shrinkage sealant layer that does not shrink due to heating.

The packaging material for a power storage device of the present invention can be suitably used as a packaging material for a power storage device such as, for example, secondary batteries such as lithium ion batteries, nickel-hydrogen batteries and lead storage batteries, as well as electrochemical capacitors such as electric double layer capacitors. Among these, the packaging material for a power storage device of the present invention is suitable as a packaging material for a lithium ion battery.

EXAMPLES

The present invention will be specifically illustrated below with reference to Examples; however, the present invention is not limited to the following Examples.

(1) Examples and Comparison Examples According to First Aspect

[Materials Used]

The material used in Examples 1-1 to 1-32 and Comparative Examples 1-1 to 1-2 are shown as follows.

<Substrate Layer (Thickness of 15 μm)>

A nylon film (Ny) (manufactured by Toyobo Co., Ltd.) was used.

<First Adhesive Layer (Thickness of 4 μm)>

A polyurethane-based adhesive (manufactured by TOYO INK Co., Ltd.) in which a curing agent based on an adduct of tolylenediisocyanate is mixed into a polyester polyol-based base material was used.

<First Anti-Corrosion Treatment Layer (on the Side of Substrate Layer) and Second Anti-Corrosion Treatment Layer (on the Side of Sealant Layer)>

(CL-1): A "sol of sodium polyphosphate stabilized cerium oxide" in which the concentration of solids has been adjusted to 10% by mass using distilled water as a solvent was used. Note that the sol of sodium polyphosphate stabilized cerium oxide was obtained by the incorporation of 10 parts by mass of Na salt of phosphoric acid per 100 parts by mass of cerium oxide.

(CL-2): A composition consisting of 90% by mass of "polyallylamine (manufactured by Nitto Boseki Co., Ltd.)" in which the concentration of solids has been adjusted to 5% by mass using distilled water as a solvent, and 10% by mass of "polyglycerol polyglycidyl ether (manufactured by Nagase ChemteX Corporation)" was used.

(CL-3): On the basis of a water soluble phenol resin (manufactured by Sumitomo Bakelite Co., Ltd.) in which the concentration of solids has been adjusted to 1% by mass using an aqueous solution of phosphoric acid at the concentration of 1% by mass as a solvent, a chemical conversion treating agent in which the concentration of chromium fluoride ($CrF_3$) has been adjusted to be 10 mg/m² in terms of the amount of Cr present in the final dried coat was used.

<Metallic Foil Layer (thickness of 35 μm)>

A soft aluminum foil (manufactured by Toyo Aluminum K.K., "8079 material") subjected to annealing degreasing treatment was used.

<Second Adhesive Layer (thickness of 3 jam)>

The following adhesives a, b were provided as adhesives for forming a second adhesive layer.

Adhesive a: an adhesive in which 10 parts by mass (the ratio by solids) of a polyisocyanate compound with an isocyanurate structure was mixed per 100 parts by mass of an acid-modified polyolefin resin dissolved in toluene.

Adhesive b: a polyurethane-based adhesive prepared by formulating a polyester polyol consisting of a hydrogenated dimeric fatty acid and a diol, and a polyisocyanate in a molar ratio (NCO/OH) of 2.

<Sealant Layer>

[Base Resin Composition]

As a base resin composition for forming the sealant layer, the resins RC1 to RC9 were provided in the mass ratios as described in Table 1 and Table 2. Note that details regarding the terms used in Table 1 and Table 2 are as follows.

((A) Component)

Acid-modified PP: an acid-modified polypropylene.

Random PP: propylene-ethylene random copolymer.

((B) Component)

Ethylene-α-olefin copolymer: an ethylene-propylene copolymer elastomer not having compatibility with acid-modified PP ((A) component).

Ethylene-butene-1 random copolymer: an ethylene-butene-1 random copolymer elastomer not having compatibility with random PP ((A) component).

Reactor type TPO: a dispersion obtained by microdispersing an ethylene-based rubber to polypropylene.

Dynamically crosslinked (using peroxide) PP-based elastomer (TPV): a dispersion obtained by microdispersing the crosslinked elastomer in polypropylene, in which the crosslinked elastomer is subjected to grafting, and the grafted portion constitutes the interface with polypropylene.

Block copolymer 1: a block copolymer configured by crystalline ethylene units and ethylene-butylene units, and not having compatibility with random PP ((A) component).

Block copolymer 2: a block copolymer configured by propylene units and ethylene units, and not having compatibility with random PP ((A) component).

Graft copolymer: a graft copolymer consisting of a main chain of polyolefin and a side chain of polystyrene, and not having compatibility with random PP ((A) component).

((C) Component)

Copolymer with an atactic structure: a propylene-α-olefin copolymer with an atactic structure having compatibility with acid-modified PP ((A) component).

Propylene-butene-1 random copolymer: a propylene-butene-1 random copolymer elastomer having compatibility with random PP ((A) component).

Note that reactor type TPO and the dynamically crosslinked PP-based elastomer undergoes the dispersion of the (B) component in the (A) component. For the sake of convenience, in Table 1, for example, reactor type TPO is described to be classified into the (B) component; however, the mass ratio (10.0) of reactor type TPO shown in Table 1 represents the amount of the component corresponding to the (B) component in reactor type TPO. The amount of the component corresponding to the (A) component in reactor type TPO is included in the mass ratio (70.0) of random PP. Likewise, the mass ratio (10.0) of the dynamically crosslinked PP-based elastomer shown in Table 1 represents the amount of the component corresponding to the (B) component in the dynamically crosslinked PP-based elastomer, and the amount of the component corresponding to the (A) component in the dynamically crosslinked PP-based elastomer is included in the mass ratio (70.0) of random PP.

TABLE 1

| | | Resin | | | | | | | | | | | | | | |
|---|---|---|---|---|---|---|---|---|---|---|---|---|---|---|---|---|
| | | RC1 | RC2 | RC3 | RC4 | RC5 | RC6 | RC7 | RC8 | RC9 | RC10 | RC11 | RC12 | RC13 | RC14 | RC15 |
| (A) | Acid-modified PP | 55.0 | 72.7 | — | — | — | 50.0 | 52.4 | 50.0 | — | — | — | — | — | — | 55.0 |
| | Random PP | — | — | 70.0 | 70.0 | 70.0 | — | — | — | 63.6 | 66.7 | 63.6 | 70.0 | 70.0 | 70.0 | — |
| (B) | Ethylene-α-olefin copolymer | 20.0 | 18.2 | — | — | — | 18.2 | 19.0 | 18.2 | — | — | — | — | — | — | — |
| | Ethylene-butene-1 random copolymer | — | — | 10.0 | — | — | — | — | — | 9.1 | 9.5 | 9.1 | — | — | — | — |
| | Reactor type TPO | — | — | — | 10.0 | — | — | — | — | — | — | — | — | — | — | — |

TABLE 1-continued

| | | Resin | | | | | | | | | | | | | | |
|---|---|---|---|---|---|---|---|---|---|---|---|---|---|---|---|---|
| | | RC1 | RC2 | RC3 | RC4 | RC5 | RC6 | RC7 | RC8 | RC9 | RC10 | RC11 | RC12 | RC13 | RC14 | RC15 |
| (B1) | Dynamically crosslinked PP-based elastomer | — | — | — | — | 10.0 | — | — | — | — | — | — | — | — | — | — |
| | Block copolymer 1 | — | 9.1 | — | — | — | 9.1 | 4.8 | — | 9.1 | 4.8 | — | 10.0 | — | — | — |
| | Block copolymer 2 | — | — | — | — | — | — | — | 9.1 | — | — | 9.1 | — | 10.0 | — | 20.0 |
| | Graft copolymer | — | — | — | — | — | — | — | — | — | — | — | — | — | 10.0 | — |
| (C) | Copolymer with an atactic structure | 25.0 | — | — | — | — | 22.7 | 23.8 | 22.7 | — | — | — | — | — | — | 25.0 |
| | Propylene-butene-1 random copolymer | — | — | 20.0 | 20.0 | 20.0 | — | — | — | 18.2 | 19.0 | 18.2 | 20.0 | 20.0 | 20.0 | — |

TABLE 2

| | | Resin | | | |
|---|---|---|---|---|---|
| | | RC16 | RC17 | RC18 | RC19 |
| (A) | Acid-modified PP | 75.0 | 52.0 | — | — |
| | Random PP | — | — | 80.0 | 52.0 |
| (B) | Ethylene-α-olefin copolymer | — | 45.0 | — | — |
| | Propylene-butene-1 random copolymer | — | — | — | 45.0 |
| (C) | Copolymer with an atactic structure | 25.0 | 3.0 | — | — |
| | Propylene-butene-1 random copolymer | — | — | 20.0 | 3.0 |

Example 1-1

First of all, the first and second anti-corrosion treatment layers were disposed on the metallic foil layer by the following procedure. In other words, (CL-1) was applied onto both faces of the metallic foil layer so as to achieve a dry amount to be applied of 70 mg/m² by microgravure coating, and was subjected to burning treatment at 200° C. in a drying unit. Then, (CL-2) was applied onto the obtained layer so as to achieve a dry amount to be applied of 20 mg/m² by microgravure coating to form a composite layer consisting of (CL-1) and (CL-2) as the first and second anti-corrosion treatment layers. This composite layer undergoes the expression of anti-corrosion performance by combination of two materials of (CL-1) and (CL-2).

Next, the side of the first anti-corrosion treatment layer of the metallic foil layer on which the first and second anti-corrosion treatment layers were disposed was bonded onto the substrate layer by a dry laminating approach using a polyurethane-based adhesive (first adhesive layer). This was placed at an unwinding unit of the extrusion laminating machine, and was coextruded together with the materials of the sealant layer on the second anti-corrosion treatment layer under processing conditions of 270° C. and 100 μm/min to laminate, as sealant layers, a layer on the side of the metal-foil (hereinafter, also referred to as "AL side layer") (thickness of 8.3 μm) and the innermost layer (thickness of 16.7 μm) in this order. Note that, with regard to the AL side layer and the innermost layer, a variety of compounds of their materials have been produced by a twin-screw extruder in advance, and after steps of water cooling and pelletization, were used in the above extrusion laminating. For the formation of the AL side layer, the resin RC1 was used. For the formation of the innermost layer (corresponding to the sealant layer 16b), the resin RC3 was used.

The laminate obtained in this way was subjected to heat treatment so as to set the highest achieved temperature of the laminate at 190° C., thereby producing the packaging material of Example 1-1 (a laminate of the substrate layer/the first adhesive layer/the first anti-corrosion treatment layer/the metallic foil layer/the second anti-corrosion treatment layer/the AL side layer (sealant layer 16a)/the innermost layer (sealant layer 16b)).

Example 1-2

The packaging material of Example 1-2 was produced in a manner analogous to as in Example 1-1, except for the fact that the material used in the formation of the innermost layer (sealant layer 16b) was replaced with the resin RC4.

Example 1-3

The packaging material of Example 1-3 was produced in a manner analogous to as in Example 1-1, except for the fact that the material used in the formation of the innermost layer (sealant layer 16b) was replaced with the resin RC5.

Example 1-4

The packaging material of Example 1-4 was produced in a manner analogous to as in Example 1-2, except for the fact that the material used in the formation of the AL side layer (sealant layer 16a) was replaced with the resin RC8.

Example 1-5

The packaging material of Example 1-5 was produced in a manner analogous to as in Example 1-2, except for the fact that the material used in the formation of the AL side layer (sealant layer 16a) was replaced with the resin RC6.

Example 1-6

The packaging material of Example 1-6 was produced in a manner analogous to as in Example 1-3, except for the fact that the material used in the formation of the AL side layer (sealant layer 16a) was replaced with the resin RC8.

Example 1-7

The packaging material of Example 1-7 was produced in a manner analogous to as in Example 1-1, except for the fact that the material used in the formation of the AL side layer (sealant layer 16a) was replaced with the resin RC6, and the material used in the formation of the innermost layer (sealant layer 16b) was replaced with the resin RC9.

Example 1-8

The packaging material of Example 1-8 was produced in a manner analogous to as in Example 1-1, except for the fact that the material used in the formation of the AL side layer (sealant layer 16a) was replaced with the resin RC7, and the material used in the formation of the innermost layer (sealant layer 16b) was replaced with the resin RC10.

Example 1-9

The packaging material of Example 1-9 was produced in a manner analogous to as in Example 1-1, except for the fact that the material used in the formation of the AL side layer (sealant layer 16a) was replaced with the resin RC8, and the material used in the formation of the innermost layer (sealant layer 16b) was replaced with the resin RC11.

Example 1-10

The packaging material of Example 1-10 was produced in a manner analogous to as in Example 1-1, except for the fact that the material used in the formation of the AL side layer (sealant layer 16a) was replaced with the resin RC6.

Example 1-11

The packaging material of Example 1-11 was produced in a manner analogous to as in Example 1-1, except for the fact that the material used in the formation of the AL side layer (sealant layer 16a) was replaced with the resin RC8.

Example 1-12

The packaging material of Example 1-12 was produced in a manner analogous to as in Example 1-1, except for the fact that the material used in the formation of the innermost layer (sealant layer 16b) was replaced with the resin RC9.

Example 1-13

The packaging material of Example 1-13 was produced in a manner analogous to as in Example 1-1, except for the fact that the material used in the formation of the innermost layer (sealant layer 16b) was replaced with the resin RC11.

Example 1-14

The packaging material of Example 1-14 was produced in a manner analogous to as in Example 1-7, except for the fact that the material used in the formation of the AL side layer (sealant layer 16a) was replaced with the resin RC2.

Example 1-15

First of all, the first and second anti-corrosion treatment layers were disposed on the metallic foil layer by the following procedure. In other words, (CL-3) was applied onto both faces of the metallic foil layer so as to achieve a dry amount to be applied of 30 mg/m$^2$ by microgravure coating, and was subjected to burning treatment at 200° C. in a drying unit. Then, (CL-2) was applied onto the obtained layer so as to achieve a dry amount to be applied of 20 mg/m$^2$ by microgravure coating to form a composite layer consisting of (CL-3) and (CL-2) as the first and second anti-corrosion treatment layers. This composite layer undergoes the expression of anti-corrosion performance by combination of two materials of (CL-3) and (CL-2). In this way, the packaging material of Example 1-15 was produced in a manner analogous to as in Example 1-7, except for the fact that the metallic foil layer on which the first and second anti-corrosion treatment layers were disposed was used.

Example 1-16

The first and second anti-corrosion treatment layers were disposed on the metallic foil layer in a manner analogous to as in Example 1-1. The side of the first anti-corrosion treatment layer of the metallic foil layer on which the first and second anti-corrosion treatment layers were disposed was bonded onto the substrate layer by a dry laminating approach using a polyurethane-based adhesive (first adhesive layer). Then, the side of the second anti-corrosion treatment layer of the metallic foil layer on which the first and second anti-corrosion treatment layers were disposed was bonded to the sealant layer 16 (the innermost layer) (thickness of 25 µm) by a dry laminating approach using the adhesive a (the second adhesive layer) to produce the packaging material of Example 1-16. For the formation of the innermost layer (sealant layer 16), the mixture with resin RC9 was used.

Example 1-17

The first and second anti-corrosion treatment layers were disposed on the metallic foil layer in a manner analogous to as in Example 1-1. The side of the first anti-corrosion treatment layer of the metallic foil layer on which the first and second anti-corrosion treatment layers were disposed was bonded onto the substrate layer by a dry laminating approach using a polyurethane-based adhesive (first adhesive layer). Then, the side of the second anti-corrosion treatment layer of the metallic foil layer on which the first and second anti-corrosion treatment layers were disposed was bonded to the sealant layer 16 (the innermost layer) (thickness of 25 µm) by a dry laminating approach using the adhesive b (the second adhesive layer) to produce the packaging material of Example 1-17. For the formation of the innermost layer (sealant layer 16), the mixture with resin RC9 was used.

Example 1-18

The packaging material of Example 1-18 was produced in a manner analogous to as in Example 1-1, except for the fact that the material used in the formation of the AL side layer (sealant layer 16a) was replaced with the resin RC6, and the material used in the formation of the innermost layer (sealant layer 16b) was replaced with the resin RC12.

Example 1-19

The packaging material of Example 1-19 was produced in a manner analogous to as in Example 1-1, except for the fact that the material used in the formation of the AL side layer (sealant layer 16a) was replaced with the resin RC8, and the material used in the formation of the innermost layer (sealant layer 16b) was replaced with the resin RC13.

Example 1-20

The packaging material of Example 1-20 was produced in a manner analogous to as in Example 1-1, except for the fact that the material used in the formation of the AL side layer (sealant layer 16a) was replaced with the resin RC8, and the material used in the formation of the innermost layer (sealant layer 16b) was replaced with the resin RC14.

Example 1-21

The packaging material of Example 1-21 was produced in a manner analogous to as in Example 1-7, except for the fact that the thickness of the AL side layer (sealant layer 16a) was changed to 3.3 m, and the thickness of the innermost layer (sealant layer 16b) was changed to 6.7 μm.

Example 1-22

The packaging material of Example 1-22 was produced in a manner analogous to as in Example 1-9, except for the fact that the thickness of the AL side layer (sealant layer 16a) was changed to 3.3 μm, and the thickness of the innermost layer (sealant layer 16b) was changed to 6.7 μm.

Example 1-23

The packaging material of Example 1-23 was produced in a manner analogous to as in Example 1-5, except for the fact that the thickness of the AL side layer (sealant layer 16a) was changed to 15 μm, and the thickness of the innermost layer (sealant layer 16b) was changed to 30 μm.

Example 1-24

The packaging material of Example 1-24 was produced in a manner analogous to as in Example 1-6, except for the fact that the thickness of the AL side layer (sealant layer 16a) was changed to 15 μm, and the thickness of the innermost layer (sealant layer 16b) was changed to 30 μm.

Example 1-25

The packaging material of Example 1-25 was produced in a manner analogous to as in Example 1-9, except for the fact that the thickness of the AL side layer (sealant layer 16a) was changed to 15 μm, and the thickness of the innermost layer (sealant layer 16b) was changed to 30 μm.

Example 1-26

The packaging material of Example 1-26 was produced in a manner analogous to as in Example 1-5, except for the fact that the thickness of the AL side layer (sealant layer 16a) was changed to 20 μm, and the thickness of the innermost layer (sealant layer 16b) was changed to 40 μm.

Example 1-27

The packaging material of Example 1-27 was produced in a manner analogous to as in Example 1-6, except for the fact that the thickness of the AL side layer (sealant layer 16a) was changed to 20 μm, and the thickness of the innermost layer (sealant layer 16b) was changed to 40 μm.

Example 1-28

The packaging material of Example 1-28 was produced in a manner analogous to as in Example 1-9, except for the fact that the thickness of the AL side layer (sealant layer 16a) was changed to 20 μm, and the thickness of the innermost layer (sealant layer 16b) was changed to 40 μm.

Example 1-29

The packaging material of Example 1-29 was produced in a manner analogous to as in Example 1-5, except for the fact that the thickness of the AL side layer (sealant layer 16a) was changed to 26.7 μm, and the thickness of the innermost layer (sealant layer 16b) was changed to 53.3 μm.

Example 1-30

The packaging material of Example 1-30 was produced in a manner analogous to as in Example 1-6, except for the fact that the thickness of the AL side layer (sealant layer 16a) was changed to 26.7 μm, and the thickness of the innermost layer (sealant layer 16b) was changed to 53.3 μm.

Example 1-31

The packaging material of Example 1-31 was produced in a manner analogous to as in Example 1-9, except for the fact that the thickness of the AL side layer (sealant layer 16a) was changed to 26.7 μm, and the thickness of the innermost layer (sealant layer 16b) was changed to 53.3 μm.

Example 1-32

The packaging material of Example 1-32 was produced in a manner analogous to as in Example 1-1, except for the fact that the material used in the formation of the AL side layer (sealant layer 16a) was replaced with the resin RC15, and the material used in the formation of the innermost layer (sealant layer 16b) was replaced with the resin RC13.

Comparative Example 1-1

The packaging material of Comparative Example 1-1 was produced in a manner analogous to as in Example 1-1, except for the fact that the material used in the formation of the AL side layer (sealant layer 16a) was replaced with the resin RC16, and the material used in the formation of the innermost layer (sealant layer 16b) was replaced with the resin RC18.

Comparative Example 1-2

The packaging material of Comparative Example 1-2 was produced in a manner analogous to as in Example 1-1, except for the fact that the material used in the formation of the AL side layer (sealant layer 16a) was replaced with the resin RC17, and the material used in the formation of the innermost layer (sealant layer 16b) was replaced with the resin RC19.

The primary conditions with regard to Examples 1-1 to 1-32 and Comparative Examples 1-1 to 1-2 are shown in Table 3 and Table 4.

TABLE 3

| | Anti-corrosion treatment layer | Second adhesive | Sealant layer | | | | |
|---|---|---|---|---|---|---|---|
| | | | Type of constituent and thickness of each layer | | Total content of each component in total of constituents in sealant layer | | |
| | | | AL side layer | Innermost layer | (B) Component | Compound (B1) | (C) Component |
| Example 1-1 | (CL-1) + (CL-2) | — | Resin RC1 (8.3 μm) | Resin RC3 (16.7 μm) | 13.3% by mass | — | 21.7% by mass |
| Example 1-2 | (CL-1) + (CL-2) | — | Resin RC1 (8.3 μm) | Resin RC4 (16.7 μm) | 13.3% by mass | — | 21.7% by mass |
| Example 1-3 | (CL-1) + (CL-2) | — | Resin RC1 (8.3 μm) | Resin RC5 (16.7 μm) | 13.3% by mass | 6.7% by mass | 21.7% by mass |
| Example 1-4 | (CL-1) + (CL-2) | — | Resin RC8 (8.3 μm) | Resin RC4 (16.7 μm) | 15.8% by mass | 3.0% by mass | 20.9% by mass |
| Example 1-5 | (CL-1) + (CL-2) | — | Resin RC6 (8.3 μm) | Resin RC4 (16.7 μm) | 15.8% by mass | 3.0% by mass | 20.9% by mass |
| Example 1-6 | (CL-1) + (CL-2) | — | Resin RC8 (8.3 μm) | Resin RC5 (16.7 μm) | 15.8% by mass | 9.7% by mass | 20.9% by mass |
| Example 1-7 | (CL-1) + (CL-2) | — | Resin RC6 (8.3 μm) | Resin RC9 (16.7 μm) | 21.2% by mass | 9.1% by mass | 19.7% by mass |
| Example 1-8 | (CL-1) + (CL-2) | — | Resin RC7 (8.3 μm) | Resin RC10 (16.7 μm) | 17.5% by mass | 4.8% by mass | 20.6% by mass |
| Example 1-9 | (CL-1) + (CL-2) | — | Resin RC8 (8.3 μm) | Resin RC11 (16.7 μm) | 21.2% by mass | 9.1% by mass | 19.7% by mass |
| Example 1-10 | (CL-1) + (CL-2) | — | Resin RC6 (8.3 μm) | Resin RC3 (16.7μm) | 15.8% by mass | 3.0% by mass | 20.9% by mass |
| Example 1-11 | (CL-1) + (CL-2) | — | Resin RC8 (8.3 μm) | Resin RC3 (16.7 μm) | 15.8% by mass | 3.0% by mass | 20.9% by mass |
| Example 1-12 | (CL-1) + (CL-2) | — | Resin RC1 (8.3 μm) | Resin RC9 (16.7 μm) | 18.8% by mass | 6.1% by mass | 20.5% by mass |
| Example 1-13 | (CL-1) + (CL-2) | — | Resin RC1 (8.3 μm) | Resin RC11 (16.7 μm) | 18.8% by mass | 6.1% by mass | 20.5% by mass |
| Example 1-14 | (CL-1) + (CL-2) | — | Resin RC2 (8.3 μm) | Resin RC9 (16.7 μm) | 21.2% by mass | 9.1% by mass | 12.1% by mass |
| Example 1-15 | (CL-3) + (CL-2) | — | Resin RC6 (8.3 μm) | Resin RC9 (16.7 μm) | 21.2% by mass | 9.1% by mass | 19.7% by mass |
| Example 1-16 | (CL-1) + (CL-2) | Adhesive a | — | Resin RC9 (25 μm) | 18.2% by mass | 9.1% by mass | 18.2% by mass |
| Example 1-17 | (CL-1) + (CL-2) | Adhesive b | — | Resin RC9 (25 μm) | 18.2% by mass | 9.1% by mass | 18.2% by mass |
| Example 1-18 | (CL-1) + (CL-2) | — | Resin RC6 (8.3 μm) | Resin RC12 (16.7 μm) | 15.8% by mass | 9.7% by mass | 20.9% by mass |
| Example 1-19 | (CL-1) + (CL-2) | — | Resin RC8 (8.3 μm) | Resin RC13 (16.7 μm) | 15.8% by mass | 9.7% by mass | 20.9% by mass |
| Example 1-20 | (CL-1) + (CL-2) | — | Resin RC8 (8.3 μm) | Resin RC14 (16.7 μm) | 15.8% by mass | 9.7% by mass | 20.9% by mass |

TABLE 4

| | Anti-corrosion treatment layer | Sealant layer | | | | |
|---|---|---|---|---|---|---|
| | | Type of constituent and thickness of each layer | | Total content of each component in total of constituents in sealant layer | | |
| | | AL side layer | Innermost layer | (B) Component | Compound (B1) | (C) Component |
| Example 1-21 | (CL-1) + (CL-2) | Resin RC6 (3.3 μm) | Resin RC 9 (6.7 μm) | 21.2% by mass | 9.1% by mass | 19.7% by mass |
| Example 1-22 | (CL-1) + (CL-2) | Resin RC8 (3.3 μm) | Resin RC11 (6.7 μm) | 21.2% by mass | 9.1% by mass | 19.7% by mass |
| Example 1-23 | (CL-1) + (CL-2) | Resin RC6 (15 μm) | Resin RC4 (30 μm) | 16.1% by mass | 9.7% by mass | 21.0% by mass |
| Example 1-24 | (CL-1) + (CL-2) | Resin RC8 (15 μm) | Resin RC5 (30 μm) | 21.2% by mass | 9.1% by mass | 21.0%by mass |
| Example 1-25 | (CL-1) + (CL-2) | Resin RC8 (15 μm) | Resin RC11 (30 μm) | 16.1% by mass | 3.2% by mass | 19.7% by mass |
| Example 1-26 | (CL-1) + (CL-2) | Resin RC6 (20 μm) | Resin RC4 (40 μm) | 16.1% by mass | 9.7% by mass | 21.0% by mass |
| Example 1-27 | (CL-1) + (CL-2) | Resin RC8 (20 μm) | Resin RC5 (40 μm) | 21.2% by mass | 9.1% by mass | 21.0% by mass |
| Example 1-28 | (CL-1) + (CL-2) | Resin RC8 (20 μm) | Resin RC11 (40 μm) | 16.1% by mass | 3.2% by mass | 19.7% by mass |

TABLE 4-continued

| | | Sealant layer | | | | |
|---|---|---|---|---|---|---|
| | | Type of constituent and thickness of each layer | | Total content of each component in total of constituents in sealant layer | | |
| | Anti-corrosion treatment layer | AL side layer | Innermost layer | (B) Component | Compound (B1) | (C) Component |
| Example 1-29 | (CL-1) + (CL-2) | Resin RC6 (26.7 μm) | Resin RC4 (53.3 μm) | 16.1% by mass | 9.7% by mass | 21.0% by mass |
| Example 1-30 | (CL-1) + (CL-2) | Resin RC8 (26.7 μm) | Resin RC5 (53.3 μm) | 21.2% by mass | 9.1% by mass | 21.0% by mass |
| Example 1-31 | (CL-1) + (CL-2) | Resin RC8 (26.7 μm) | Resin RC11 (53.3 μm) | 16.1% by mass | 3.2% by mass | 19.7% by mass |
| Example 1-32 | (CL-1) + (CL-2) | Resin RC15 (8.3 μm) | Resin RC13 (16.7 μm) | 13.3% by mass | 13.3% by mass | 21.7% by mass |
| Comparative Example 1-1 | (CL-1) + (CL-2) | Resin RC16 (8.3 μm) | Resin RC18 (16.7 μm) | — | — | 21.7% by mass |
| Comparative Example 1-2 | (CL-1) + (CL-2) | Resin RC17 (8.3 μm) | Resin RC19 (16.7 μm) | 45.0% by mass | — | 3.0% by mass |

<Evaluation>

The following evaluation tests were conducted on the packaging materials obtained in Examples and Comparative Examples.

(Seal Strength)

Figure 8:
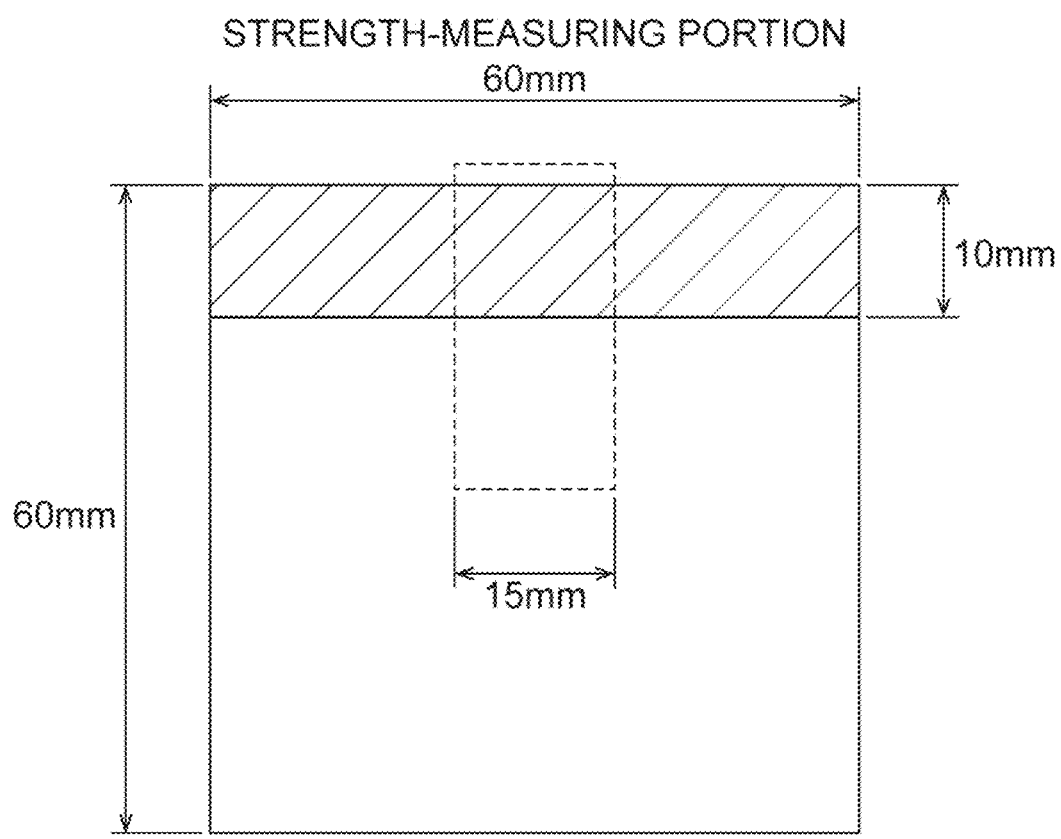
FIG. 8 is a schematic view illustrating a method for producing a sample to be evaluated in Examples.

A sample obtained by cutting the packaging material into 60 mm×120 mm was folded into two so as to locate the sealant layer at the inner side, and one side of the folded sample was heat-sealed with a sealing bar with a width of 10 mm at 190° C. and 0.5 MPa for 3 seconds to form an adhered portion. After storing at normal temperatures for 24 hours, the firstly heat-sealed one side was cut to have a width of 15 mm (see FIG. 8), and the seal strength (T-peel strength) from one end in a direction of the width of the adhered portion to the other end was continuously measured by a testing machine (manufactured by INSTRON). The test was conducted according to JIS K6854 at 23° C. under an atmosphere of 50% RH with a peeling rate of 50 mm/min. In a graph showing a relationship between a displacement starting at the one end of the adhered portion and the seal strength (see FIG. 3), the initial maximal value of load after the start of peeling was considered as the maximum seal strength $S_M$ (N/15 mm). Also, in the above graph, when the stable range of the seal strength to displacement (mm) (the region in which the variation in seal strength of ±3 N/15 mm or less has been continued over 5 mm or more) is present, average seal strength $S_S$ in the stable range was calculated, and a ratio $S_S/S_M$ of average seal strength $S_S$ to maximum seal strength $S_M$ was determined. Also, when the above stable range is not present in the above graph, seal strengths per mm in displacements from the displacement resulting in the maximum seal strength to the other end of the heat-sealed portion was measured (see FIG. 4), and average seal strength $S_A$ obtained by averaging these was calculated. The ratio $S_A/S_M$ of the calculated average seal strength $S_A$ to maximum seal strength $S_M$ was determined.

(Electrolytic Solution Laminating Strength)

An electrolytic solution in which $LiPF_6$ was added to a mixed solution of ethylene carbonate/diethyl carbonate/dimethyl carbonate=1/1/1 (mass ratio) to achieve an amount of 1 M was loaded in a Teflon (R) vessel, and a sample obtained by cutting the packaging material into 15 mm×100 mm was placed in this vessel, and after well-stoppered, this vessel was stored at 85° C. for 24 hours. Next, washing together was conducted, and laminating strength (T-peel strength) between the metallic foil layer/the sealant layer was measured by a testing machine (manufactured by INSTRON). The test was conducted according to JIS K6854 at 23° C. under an atmosphere of 50% RH with a peeling rate of 50 mm/min. On the basis of the results, evaluation was conducted according to the following criteria.

A: Laminating strength is greater than 7 N/15 mm
B: Laminating strength is 6 N/15 mm or more, and 7 N/15 mm or less
C: Laminating strength is 5 N/15 mm or more and less than 6 N/15 mm
D: Laminating strength is less than 5 N/15 mm (Electrolytic Solution Heat Seal Strength)

Figure 9:
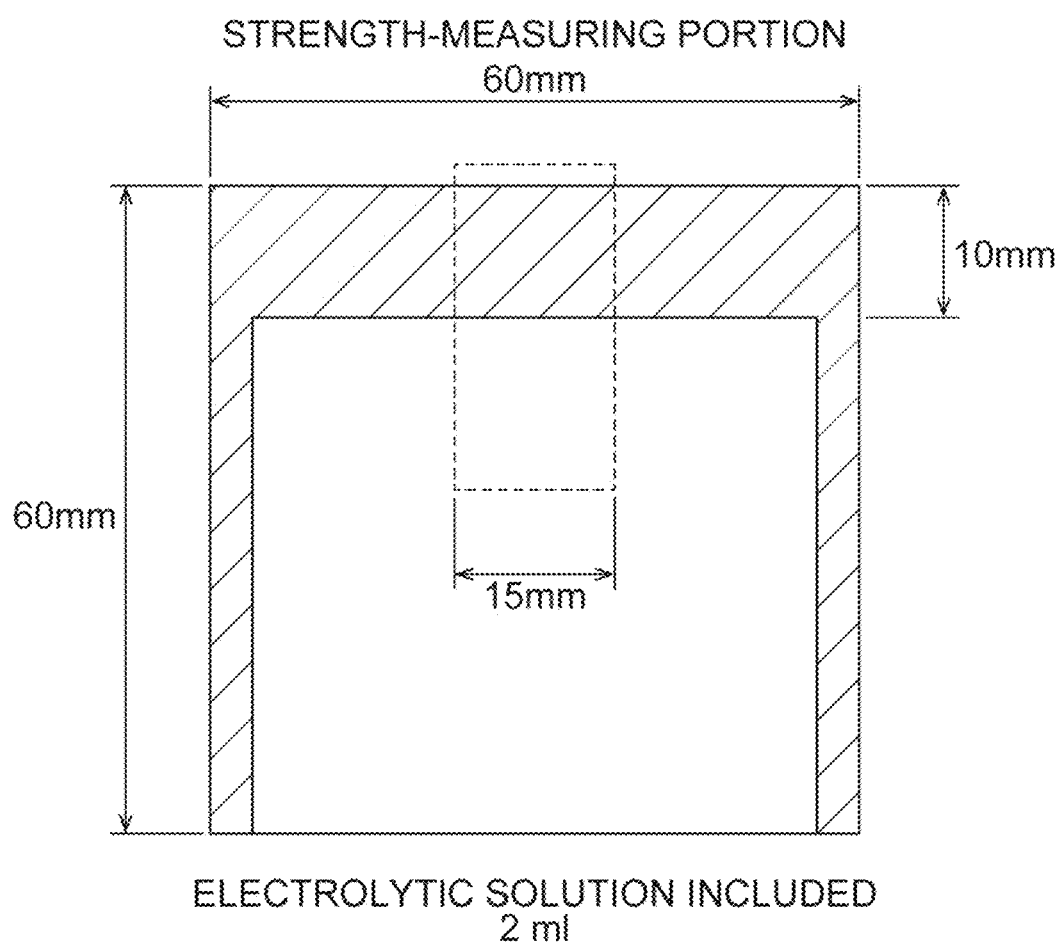
FIG. 9 is a schematic view illustrating a method for producing a sample to be evaluated in Examples.

A sample obtained by cutting the packaging material into 60 mm×120 mm was folded into two so as to locate the sealant layer at the inner side, and one side of the folded sample was heat-sealed with a sealing bar with a width of 10 mm at 190° C. and 0.5 MPa for 3 seconds to form a heat-sealed portion. Next, the remaining two sides of the folded sample were also heat-sealed to achieve a bag-shaped packaging material, and within this bag-shaped packaging material, the pouch in which 2 ml of electrolytic solution in which $LiPF_6$ was added to a mixed solution of ethylene carbonate/diethyl carbonate/dimethyl carbonate=1/1/1 (mass ratio) to achieve an amount of 1 M has been injected was stored at 60° C. for 24 hours, and subsequently, the firstly heat-sealed one side was cut to have a width of 15 mm (see FIG. 9), and from one end of the heat-sealed portion (the end on the side exposed to the electrolytic solution), the seal strength (T-peel strength) was continuously measured by a testing machine (manufactured by INSTRON). The test was conducted according to JIS K6854 at 23° C. under an atmosphere of 50% RH with a peeling rate of 50 mm/min. On the basis of the results of the maximum seal strength and the proportion determined in a manner analogous to as in the section of "Seal Strength", evaluation was conducted according to the following criteria.

S: Maximum seal strength is 50 N/15 mm or more
A: Maximum seal strength is 45 N/15 mm or more and less than 50 N/15 mm
B: Maximum seal strength is 35 N/15 mm or more and less than 45 N/15 mm
C: Maximum seal strength is 25 N/15 mm or more and less than 35 N/15 mm
D: Maximum seal strength is less than 25 N/15 mm (Degassing Heat Sealing Strength (Degas Heat Seal Strength)) A sample obtained by cutting the packaging material into 75 mm×150 mm was folded into two to be 37.5 mm×150 mm so as to locate the sealant layer at the inner side (see FIG. 10 (a)), and subsequently, the side of 150 mm length and one of the sides of 37.5 mm length were heat-sealed to produce a pouch. Next, into this pouch, 5 ml of electrolytic solution in which $LiPF_6$ was added to a mixed solution of ethylene carbonate/diethyl carbonate/dimethyl carbonate=1/1/1 (mass ratio) to achieve an amount of 1 M was injected, and the other side of 37.5 mm length was heat-sealed to obtain a pouch sealed by a sealed portion DS1. Then, after storing this pouch at 60° C. for 24 hours, the central portion of the pouch including the electrolytic solution was heat-sealed with a sealing bar with a width of 10 mm at 190° C. and 0.3 MPa for 2 seconds (degassing heat sealed portion DS2, see FIG. 10 (b)). In order to stabilize the sealed portion, after stored at normal temperatures for 24 hours, the region including the degassing heat sealed portion DS2 was cut to have a width of 15 mm (see FIG. 10 (c)), and from one end of the degassing heat sealed portion (the end on the side exposed to the electrolytic solution), the seal strength (T-peel strength) was measured by a testing machine (manufactured by INSTRON). The test was conducted according to JIS K6854 at 23° C. under an atmosphere of 50% RH with a peeling rate of 50 mm/min. On the basis of the results of the maximum seal strength and the proportion determined in a manner analogous to as in the section of "Seal Strength", evaluation was conducted according to the following criteria.
S: Maximum seal strength is 45 N/15 mm or more
A: Maximum seal strength is 40 N/15 mm or more and less than 45 N/15 mm
B: Maximum seal strength is 30 N/15 mm or more and less than 40 N/15 mm
C: Maximum seal strength is 20 N/15 mm or more and less than d 30 N/15 mm
D: Maximum seal strength is less than 20 N/15 mm (Insulation Properties after Degassing Heat Sealing (Degassing Insulation))

Figure 11A:
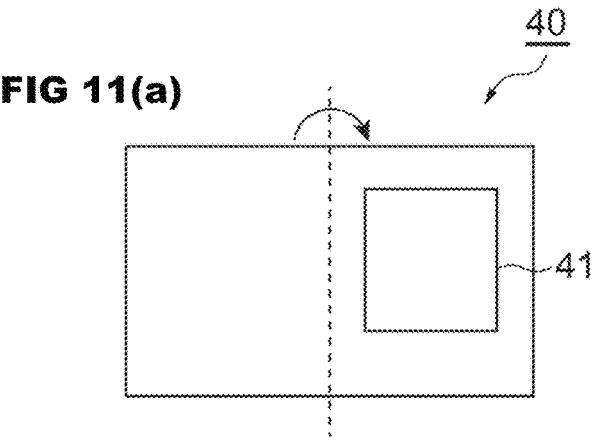
FIGS. 11(a)-11(g) are schematic views illustrating a method for producing a sample to be evaluated in Examples.
Figure 11E:
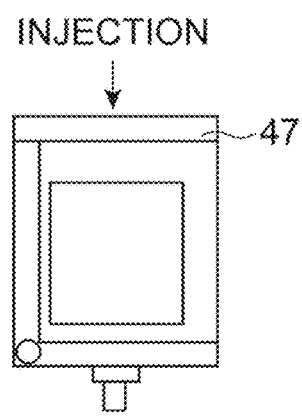
Figure 11B:
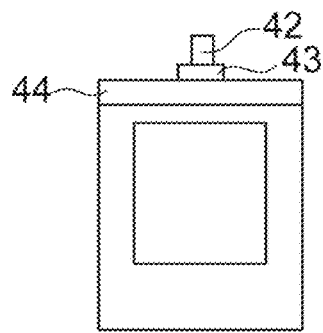
Figure 11F:
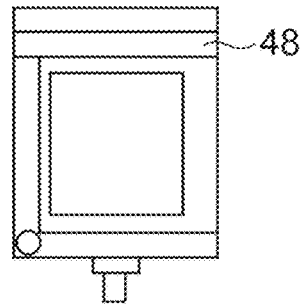
Figure 11C:
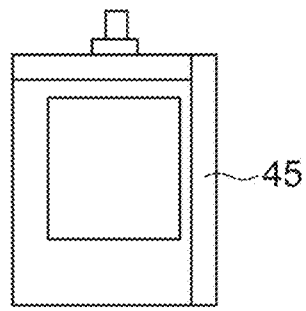
Figure 11G:
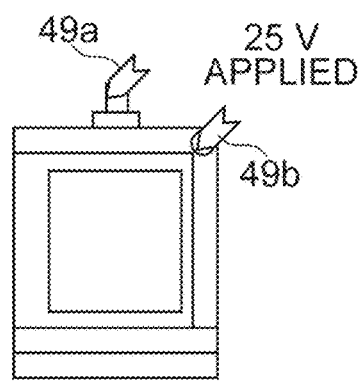
Figure 11D:
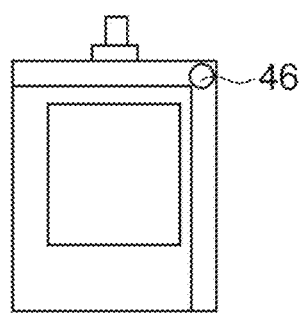

A sample 40 obtained by cutting the packaging material into 120 mm×200 mm was placed into a mold for cold molding so that the sealant layer comes into contact with a projected part of the molding machine, and deep drawing of 2.0 mm was conducted with a molding rate of 15 mm/sec to form a deep drawing portion 41, and subsequently, the sample 40 was folded into two to be 120 mm×100 mm (see FIG. 11(a)). Then, an upper side portion 44 of 100 mm was heat-sealed with interposing a tab 42 and a tab sealant 43 (see FIG. 11(b)), and subsequently, a lateral side portion 45 of 120 mm was heat-sealed to produce a pouch (see FIG. 11(c)). Next, in order to enable contact with the electrode, a portion of the outer layer of the sample 40 was cut away to form an exposed portion 46 of the metallic foil layer (see FIG. 11(d)). Then, 5 ml of electrolytic solution in which $LiPF_6$ was added to a mixed solution of ethylene carbonate/diethyl carbonate/dimethyl carbonate=1/1/1 (mass ratio) to achieve an amount of 1 M was injected in the pouch, and a lower side portion 47 of 100 mm was sealed by heat seal (see FIG. 11 (e)). Next, this pouch was allowed to stand at 60° C. for 24 hours in a flatly placed state, and a portion 48 located at the inner side with respect to the heat-sealed lower side portion 47 was subjected to degassing heat seal while sandwiching the electrolytic solution between portions to be heat-sealed at 190° C. and 0.3 MPa (surface pressure) for 2 seconds (see FIG. 11(f)). Then, the tab 42 and the exposed portion 46 of the metallic foil layer were respectively connected with electrodes 49a, 49b, and by applying 25 V using a withstanding voltage/insulation resistance tester (manufactured by KIKUSUI ELECTRONICS CORPORATION, "TOS9201"), the resistance value at the moment was measured (see FIG. 11(g)). With regard to the sample of which the resistance value was less than 15 MΩ, 25 V was successively applied for 2 hours to identify the insulation diminished site. By applying voltage for a prolonged time, a reaction product of the metallic foil and the electrolytic solution precipitates from the insulation diminished site, and as a result of this, it is possible to identify the insulation diminished site. As the mold, a mold having molding area of 80 mm×70 mm (rectangular cylindrical shape) and punching corner radius (RCP) of 1.0 mm was used. On the basis of the results, evaluation was conducted according to the following criteria.
A: Resistance value is greater than 200 MΩ
B: Resistance value is 100 MΩ or more, and 200 MΩ or less
C: Resistance value is 15 MΩ or more and less than 100 MΩ
D: Resistance value is less than 15 MΩ

(Overall Quality)

The results of each of the above evaluations are shown in Tables 5 and 6. In the following Tables 5 and 6, the items having no evaluation of D with regard to the results of each evaluation are considered to have good overall quality.

TABLE 5

| | Seal strength | | Electrolytic solution laminating strength | Electrolytic solution heat seal strength | Degas heat seal strength | Degassing insulation |
|---|---|---|---|---|---|---|
| | Maximum seal strength $S_M$ [N/15 mm] | Ratio $(S_S/S_M)$ $(S_A/S_M)$ | | | | |
| Example 1-1 | 41 | 0.35 | A | B | B | C |
| Example 1-2 | 54 | 0.55 | A | A | A | B |
| Example 1-3 | 51 | 0.52 | A | A | A | B |
| Example 1-4 | 58 | 0.82 | A | S | S | A |
| Example 1-5 | 58 | 0.84 | A | S | S | A |
| Example 1-6 | 55 | 0.80 | A | S | S | A |
| Example 1-7 | 60 | 0.87 | A | S | S | A |
| Example 1-8 | 55 | 0.59 | A | A | A | B |
| Example 1-9 | 61 | 0.87 | A | S | S | A |
| Example 1-10 | 57 | 0.58 | A | A | A | A |
| Example 1-11 | 56 | 0.58 | A | A | A | A |
| Example 1-12 | 54 | 0.51 | A | A | A | B |
| Example 1-13 | 55 | 0.56 | A | A | A | B |
| Example 1-14 | 52 | 0.51 | B | A | A | B |
| Example 1-15 | 58 | 0.55 | B | A | A | B |
| Example 1-16 | 62 | 0.88 | A | S | S | A |
| Example 1-17 | 59 | 0.54 | C | A | A | B |
| Example 1-18 | 60 | 0.86 | A | S | S | A |
| Example 1-19 | 61 | 0.87 | A | S | S | A |
| Example 1-20 | 54 | 0.80 | A | B | B | A |

TABLE 6

|  | Seal strength | | Electrolytic solution laminating strength | Electrolytic solution heat seal strength | Degas heat seal strength | Degassing insulation | Insulation diminished site |
|---|---|---|---|---|---|---|---|
|  | Maximum seal strength $S_M$ [N/15 mm] | Ratio ($S_S/S_M$) ($S_A/S_M$) | | | | | |
| Example 1-21 | 42 | 0.44 | B | B | B | C | — |
| Example 1-22 | 41 | 0.48 | B | B | B | C | — |
| Example 1-23 | 100 | 0.83 | A | S | S | A | — |
| Example 1-24 | 98 | 0.80 | A | S | S | A | — |
| Example 1-25 | 102 | 0.88 | A | S | S | A | — |
| Example 1-26 | 115 | 0.81 | A | S | S | A | — |
| Example 1-27 | 111 | 0.81 | A | S | S | A | — |
| Example 1-28 | 119 | 0.85 | A | S | S | A | — |
| Example 1-29 | 135 | 0.82 | A | S | S | A | — |
| Example 1-30 | 131 | 0.81 | A | S | S | A | — |
| Example 1-31 | 139 | 0.89 | A | S | S | A | — |
| Example 1-32 | 62 | 0.88 | A | S | S | A | — |
| Comparative Example 1-1 | 32 | 0.25 | C | D | D | D | Degas sealed portion |
| Comparative Example 1-2 | 27 | 0.21 | C | D | D | D | Degas sealed portion |

With regard to all of the packaging materials obtained in Examples 1-1 to 1-32 and Comparative Examples 1-1 to 1-2, the stable range was present in the graph regarding evaluation of the seal strength. As is obvious from the results shown in Table 5 and Table 6, it has been confirmed that the packaging material of Examples 1-1 to 1-32 have excellent insulating properties after degassing heat sealing. In addition, it has been confirmed that the packaging materials of Examples 1-1 to 1-32 have sufficient performance, also with regard to the electrolytic solution laminating strength, the electrolytic solution heat seal strength, and the degassing heat sealing strength. By contrast to this, it has been confirmed that, with regard to the packaging materials of Comparative Examples 1-1 to 1-2, the seal strength and the insulating properties are inferior.

In comparison of Examples 1-1 to 1-3 with each other, it can be confirmed that, by using reactor type TPO in which an elastomer has been microdispersed as the incompatible component (B) of the innermost layer, or a dynamically crosslinked PP-based elastomer grafted with an elastomer, the adhesiveness of the sea-island interface have enhanced, and seal strength and insulating properties have enhanced.

In comparison of Example 1-21 to 1-31 with each other, it can be confirmed that, when the sealant layer is thicker, both of the maximum seal strength $S_M$ and the ratio $S_S/S_M$ have enhanced, and better seal strength and insulating properties have been obtained. On the other hand, even when the sealant layer is thinner, it can be confirmed that the seal strength and the insulating properties involving no problem in terms of packaging materials have been obtained.

(2) Examples and Comparison Examples according to Second Aspect

[Materials Used]

Next, the materials used in Examples 2-1 to 2-14 and Comparative Example 2-1 are shown as follows.

<Substrate Layer (Thickness of 15 μm)>

A nylon film (Ny) (manufactured by Toyobo Co., Ltd.) was used.

<First Adhesive Layer (Thickness of 4 μm)>

A polyurethane-based adhesive (manufactured by TOYO INK Co., Ltd.) in which a curing agent based on an adduct of tolylenediisocyanate is mixed into a polyester polyol-based base material was used.

<First Anti-Corrosion Treatment Layer (on the Side of Substrate Layer) and Second Anti-Corrosion Treatment Layer (on the Side of Sealant Layer)>

(CL-1): A "sol of sodium polyphosphate stabilized cerium oxide" in which the concentration of solids has been adjusted to 10% by mass using distilled water as a solvent was used. Note that the sol of sodium polyphosphate stabilized cerium oxide was obtained by the incorporation of 10 parts by mass of Na salt of phosphoric acid per 100 parts by mass of cerium oxide.

(CL-2): A composition consisting of 90% by mass of "polyallylamine (manufactured by Nitto Boseki Co., Ltd.)" in which the concentration of solids has been adjusted to 5% by mass using distilled water as a solvent, and 10% by mass of "polyglycerol polyglycidyl ether (manufactured by Nagase ChemteX Corporation)" was used.

(CL-3): On the basis of a water soluble phenol resin (manufactured by Sumitomo Bakelite Co., Ltd.) in which the concentration of solids has been adjusted to 1% by mass using an aqueous solution of phosphoric acid at the concentration of 1% by mass as a solvent, a chemical conversion treating agent in which the concentration of chromium fluoride ($CrF_3$) has been adjusted to be 10 mg/m² in terms of the amount of Cr present in the final dried coat was used.

<Metallic Foil Layer (Thickness of 35 μm)>

A soft aluminum foil (manufactured by Toyo Aluminum K.K., "8079 material") subjected to annealing degreasing treatment was used.

<Second Adhesive Layer (Thickness of 3 μm)>

The following adhesives a, b were provided as adhesives for forming a second adhesive layer.

Adhesive a: an adhesive in which 10 parts by mass (the ratio by solids) of a polyisocyanate compound with an isocyanurate structure was mixed per 100 parts by mass of an acid-modified polyolefin resin dissolved in toluene.

Adhesive b: a polyurethane-based adhesive prepared by formulating a polyester polyol consisting of a hydrogenated dimeric fatty acid and a diol, and a polyisocyanate in a molar ratio (NCO/OH) of 2.

<Sealant Layer>

The following materials were provided as the (A) to (C) components constituting a base resin composition for forming the sealant layer.

((A) Component)

Acid-modified PP: an acid-modified polypropylene.
Random PP: propylene-ethylene random copolymer.

((B) Component)

Ethylene-α-olefin copolymer: an ethylene-propylene copolymer elastomer not having compatibility with acid-modified PP and random PP ((A) component).

Ethylene-butene-1 random copolymer: an ethylene-butene-1 random copolymer elastomer not having compatibility with acid-modified PP and random PP ((A) component).

((B1) Component)

Block copolymer 1: a block copolymer configured by crystalline ethylene units and ethylene-butylene units, and not having compatibility with acid-modified PP and random PP ((A) component).

Block copolymer 2: a block copolymer configured by propylene units and ethylene units, and not having compatibility with acid-modified PP and random PP ((A) component).

Graft copolymer: a graft copolymer consisting of a main chain of polyolefin and a side chain of polystyrene, and not having compatibility with acid-modified PP and random PP ((A) component).

((C) Component)

Copolymer with an atactic structure: a propylene-α-olefin copolymer with an atactic structure having compatibility with acid-modified PP ((A) component).

Propylene-butene-1 random copolymer: a propylene-butene-1 random copolymer elastomer having compatibility with random PP ((A) component).

Production of Packaging Material

Example 2-1

First of all, the first and second anti-corrosion treatment layers were disposed on the metallic foil layer by the following procedure. In other words, (CL-1) was applied onto both faces of the metallic foil layer so as to achieve a dry amount to be applied of 70 mg/m² by microgravure coating, and was subjected to burning treatment at 200° C. in a drying unit. Then, (CL-2) was applied onto the obtained layer so as to achieve a dry amount to be applied of 20 mg/m² by microgravure coating to form a composite layer consisting of (CL-1) and (CL-2) as the first and second anti-corrosion treatment layers. This composite layer undergoes the expression of anti-corrosion performance by combination of two materials of (CL-1) and (CL-2).

Next, the side of the first anti-corrosion treatment layer of the metallic foil layer on which the first and second anti-corrosion treatment layers were disposed was bonded onto the substrate layer by a dry laminating approach using a polyurethane-based adhesive (first adhesive layer). This was placed at an unwinding unit of the extrusion laminating machine, and was coextruded together with the materials of the sealant layer on the second anti-corrosion treatment layer under processing conditions of 270° C. and 100 μm/min to laminate, as sealant layers, a layer on the side of the metal-foil (hereinafter, also referred to as "AL side layer") (thickness of 8.3 μm), and the innermost layer (thickness of 16.7 μm) in this order. Note that, with regard to the AL side layer and the innermost layer, a variety of compounds of their materials have been produced by a twin-screw extruder in advance, and after steps of water cooling and pelletization, were used in the above extrusion laminating. For the formation of the AL side layer, a mixture of acid-modified PP ((A) component, 55.0% by mass), an ethylene-α-olefin copolymer ((B) component, 20.0% by mass), and a copolymer with an atactic structure ((C) component, 25.0% by mass) was used. For the formation of the innermost layer, a mixture of random PP ((A) component, 63.6% by mass), an ethylene-butene-1 random copolymer ((B) component, 9.1% by mass), a block copolymer 2 ((B1) component, 9.1% by mass), and a propylene-butene-1 random copolymer ((C) component, 18.2% by mass) was used. Note that the configuration of each of the layers is shown in the following Table 7. The numerical values within columns of Sealant Layer in Table 7 represent the contents or the thicknesses with regard to each layer in the sealant layer, or with regard to each component in the entirety of the sealant layer.

The laminate obtained in this way was subjected to heat treatment at 190° C. for about 0.5 seconds by transferring the laminate wrapped around a roll heated at 190° C. to produce the packaging material of Example 2-1 (a laminate of the substrate layer/the first adhesive layer/the first anti-corrosion treatment layer/the metallic foil layer/the second anti-corrosion treatment layer/the AL side layer (sealant layer 16a)/ the innermost layer (sealant layer 16b)).

Example 2-2

The packaging material of Example 2-2 was produced in a manner analogous to as in Example 2-1, except for the fact that a mixture of acid-modified PP ((A) component, 50.0% by mass), an ethylene-α-olefin copolymer ((B) component, 18.2% by mass), a block copolymer 2 ((B1) component, 9.1% by mass), and a copolymer with an atactic structure ((C) component, 22.7% by mass) was used for the formation of the AL side layer (sealant layer 16a), and the fact that a mixture of random PP ((A) component, 70.0% by mass), an ethylene-butene-1 random copolymer ((B) component, 10.0% by mass), and a propylene-butene-1 random copolymer ((C) component, 20.0% by mass) was used for the formation of the innermost layer (sealant layer 16b). Note that the configuration of each of the layers is shown in the following Table 7.

Example 2-3

The packaging material of Example 2-3 was produced in a manner analogous to as in Example 2-1, except for the fact that a mixture of acid-modified PP ((A) component, 50.0% by mass), an ethylene-α-olefin copolymer ((B) component, 18.2% by mass), a block copolymer 2 ((B1) component, 9.1% by mass), and a copolymer with an atactic structure ((C) component, 22.7% by mass) was used for the formation of the AL side layer (sealant layer 16a). Note that the configuration of each of the layers is shown in the following Table 7.

Example 2-4

The packaging material of Example 2-4 was produced in a manner analogous to as in Example 2-1, except for the fact that a mixture of acid-modified PP ((A) component, 52.4% by mass), an ethylene-α-olefin copolymer ((B) component, 19.0% by mass), a block copolymer 2 ((B1) component, 4.8% by mass), and a copolymer with an atactic structure ((C) component, 23.8% by mass) was used for the formation of the AL side layer (sealant layer 16a), and the fact that a mixture of random PP ((A) component, 66.7% by mass), an ethylene-butene-1 random copolymer ((B) component, 9.5% by mass), a block copolymer 2 ((B1) component, 4.8% by mass), and a propylene-butene-1 random copolymer ((C) component, 19.0% by mass) was used for the formation of the innermost layer (sealant layer 16b). Note that the configuration of each of the layers is shown in the following Table 7.

Example 2-5

The packaging material of Example 2-5 was produced in a manner analogous to as in Example 2-1, except for the fact that a mixture of acid-modified PP ((A) component, 54.4% by mass), an ethylene-α-olefin copolymer ((B) component, 19.8% by mass), a block copolymer 2 ((B1) component, 1.0% by mass), and a copolymer with an atactic structure ((C) component, 24.8% by mass) was used for the formation of the AL side layer (sealant layer 16a), and the fact that a mixture of random PP ((A) component, 69.3% by mass), an ethylene-butene-1 random copolymer ((B) component, 9.9% by mass), a block copolymer 2 ((B1) component, 1.0% by mass), and a propylene-butene-1 random copolymer ((C) component, 19.8% by mass) was used for the formation of the innermost layer (sealant layer 16b). Note that the configuration of each of the layers is shown in the following Table 7.

Example 2-6

The packaging material of Example 2-6 was produced in a manner analogous to as in Example 2-1, except for the fact that a mixture of acid-modified PP ((A) component, 55.0% by mass), a block copolymer 2 ((B1) component, 20.0% by mass), and a copolymer with an atactic structure ((C) component, 25.0% by mass) was used for the formation of the AL side layer (sealant layer 16a), and the fact that a mixture of random PP ((A) component, 70.0% by mass), a block copolymer 2 ((B1) component, 10.0% by mass), and a propylene-butene-1 random copolymer ((C) component, 20.0% by mass) was used for the formation of the innermost layer (sealant layer 16b). Note that the configuration of each of the layers is shown in the following Table 7.

Example 2-7

The packaging material of Example 2-7 was produced in a manner analogous to as in Example 2-2, except for the fact that a mixture of random PP ((A) component, 70.0% by mass), a block copolymer 2 ((B1) component, 10.0% by mass), and a propylene-butene-1 random copolymer ((C) component, 20.0% by mass) was used for the formation of the innermost layer (sealant layer 16b). Note that the configuration of each of the layers is shown in the following Table 7.

Example 2-8

First of all, the first and second anti-corrosion treatment layers were disposed on the metallic foil layer by the following procedure. In other words, (CL-3) was applied onto both faces of the metallic foil layer so as to achieve a dry amount to be applied of 30 mg/m$^2$ by microgravure coating, and was subjected to burning treatment at 200° C. in a drying unit. Then, (CL-2) was applied onto the obtained layer so as to achieve a dry amount to be applied of 20 mg/m$^2$ by microgravure coating to form a composite layer consisting of (CL-3) and (CL-2) as the first and second anti-corrosion treatment layers. This composite layer undergoes the expression of anti-corrosion performance by combination of two materials of (CL-3) and (CL-2). In this way, the packaging material of Example 2-8 was produced in a manner analogous to as in Example 2-7, except for the fact that the metallic foil layer on which the first and second anti-corrosion treatment layers were disposed was used. Note that the configuration of each of the layers is shown in the following Table 7.

Example 2-9

The first and second anti-corrosion treatment layers were disposed on the metallic foil layer in a manner analogous to as in Example 2-1. The side of the first anti-corrosion treatment layer of the metallic foil layer on which the first and second anti-corrosion treatment layers were disposed was bonded onto the substrate layer by a dry laminating approach using a polyurethane-based adhesive (first adhesive layer). Then, the side of the second anti-corrosion treatment layer of the metallic foil layer on which the first and second anti-corrosion treatment layers were disposed was bonded to the sealant layer 16 (the innermost layer) (thickness of 25 μm) by a dry laminating approach using the adhesive a (the second adhesive layer) to produce the packaging material of Example 2-9. For the formation of the innermost layer (sealant layer 16), a mixture of random PP ((A) component, 70.0% by mass), a block copolymer 2 ((B1) component, 10.0% by mass), and a propylene-butene-1 random copolymer ((C) component, 20.0% by mass) was used. Note that the configuration of each of the layers is shown in the following Table 7.

Example 2-10

The first and second anti-corrosion treatment layers were disposed on the metallic foil layer in a manner analogous to as in Example 2-1. The side of the first anti-corrosion treatment layer of the metallic foil layer on which the first and second anti-corrosion treatment layers were disposed was bonded onto the substrate layer by a dry laminating approach using a polyurethane-based adhesive (first adhesive layer). Then, the side of the second anti-corrosion treatment layer of the metallic foil layer on which the first and second anti-corrosion treatment layers were disposed was bonded to the sealant layer 16 (the innermost layer) (thickness of 25 μm) by a dry laminating approach using the adhesive b (the second adhesive layer) to produce the packaging material of Example 2-10. For the formation of the innermost layer (sealant layer 16), a mixture of random PP ((A) component, 70.0% by mass), a block copolymer 2 ((B1) component, 10.0% by mass), and a propylene-butene-1 random copolymer ((C) component, 20.0% by mass) was used. Note that the configuration of each of the layers is shown in the following Table 7.

Example 2-11

The packaging material of Example 2-11 was produced in a manner analogous to as in Example 2-1, except for the fact that a mixture of acid-modified PP ((A) component, 72.7% by mass), an ethylene-α-olefin copolymer ((B) component, 18.2% by mass), and block copolymer 2 ((B1) component, 9.1% by mass) was used for the formation of the AL side layer (sealant layer 16a), and the fact that a mixture of random PP ((A) component, 90.0% by mass), and block copolymer 2 ((B1) component, 10.0% by mass) was used for the formation of the innermost layer (sealant layer 16b). Note that the configuration of each of the layers is shown in the following Table 7.

Example 2-12

The packaging material of Example 2-12 was produced in a manner analogous to as in Example 2-1, except for the fact that a mixture of acid-modified PP ((A) component, 50.0% by mass), an ethylene-α-olefin copolymer ((B) component, 18.2% by mass), block copolymer 1 ((B1) component, 9.1% by mass), and a copolymer with an atactic structure ((C) component, 22.7% by mass) was used for the formation of the AL side layer (sealant layer 16a), and the fact that a mixture of random PP ((A) component, 63.6% by mass), an ethylene-butene-1 random copolymer ((B) component, 9.1% by mass), a block copolymer 2 ((B1) component, 9.1% by mass), and a propylene-butene-1 random copolymer ((C) component, 18.2% by mass) was used for the formation of the innermost layer (sealant layer 16b). Note that the configuration of each of the layers is shown in the following Table 7.

Example 2-13

The packaging material of Example 2-13 was produced in a manner analogous to as in Example 2-12, except for the fact that a mixture of random PP ((A) component, 70.0% by mass), a block copolymer 2 ((B1) component, 10.0% by mass), and a propylene-butene-1 random copolymer ((C) component, 20.0% by mass) was used for the formation of the innermost layer (sealant layer 16b). Note that the configuration of each of the layers is shown in the following Table 7.

Example 2-14

The packaging material of Example 2-14 was produced in a manner analogous to as in Example 2-1, except for the fact that a mixture of acid-modified PP ((A) component, 50.0% by mass), an ethylene-α-olefin copolymer ((B) component, 18.2% by mass), graft copolymer ((B1) component, 9.1% by mass), and a copolymer with an atactic structure ((C) component, 22.7% by mass) was used for the formation of the AL side layer (sealant layer 16a), and the fact that a mixture of random PP ((A) component, 70.0% by mass), graft copolymer ((B1) component, 10.0% by mass), and a propylene-butene-1 random copolymer ((C) component, 20.0% by mass) was used for the formation of the innermost layer (sealant layer 16b). Note that the configuration of each of the layers is shown in the following Table 7.

Comparative Example 2-1

The packaging material of Comparative Example 2-1 was produced in a manner analogous to as in Example 2-1 except for the fact that a mixture of acid-modified PP ((A) component, 52.0% by mass), an ethylene-α-olefin copolymer ((B) component, 45.0% by mass), and a copolymer with an atactic structure ((C) component, 3.0% by mass) was used for the formation of the AL side layer (sealant layer 16a), and the fact that a mixture of random PP ((A) component, 52.0% by mass), an ethylene-butene-1 random copolymer ((B) component, 45.0% by mass), and a propylene-butene-1 random copolymer ((C) component, 3.0% by mass) was used for the formation of the innermost layer (sealant layer 16b). Note that the configuration of each of the layers is shown in the following Table 7.

TABLE 7

| | | | Sealant layer | | | | | | | | | | | |
|---|---|---|---|---|---|---|---|---|---|---|---|---|---|---|
| | | | AL side layer | | | | | Innermost layer | | | | | (B) Component | (C) Component |
| | Anti-corrosion treatment layer | Second adhesive layer | (A) Component [% by mass] | (B) Component [by mass] | (B1) Component | (C) Component [% by mass] | Thickness [μm] | (A) Component [% by mass] | (B) Component [by mass] | (B1) Component | (C) Component [% by mass] | Thickness [μm] | content [% by mass] | content [% by mass] |
| Example 2-1 | (CL-1) + (CL-2) | — | Acid-modified PP | Etheylene-α-olefin copolymer | — | Copolymer with an atactic structure | 8.3 | Random PP | Ethylene-butene-1 random copolymer | Block copolymer 2 | Propylene-butene-1 random copolymer | 16.7 | 18.8 | 20.5 |
| Example 2-2 | (CL-1) + (CL-2) | — | 55.0 Acid-modified PP | 20.0 Etheylene-α-olefin copolymer | Block copolymer | 25.0 Copolymer with an | 8.3 | 63.6 Random PP | 9.1 Ethylene-butene-1 random | 9.1 | 18.2 Propylene-butene-1 | 16.7 | 15.8 | 20.9 |

TABLE 7-continued

| | | | Sealant layer | | | | | | | | | |
|---|---|---|---|---|---|---|---|---|---|---|---|---|
| | | | AL side layer | | | | | Innermost layer | | | | (B) Component content [% by mass] | (C) Component content [% by mass] |
| | Anti-corrosion treatment layer | Second adhesive layer | (A) Component [% by mass] | (B) Component [by mass] | (B1) Component | (C) Component [% by mass] | Thickness [μm] | (A) Component [% by mass] | (B) Component [by mass] | (B1) Component | (C) Component [% by mass] | Thickness [μm] | | |
| | | | | | | 2 atactic structure | | | copolymer | | random copolymer | | | |
| Example 2-3 | (CL-1) + (CL-2) | — | 50.0 Acid-modified PP | 18.2 Etheylene-α-olefin copolymer | 9.1 Block copolymer 2 | 22.7 Copolymer with an atactic structure | 8.3 | 70.0 Random PP | 10.0 Ethylene-butene-1 random copolymer | — | 20.0 Propylene-butene-1 random copolymer | 16.7 | 21.2 | 19.7 |
| Example 2-4 | (CL-1) + (CL-2) | — | 50.0 Acid-modified PP | 18.2 Etheylene-α-olefin copolymer | 9.1 Block copolymer 2 | 22.7 Copolymer with an atactic structure | 8.3 | 63.6 Random PP | 9.1 Ethylene-butene-1 random copolymer | 9.1 Block copolymer 2 | 18.2 Propylene-butene-1 random copolymer | 16.7 | 17.5 | 20.6 |
| Example 2-5 | (CL-1) + (CL-2) | — | 52.4 Acid-modified PP | 19.0 Etheylene-α-olefin copolymer | 4.8 Block copolymer 2 | 23.8 Copolymer with an atactic structure | 8.3 | 66.7 Random PP | 9.5 Ethylene-butene-1 random copolymer | 4.8 Block copolymer 2 | 19.0 Propylene-butene-1 random copolymer | 16.7 | 14.2 | 21.5 |
| Example 2-6 | (CL-1) + (CL-2) | — | 54.4 Acid-modified PP | 19.8 | 1.0 Block copolymer 2 | 24.8 Copolymer with an atactic structure | 8.3 | 69.3 Random PP | 9.9 | 1.0 Block copolymer 2 | 19.8 Propylene-butene-1 random copolymer | 16.7 | 13.3 | 21.7 |
| Example 2-7 | (CL-1) + (CL-2) | — | 55.0 Acid-modified PP | — | 20.0 Block copolymer 2 | 25.0 Copolymer with an atactic structure | 8.3 | 70.0 Random PP | — | 10.0 Block copolymer 2 | 20.0 Propylene-butene-1 random copolymer | 16.7 | 15.8 | 20.9 |
| Example 2-8 | (CL-3) + (CL-2) | — | 50.0 Acid-modified PP | 18.2 Etheylene-α-olefin copolymer | 9.1 Block copolymer 2 | 22.7 Copolymer with an atactic structure | 8.3 | 70.0 Random PP | — | 10.0 Block copolymer 2 | 20.0 Propylene-butene-1 random copolymer | 16.7 | 15.8 | 20.9 |
| Example 2-9 | (CL-1) + (CL-2) | Adhesive a | 50.0 | 18.2 | 9.1 | 22.7 | — | 70.0 Random PP | — | 10.0 Block copolymer 2 | 20.0 Propylene-butene-1 random copolymer | 25.0 | 10.0 | 20.0 |
| Example 2-10 | (CL-1) + (CL-2) | Adhesive b | — | — | — | — | — | 70.0 Random PP | — | 10.0 Block copolymer 2 | 20.0 Propylene-butene-1 random copolymer | 25.0 | 10.0 | 20.0 |
| Example 2-11 | (CL-1) + (CL-2) | — | — Acid-modified PP | — Etheylene-α-olefin copolymer | — Block copolymer 2 | — | 8.3 | 70.0 Random PP | — | 10.0 Block copolymer 2 | — | 16.7 | 15.8 | 0.0 |
| Example 2-12 | (CL-1) + (CL-2) | — | 72.7 Acid-modified PP | 18.2 Etheylene-α-olefin copolymer | 9.1 Block copolymer | — Copolymer with an | 8.3 | 90.0 Random PP | — Ethylene-butene-1 random | 10.0 Block copolymer 1 | — Propylene-butene-1 | 16.7 | 21.2 | 19.7 |

TABLE 7-continued

<table>
<tr><td colspan="2">Anti-</td><td colspan="5">AL side layer</td><td></td><td colspan="5">Innermost layer</td><td></td><td>(B)<br>Com-</td><td>(C)<br>Com-</td></tr>
<tr><td>corro-<br>sion<br>treat-<br>ment<br>layer</td><td>Sec-<br>ond<br>adhe-<br>sive<br>layer</td><td>(A)<br>Com-<br>ponent<br>[% by<br>mass]</td><td>(B) Com-<br>ponent<br>[by mass]</td><td>(B1)<br>Com-<br>ponent</td><td>(C)<br>Com-<br>ponent<br>[% by<br>mass]</td><td>Thick-<br>ness<br>[μm]</td><td>(A)<br>Com-<br>ponent<br>[% by<br>mass]</td><td>(B) Com-<br>ponent<br>[by mass]</td><td>(B1)<br>Com-<br>ponent</td><td>(C)<br>Com-<br>ponent<br>[% by<br>mass]</td><td>Thick-<br>ness<br>[μm]</td><td>ponent<br>con-<br>tent<br>[% by<br>mass]</td><td>ponent<br>con-<br>tent<br>[% by<br>mass]</td></tr>
<tr><td></td><td></td><td></td><td></td><td>2</td><td>atactic<br>structure</td><td></td><td></td><td>copolymer</td><td></td><td>random<br>copoly-<br>mer</td><td></td><td></td><td></td></tr>
<tr><td>Exam-<br>ple<br>2-13</td><td>(CL-1)<br>+<br>(CL-2)</td><td>50.0<br>Acid-<br>modified<br>PP</td><td>18.2<br>Etheylene-<br>α-olefin<br>copolymer</td><td>9.1<br>Block<br>copoly-<br>mer<br>1</td><td>22.7<br>Copoly-<br>mer<br>with an<br>atactic<br>structure</td><td>8.3</td><td>63.6<br>Random<br>PP</td><td>9.1</td><td>9.1<br>Block<br>copolymer<br>1</td><td>18.2<br>Pro-<br>pylene-<br>butene-1<br>random<br>copoly-<br>mer</td><td>16.7</td><td>15.8</td><td>20.9</td></tr>
<tr><td>Exam-<br>ple<br>2-14</td><td>(CL-1)<br>+<br>(CL-2)</td><td>50.0<br>Acid-<br>modified<br>PP</td><td>18.2<br>Etheylene-<br>α-olefin<br>copolymer</td><td>9.1<br>Graft<br>copoly-<br>mer</td><td>22.7<br>Copoly-<br>mer<br>with an<br>atactic<br>structure</td><td>8.3</td><td>70.0<br>Random<br>PP</td><td>—</td><td>10.0<br>Graft<br>copolymer</td><td>20.0<br>Pro-<br>pylene-<br>butene-1<br>random<br>copoly-<br>mer</td><td>16.7</td><td>15.8</td><td>20.9</td></tr>
<tr><td>Com-<br>par-<br>ative<br>Exam-<br>ple<br>2-1</td><td>(CL-1)<br>+<br>(CL-2)</td><td>50.0<br>Acid-<br>modified<br>PP</td><td>18.2<br>Etheylene-<br>α-olefin<br>copolymer</td><td>9.1<br>—</td><td>22.7<br>Copoly-<br>mer<br>with an<br>atactic<br>structure</td><td>8.3</td><td>70.0<br>Random<br>PP</td><td>Ethylene-<br>butene-1<br>random<br>copolymer</td><td>10.0<br>—</td><td>20.0<br>Pro-<br>pylene-<br>butene-1<br>random<br>copoly-<br>mer</td><td>16.7</td><td>45.0</td><td>3.0</td></tr>
<tr><td></td><td></td><td>52.0</td><td>45.0</td><td>—</td><td>3.0</td><td></td><td>52.0</td><td>45.0</td><td>—</td><td>3.0</td><td></td><td></td><td></td></tr>
</table>

<Evaluation>
The following evaluation tests were conducted on the packaging materials obtained in Examples 2-1 to 2-14 and Comparative Example 2-1.
(Shrinkage Ratio and Width-to-Height Ratio of Existing region of (B) Component)
A portion of the packaging material was cut out and heated in an oven at 190° C. for 30 seconds to provide a sample before heating and a sample after heating, and these samples were sealed for observing the cross-sections. In a cross-section along a VD direction and a MD direction with respect to the sealant layer of the above sample, a range of 50 μm toward the MD direction to 25 μm toward the VD direction was observed by scanning electron microscope (SEM) to measure lengths $L^{MD}$, toward the MD direction, of five or more of arbitrary existing regions of the (B) component in the sample before heating, and lengths $Lh^{MD}$, toward the MD direction, of five or more of arbitrary existing regions of the (B) component in the sample after heating, and average lengths $LA^{MD}$ and $LAh^{MD}$ of the respective lengths $L^{MD}$ and $Lh^{MD}$ were determined. In addition, the shrinkage ratio of the existing region of the (B) component before and after heating ($LAh^{MD}/LA^{MD}$) was calculated from the determined $LA^{MD}$ and $LAh^{MD}$.

Also, in a cross-section along the VD direction and the MD direction the sealant layer of the above sample after heating, a range of 50 μm toward the MD direction and 25 μm of toward VD direction was observed by SEM to measure lengths $Lh^{MD}$, toward the MD direction, of and lengths $Lh^{VD}$, toward the VD direction, of five or more of arbitrary existing regions of the (B) component, and average lengths $LAh^{MD}$ and $LAh^{VD}$ of the respective lengths $Lh^{MD}$ and $Lh^{MD}$ were determined. In addition, the width-to-height ratio (aspect ratio) of the existing region of the (B) component ($LAh^{MD}/LAh^{VD}$) was calculated from the determined $LAh^{MD}$ and $LAh^{VD}$.

(Seal Strength)
A sample obtained by cutting the packaging material into 60 mm×120 mm was folded into two, and one side of the folded sample was heat-sealed with a sealing bar with a width of 10 mm at 190° C. and 0.5 MPa for 3. After storing the heat-sealed sample at room temperature for 24 hours, the firstly heat-sealed one side was cut to have a width of 15 mm (see FIG. 8), the seal strength (T-peel strength) was continuously measured by a testing machine (manufactured by INSTRON). The test was conducted according to JIS K6854 at 23° C. under an atmosphere of 50% RH with a peeling rate of 50 mm/min. On the basis of the measurement results regarding the maximal value (burst strength) of the initial seal strength after the start of peeling, evaluation of the seal strength was conducted according to the following criteria.
S: Burst strength is 60 N/15 mm or more
A: Burst strength is 50 N/15 mm or more and less than 60 N/15 mm
B: Burst strength is 40 N/15 mm or more and less than 50 N/15 mm
C: Burst strength is 35 N/15 mm or more and less than 40 N/15 mm
D: Burst strength is less than 35 N/15 mm
(Electrolytic Solution Laminating Strength)
An electrolytic solution in which $LiPF_6$ was added to a mixed solution of ethylene carbonate/diethyl carbonate/dimethyl carbonate=1/1/1 (mass ratio) to achieve an amount of 1 M was loaded in a Teflon (R) vessel, and a sample obtained by cutting the packaging material into 15 mm×100 mm was placed in this vessel, and after well-stoppered, this vessel was stored at 85° C. for 24 hours. Next, washing together was conducted, and laminating strength (T-peel strength) between the metallic foil layer/the sealant layer was measured by a testing machine (manufactured by INSTRON). The test was conducted according to JIS K6854 at 23° C. under an atmosphere of 50% RH with a peeling rate of 50 mm/min. On the basis of the results, evaluation was conducted according to the following criteria.
A: Laminating strength is greater than 7 N/15 mm
B: Laminating strength is 6 N/15 mm or more and 7 N/15 mm or less
C: Laminating strength is 5 N/15 mm or more and less than 6 N/15 mm
D: Laminating strength is less than 5 N/15 mm
  (Electrolytic Solution Heat Seal Strength)
A sample obtained by cutting the packaging material into 60 mm×120 mm was folded into two so as to locate the sealant layer at the inner side, and one side of the folded sample was heat-sealed with a sealing bar with a width of 10 mm at 190° C. and 0.5 MPa for 3 seconds to form a heat-sealed portion. Next, the remaining two sides of the folded sample were also heat-sealed to achieve a bag-shaped packaging material, and within this bag-shaped packaging material, the pouch in which 2 ml of electrolytic solution in which $LiPF_6$ was added to a mixed solution of ethylene carbonate/diethyl carbonate/dimethyl carbonate=1/1/1 (mass ratio) to achieve an amount of 1 M has been injected was stored at 60° C. for 24 hours, and subsequently, the firstly heat-sealed one side was cut to have a width of 15 mm (see FIG. 9), and from one end of the heat-sealed portion (the end on the side exposed to the electrolytic solution), the seal strength (T-peel strength) was continuously measured by a testing machine (manufactured by INSTRON). The test was conducted according to JIS K6854 at 23° C. under an atmosphere of 50% RH with a peeling rate of 50 mm/min. On the basis of the burst strength determined in a manner analogous to as in the section of "Seal Strength", evaluation was conducted according to the following criteria.
S: Burst strength is 50 N/15 mm or more
A: Burst strength is 45 N/15 mm or more and less than 50 N/15 mm
B: Burst strength is 35 N/15 mm or more and less than 45 N/15 mm
C: Burst strength is 25 N/15 mm or more and less than 35 N/15 mm
D: Burst strength is less than 25 N/15 mm
  (Degassing Heat Sealing Strength (Degas Heat Seal Strength))
A sample obtained by cutting the packaging material into 75 mm×150 mm was folded into two to be 37.5 mm×150 mm so as to locate the sealant layer at the inner side (see FIG. 10 (a)), and subsequently, the side of 150 mm length and one of the sides of 37.5 mm length were heat-sealed to produce a pouch. Next, into this pouch, 5 ml of electrolytic solution in which $LiPF_6$ was added to a mixed solution of ethylene carbonate/diethyl carbonate/dimethyl carbonate=1/1/1 (mass ratio) to achieve an amount of 1 M was injected, and the other side of 37.5 mm length was heat-sealed to obtain a pouch sealed by a sealed portion DS1. Then, after storing this pouch at 60° C. for 24 hours, the central portion of the pouch including the electrolytic solution was heat-sealed with a sealing bar with a width of 10 mm at 190° C. and 0.3 MPa for 2 seconds (degassing heat sealed portion DS2, see FIG. 10 (b)). In order to stabilize the sealed portion, after stored at normal temperatures for 24 hours, the region including the degassing heat sealed portion DS2 was cut to have a width of 15 mm (see FIG. 10 (c)), and from one end of the degassing heat sealed portion (the end on the side exposed to the electrolytic solution), the seal strength (T-peel strength) was measured by a testing machine (manufactured by INSTRON). The test was conducted according to JIS K6854 at 23° C. under an atmosphere of 50% RH with a peeling rate of 50 mm/min. On the basis of the burst strength determined in a manner analogous to as in the section of "Seal Strength", evaluation was conducted according to the following criteria.
S: Burst strength is 45 N/15 mm or more
A: Burst strength is 40 N/15 mm or more and less than 45 N/15 mm
B: Burst strength is 30 N/15 mm or more and less than 40 N/15 mm
C: Burst strength is 20 N/15 mm or more and less than 30 N/15 mm
D: Burst strength is less than 20 N/15 mm
  (Insulation Properties after Degassing Heat Sealing (Degassing Insulation))
A sample 40 obtained by cutting the packaging material into 120 mm×200 mm was placed into a mold for cold molding so that the sealant layer comes into contact with a projected part of the molding machine, and deep drawing of 2.0 mm was conducted with a molding rate of 15 mm/sec to form a deep drawing portion 41, and subsequently, the sample 40 was folded into two to be 120 mm×100 mm (see FIG. 11 (a)). Then, an upper side portion 44 of 100 mm was heat-sealed with interposing a tab 42 and a tab sealant 43 (see FIG. 11 (b)), and subsequently, a lateral side portion 45 of 120 mm was heat-sealed to produce a pouch (see FIG. 11 (c)). Next, in order to enable contact with the electrode, a portion of the outer layer of the sample 40 was cut away to form an exposed portion 46 of the metallic foil layer (see FIG. 11 (d)). Then, 5 ml of electrolytic solution in which $LiPF_6$ was added to a mixed solution of ethylene carbonate/diethyl carbonate/dimethyl carbonate=1/1/1 (mass ratio) to achieve an amount of 1 M was injected in the pouch, and a lower side portion 47 of 100 mm was sealed by heat seal (see FIG. 11 (e)). Next, this pouch was allowed to stand at 60° C. for 24 hours in a flatly placed state, and a portion 48 located at the inner side with respect to the heat-sealed lower side portion 47 was subjected to degassing heat seal while sandwiching the electrolytic solution between portions to be heat-sealed at 190° C. and 0.3 MPa (surface pressure) for 2 seconds (see FIG. 11 (f)). Then, the tab 42 and the exposed portion 46 of the metallic foil layer were respectively connected with electrodes 49a, 49b, and by applying 25 V using a withstanding voltage/insulation resistance tester (manufactured by KIKUSUI ELECTRONICS CORPORATION, "TOS9201"), the resistance value at the moment was measured (see FIG. 11 (g)). With regard to the sample of which the resistance value was less than 15 MΩ, 25 V was successively applied for 2 hours to identify the insulation diminished site. By applying voltage for a prolonged time, a reaction product of the metallic foil and the electrolytic solution precipitates from the insulation diminished site, and as a result of this, it is possible to identify the insulation diminished site. As the mold, a mold having molding area of 80 mm×70 mm (rectangular cylindrical shape) and punching corner radius (RCP) of 1.0 mm was used. On the basis of the results, evaluation was conducted according to the following criteria.
A: Resistance value is 200 MΩ or more
B: Resistance value is 100 MΩ or more, and less than 200 MΩ
C: Resistance value is 15 MΩ or more, and less than 100 MΩ

D: Resistance value is less than 15 MΩ

Figure 12A:
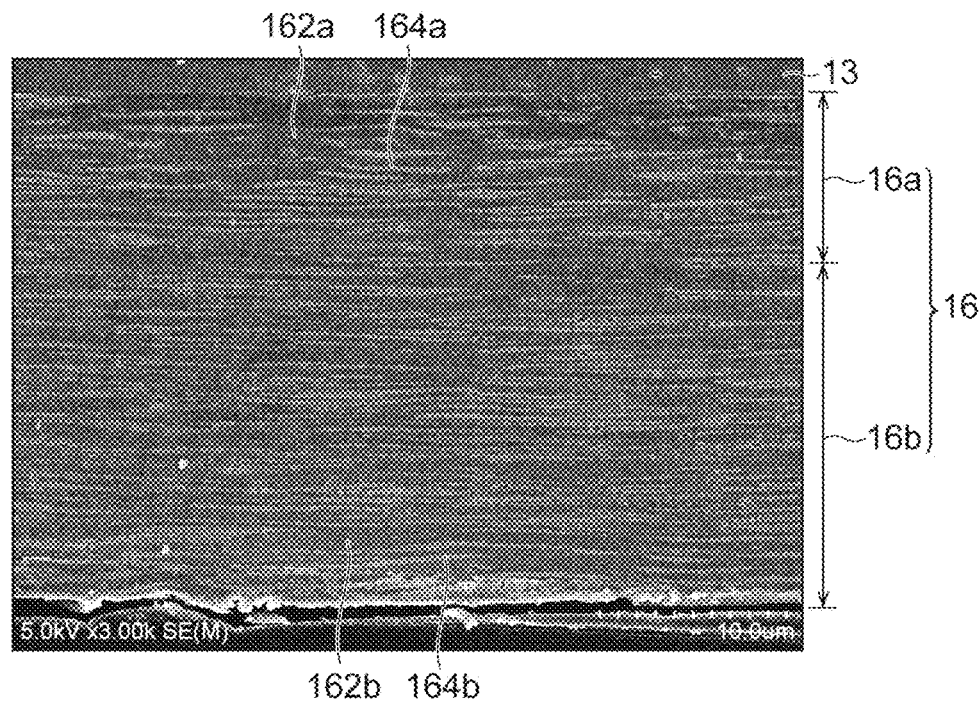
FIGS. 12(a)-12(b) are SEM images of a cross-section along a VD direction (through-thickness direction) and a MD direction with respect to the sealant layer in a packaging material for a power storage device obtained in Example 2-7, in which FIG. 12 (a) is the image before heating at 190° C. for 30 seconds, and FIG. 12 (b) is the image after heating at 190° C. for 30 seconds.
Figure 12B:
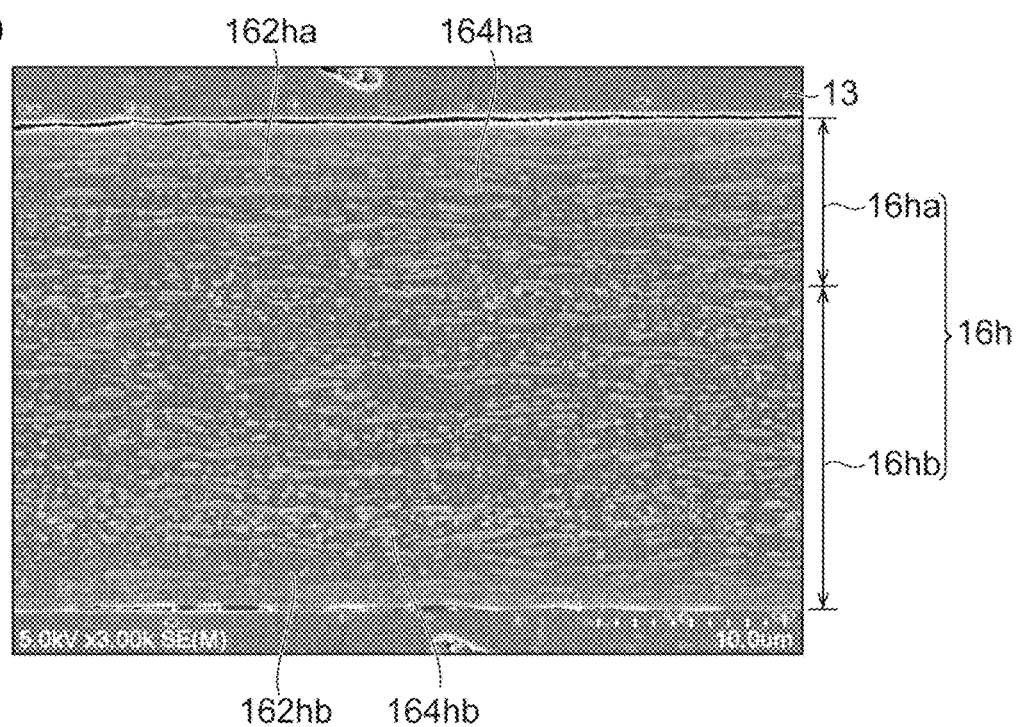

The results of the shrinkage ratio and aspect ratio with regard to the (B) component, seal strength, electrolytic solution laminating strength, electrolytic solution seal strength, degas heat seal strength, and degassing insulation evaluated as described above are shown in the following Table 8, together with the contents of the (B) component and the (C) component on the basis of the entirety of the sealant layer. In the following Table 8, the items having no evaluation of D with regard to the results of each evaluation are considered to have good overall quality.

toward the MD direction. In a view point from up to down, the respective layers identified in FIG. 12 (b) are the metallic foil layer 13, the AL side layer (sealant layer 16ha after heating), and the innermost layer after heating (sealant layer 16hb after heating). In FIGS. 12(a)-12(b), from FIG. 12(b) illustrating the cross-section after heating, it is possible to identify the existing regions of the (A) component 162ha, 162hb represented by gray, and the existing regions of the (B) component 164ha, 164hb represented by white, respectively in the AL side layer 16ha and the innermost layer 16hb. Also, when comparing FIG. 12 (a)

TABLE 8

| | Sealant layer | | Shrinkage ratio of existing region of (B) component ($LAh^{MD}/LAh^{MD}$) | | Width-to-height ratio of existing region of (B) component ($LAh^{MD}/LAh^{MD}$) | | Results of evaluation | | | | | |
|---|---|---|---|---|---|---|---|---|---|---|---|---|
| | (B) Component content [% by mass] | (C) Component content [% by mass] | AL side layer | Innermost layer | AL side layer | Innermost layer | Seal strength | Electrolytic solution laminating strength | Electrolytic solution heat seal strength | Degas heat seal strength | Degassing insulation | Insulation diminished site |
| Example 2-1 | 18.8 | 20.5 | 0.17 | 0.34 | 2.10 | 5.10 | B | A | B | B | C | — |
| Example 2-2 | 15.8 | 20.9 | 0.63 | 0.16 | 9.82 | 1.80 | A | A | A | A | B | — |
| Example 2-3 | 21.2 | 19.7 | 0.63 | 0.34 | 9.82 | 5.10 | S | A | S | S | A | — |
| Example 2-4 | 17.5 | 20.6 | 0.48 | 0.30 | 6.52 | 3.62 | A | A | A | A | B | — |
| Example 2-5 | 14.2 | 21.5 | 0.28 | 0.23 | 2.34 | 2.15 | B | A | B | B | C | — |
| Example 2-6 | 13.3 | 21.7 | 0.70 | 0.39 | 11.12 | 6.83 | S | A | S | S | A | — |
| Example 2-7 | 15.8 | 20.9 | 0.63 | 0.39 | 9.82 | 6.83 | S | A | S | S | A | — |
| Example 2-8 | 15.8 | 20.9 | 0.63 | 0.39 | 9.82 | 6.83 | A | B | A | A | B | — |
| Example 2-9 | 10.0 | 20.0 | — | 0.39 | — | 6.83 | S | A | S | S | A | — |
| Example 2-10 | 10.0 | 20.0 | — | 0.39 | — | 6.83 | A | C | A | A | B | — |
| Example 2-11 | 15.8 | 0.0 | 0.63 | 0.37 | 9.82 | 6.78 | A | B | A | A | B | — |
| Example 2-12 | 21.2 | 19.7 | 0.60 | 0.32 | 9.24 | 5.00 | S | A | S | S | A | — |
| Example 2-13 | 15.8 | 20.9 | 0.60 | 0.37 | 9.24 | 6.70 | S | A | S | S | A | — |
| Example 2-14 | 15.8 | 20.9 | 0.58 | 0.34 | 9.00 | 6.51 | A | A | B | B | A | — |
| Comparative Example 2-1 | 45.0 | 3.0 | 0.15 | 0.13 | 2.00 | 1.78 | D | C | D | D | D | Degas sealed portion |

FIGS. 12(a)-12(b) are SEM images of a cross-section along a VD direction and a MD direction with respect to the sealant layer in a packaging material for a power storage device obtained in Example 2-7, in which FIG. 12(a) is an image before heating at 190° C. for 30 seconds, and FIG. 12(b) is an image after heating at 190° C. for 30 seconds. In a view point from up to down, the respective layers identified in FIG. 12 (a) are the metallic foil layer 13, the AL side layer (sealant layer 16a) before heating, and the innermost layer (sealant layer 16b) before heating. From FIG. 12 (a) illustrating the cross-section before heating, it is possible to identify the existing regions of the (A) component 162a, 162b represented by gray, and the existing regions of the (B) component 164a, 164b represented by white, respectively in the AL side layer and the innermost layer. From FIG. 12 (a), it is also possible to identify a situation in which the existing regions of the (B) component 164a, 164b are stretched and FIG. 12 (b), it is possible to confirm a situation in which the existing regions of the (B) component after heating, 164ha, 164hb are slightly shrunk toward the MD direction, in comparison with the situation before heating. However, the shrinkage ratio is 0.63 and considered to be high, and it can be said that the degree of the shrinkage is small.

Also, as is obvious from the results shown in Table 8, it has been confirmed that, with regard the packaging materials for a power storage device obtained in Examples 2-1 to 2-14, due to the fact that these packaging materials have a low shrinkage sealant layer with a shrinkage rate of 0.20 or more, and any of these packaging materials has excellent insulating properties after degassing heat sealing. In addition, it has been confirmed that the packaging materials of Examples 2-1 to 2-14 have sufficient performance, also with regard to the electrolytic solution laminating strength, the electrolytic solution heat seal strength, and the degassing heat sealing strength. By contrast to this, it has been confirmed that, with regard to the packaging material of Comparative Example 2-1, the seal strength and the insulating properties are inferior.

REFERENCE SIGNS LIST 10, 20, 30 . . . packaging material for power storage device, 11 . . . substrate layer, 12 . . . first adhesive layer, 13 . . . metallic foil layer, 14 . . . anti-corrosion treatment layer, 16 . . . sealant layer, 16a . . . first sealant layer, 16b . . . second sealant layer, 16c . . . third sealant layer, 17 . . . second adhesive layer, 162 . . . existing region of polypropylene-based resin, 164 . . . existing region of incompatible component, 164h . . . existing region of incompatible component after heating, DS1 . . . Sealed portion, DS2 . . . Degassing heat sealed portion.

The invention claimed is:

1. A packaging material for a power storage device, comprising at least:
    a substrate layer;
    a metallic foil layer with an anti-corrosion treatment layer being disposed on one face or both faces of the metallic foil layer; and
    a sealant layer
    in an order of the substrate layer, the metallic foil layer, and the sealant layer, wherein
        the sealant layer includes a polypropylene-based resin (A) an incompatible component (B) incompatible with the polypropylene-based resin (A), and a compatible elastomer (C) compatible with the polypropylene-based resin (A),
        the content of the incompatible component (B) is 1% to 40% by mass based on a total mass of the sealant layer,
        the sealant layer includes a plurality of layers,
        among the plurality of layers, a layer nearest to the metallic foil layer includes the polypropylene-based resin (A) including an acid-modified polypropylene and the compatible elastomer (C) including polypropylene with an atactic structure or a propylene-α-olefin copolymer with an atactic structure, and
        with regard to an adhered portion resulting from adhesion by heat-sealing the packaging material stacked with another packaging material so that the sealant layer and another sealant layer are opposed to each other under conditions of a temperature of 190° C. and a pressure of 0.5 MPa for 3 seconds,
            when seal strength is continuously measured from one end to another end of the adhered portion, resulting in a measurement result showable in a graph showing a relationship between a displacement starting at the one end and the measured seal strength,
            a maximum seal strength $S_M$ based on the measurement result is 35 N/15 mm or more, and
            based on the measurement result, the packaging material for a power storage device satisfies:
                a stable range of the seal strength being present subsequently to a displacement resulting in the maximum seal strength $S_M$, and a ratio $S_S/S_M$ of seal strength $S_S$ in the stable range to the maximum seal strength $S_M$ being 0.3 or more; or
                the stable range being not present, and a ratio $S_A/S_M$ of average seal strength $S_A$ from the displacement resulting in the maximum seal strength $S_M$ to a displacement ending at the other end to the maximum seal strength $S_M$ being 0.3 or more.

2. The packaging material for a power storage device according to claim 1, wherein
    in the graph,
        the maximum seal strength $S_M$ is 40 N/15 mm or more, and the ratio $S_S/S_M$ or the ratio $S_A/S_M$ is 0.6 or more.

3. The packaging material for a power storage device according to claim 1, wherein the incompatible component (B) includes a compound (B1) having a portion compatible with the polypropylene-based resin (A).

4. The packaging material for a power storage device according to claim 3, wherein at least one layer among the plurality of layers is a layer including the polypropylene-based resin (A) and the incompatible component (B) incompatible with the polypropylene-based resin, the incompatible component (B) including the compound (B1).

5. The packaging material for a power storage device according to claim 1, wherein the incompatible component (B) includes an ethylene-α-olefin copolymer.

6. The packaging material for a power storage device according to claim 1, wherein a thickness of the sealant layer is 10 to 45 μm.

7. The packaging material for a power storage device according to claim 1,
    further comprising an adhesive layer between the metallic foil layer and the sealant layer, wherein
    the adhesive layer contains an acid-modified polyolefin, and at least one curing agent selected from the group consisting of a multifunctional isocyanate compound, a glycidyl compound, a compound having a carboxy group, a compound having an oxazoline group and a carbodiimide compound.

* * * * *

UNITED STATES PATENT AND TRADEMARK OFFICE
CERTIFICATE OF CORRECTION

| | |
|---|---|
| PATENT NO. | : 11,532,848 B2 |
| APPLICATION NO. | : 16/617419 |
| DATED | : December 20, 2022 |
| INVENTOR(S) | : Junya Imamoto et al. |

It is certified that error appears in the above-identified patent and that said Letters Patent is hereby corrected as shown below:

In the Claims

Column 79, Line 29:
In Claim 1, delete "(A)" and insert --(A),--.

Column 79, Line 33:
In Claim 1, before "content" delete "the".

Signed and Sealed this
Fourteenth Day of February, 2023

Katherine Kelly Vidal
*Director of the United States Patent and Trademark Office*